US008830815B2

(12) United States Patent
Vermani et al.

(10) Patent No.: US 8,830,815 B2
(45) Date of Patent: Sep. 9, 2014

(54) PREAMBLE DESIGN FOR TELEVISION WHITE SPACE TRANSMISSIONS

(75) Inventors: Sameer Vermani, San Diego, CA (US); Santosh Paul Abraham, San Diego, CA (US); Stephen J. Shellhammer, San Diego, CA (US); Albert van Zelst, San Diego, CA (US); Didier Johannes Richard van Nee, San Diego, CA (US); Vincent Knowles Jones, IV, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 90 days.

(21) Appl. No.: 13/471,947

(22) Filed: May 15, 2012

(65) Prior Publication Data

US 2013/0128807 A1 May 23, 2013

Related U.S. Application Data

(60) Provisional application No. 61/488,092, filed on May 19, 2011.

(51) Int. Cl.
*H04J 11/00* (2006.01)
*H04L 5/00* (2006.01)
*H04L 29/06* (2006.01)
*H04L 27/26* (2006.01)
*H04W 4/00* (2009.01)

(52) U.S. Cl.
CPC .............. *H04L 69/00* (2013.01); *H04L 5/0053* (2013.01); *H04L 27/2602* (2013.01); *H04W 4/00* (2013.01)
USPC ............................ 370/208; 370/319; 370/535

(58) Field of Classification Search
CPC ...................... H04J 3/22; H04J 3/1382; H04Q 2213/13036; H04Q 2213/036; H04B 7/2621; H04B 7/208; H04B 7/2045; H04N 21/2368; H04N 21/4341; H04L 27/265; H04L 5/0007; H04L 2012/5608

USPC ......... 370/205, 206, 208, 210, 328, 319, 321, 370/337, 344, 347, 536, 535, 537, 538; 348/14.02, 14.11, 185, 385.1, 404.1, 348/424.2, 427.1, 433.1, 471, 472, 489
See application file for complete search history.

(56) References Cited

U.S. PATENT DOCUMENTS

| | | | |
|---|---|---|---|
| 7,813,374 B2 | 10/2010 | Moorti et al. | |
| 7,990,934 B2 | 8/2011 | Arad et al. | |
| 8,085,876 B2 | 12/2011 | Gaikwad et al. | |
| 2009/0116430 A1 | 5/2009 | Bonta et al. | |
| 2010/0046648 A1 | 2/2010 | Nerella et al. | |
| 2010/0328541 A1 | 12/2010 | Wu | |
| 2010/0329366 A1 | 12/2010 | Wang et al. | |
| 2011/0002416 A1 | 1/2011 | Shin et al. | |
| 2011/0032875 A1 | 2/2011 | Erceg et al. | |
| 2011/0090887 A1 | 4/2011 | Kim et al. | |
| 2011/0268095 A1 | 11/2011 | Kim et al. | |
| 2011/0287802 A1 | 11/2011 | Ma et al. | |
| 2011/0299468 A1 | 12/2011 | Van Nee et al. | |
| 2012/0002756 A1* | 1/2012 | Zhang et al. | 375/308 |
| 2012/0039284 A1 | 2/2012 | Barbieri et al. | |
| 2012/0213214 A1 | 8/2012 | Vermani et al. | |
| 2012/0238226 A1 | 9/2012 | Vermani et al. | |
| 2013/0034091 A1* | 2/2013 | Kim et al. | 370/338 |

FOREIGN PATENT DOCUMENTS

| | | |
|---|---|---|
| EP | 2320614 A2 | 5/2011 |
| WO | WO2011102897 A1 | 8/2011 |
| WO | WO2011132837 A1 | 10/2011 |
| WO | WO2011143234 A1 | 11/2011 |

OTHER PUBLICATIONS

Anonymous: "Wireless LAN Medium Access Control (MAC) and Physical Layer (PHY) specifications. Amendment 2: TV White Spaces Operation", IEEE P802.11AF /D0.09, No. Part 11, Jan. 1, 2011, pp. 1-159, XP007918708.
Chen et al., "MAC and PHY Proposal for 802.11af", IEEE 8Q2.11-10/Q258R1, Feb. 28, 2010, pp. 1-22, XP007918749.
Franklin, A. et al., "Cognitive Radio test-bed based on ECMA-392 International Standard", 7th International Symposium on Wireless Communication Systems (ISWCS), Sep. 19, 2010, pp. 1026-1030, IEEE, XP031792067, ISBN: 978-1-4244-6315-2.
International Search Report and Written Opinion—PCT/US2012/038426—ISA/EPO—Aug. 20, 2012.

Kawade S et al., "Cognitive radio-based urban wireless broadband in unused TV bands", Radioelektronika (Radioelektronika), 2010 20th International Conference, Apr. 19, 2010, pp. 1-4, XP031685259,IEEE, USA ISBN: 978-1-4244-6318-3,the whole document.

Ventink M et al., "TGaf Comments for PHY",IEEE P802.11AF Draft Standard—Local and Metropolitan Area Networks Part 11—Wireless LAN MAC and PHY Layer Specifications: TV White Space Operation, Mar. 16, 2011, pp. 1-7, XP002676217, Retrieved from the Internet: URL:https://mentor.ieee.org/802.11/dcn/11/11-11-0444-00-00af-comments-for-phy.pptx [retrieved on May 11, 2012] p. 3-p. 7.

Wang J., et al., "First Cognitive Radio Networking Standard for Personal/Portable Devices in TV White Spaces", IEEE Symposium on New Frontiers in Dynamic Spectrum, Apr. 6, 2010, pp. 1-12, IEEE, XP031664849, ISBN: 978-1-4244-5189-0.

Xia H H et al., "Spectrum sharing feasibility for CDMA PCS",Universal Personal Communications, 1994. Record., 1994 Third Annual International Conference on, Sep. 27, 1994, pp. 267-271, XP010131662, DOI: 10.1109/ICUPC.1994.383154 ISBN: 978-0-7803-1823-6 Sect. 1, 3rd par. Sect. 2, 1st and 2nd par.

IEEE 802.11-2007, "IEEE Standard for Information Technology—Telecommunications and Information Exchange Between Systems-Local and Metropolitan Area Networks-Specific Requirements", Part 11: Wireless LAN Medium Access Control (MAC) and Physical Layer (PHY) Specifications, (Jun. 12, 2007).

Zhang, et al., "Adaptive Subcarrier Nulling: Enabling partial spectrum sharing in wireless LANs," 2011 19th IEEE International Conference on Network Protocols (ICNP), Oct. 17-20, 2011, pp. 311-320.

\* cited by examiner

*Primary Examiner* — Dady Chery
(74) *Attorney, Agent, or Firm* — S. Hossain Beladi

(57) ABSTRACT

A method for generating a Physical Layer Convergence Protocol Packet Data Unit (PPDU) having a preamble and a payload for television white space transmission (TVWS) is provided. The symbols of the PPDU each include 128 total (orthogonal frequency-division multiplexing) OFDM tones or 256 total OFDM tones. The preamble includes a signal (SIG) field symbol having 108 OFDM data tones if the symbols of the PPDU include 128 total OFDM tones or having 234 OFDM data tones if the symbols of the PPDU include 256 total OFDM tones. The SIG field symbol indicates at least one of an amount of data in the payload or a length of time that the PPDU will occupy the television broadcast frequency spectrum. The PPDU is generated by down-clocking an 802.11ac signal by a factor so that the bandwidth of the PPDU decreases down to one appropriate for use in a TVWS channel.

54 Claims, 25 Drawing Sheets

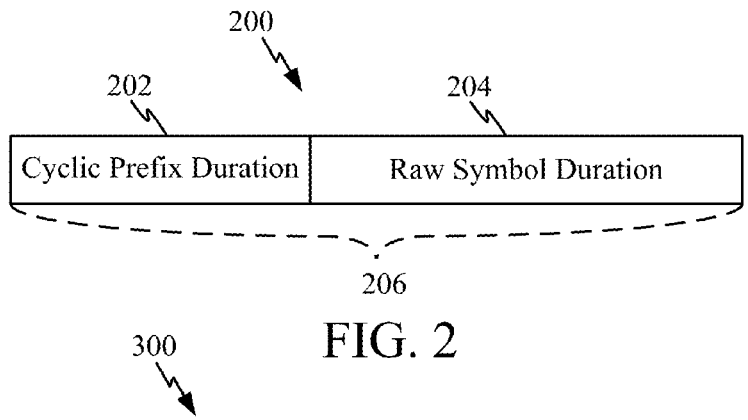

FIG. 2

| Signal Parameter | Signal A | Signal B | Signal C | Signal D |
|---|---|---|---|---|
| Original 802.11ac Bandwidth | 20 MHz | 40 MHz | 40 MHz | 40 MHz |
| Original Number of Sub-Carriers | 64 | 128 | 128 | 128 |
| Original Cyclic Prefix Duration | 0.8 μs | 0.8 μs | 0.8 μs | 0.8 μs |
| Original Raw Symbol Duration | 3.2 μs | 3.2 μs | 3.2 μs | 3.2 μs |
| Original Total Symbol Duration | 4 μs | 4 μs | 4 μs | 4 μs |
| Down-clocking Factor | 4 | 8 | 40 ÷ 6 | 5 |
| Resulting 802.11af Bandwidth | 5 MHz | 5 MHz | 6 MHz | 8 MHz |
| Resulting Number of Sub-Carriers | 64 | 128 | 128 | 128 |
| Resulting Cyclic Prefix Duration | 3.2 μs | 6.4 μs | 5.333 μs | 4 μs |
| Resulting Raw Symbol Duration | 12.8 μs | 25.6 μs | 21.333 μs | 16 μs |
| Resulting Total Symbol Duration | 16 μs | 32 μs | 26.667 μs | 20 μs |

| 40 MHz 802.11ac STF Parameter | Value |
|---|---|
| Repetition Interval | 800 ns |
| Tone Population Per Symbol | Every 4th Tone |
| Total Number of OFDM Symbols | 2 |
| Total Number of Repetitions | 10 |

| 40 MHz 802.11ac Preamble Field | Number of Data Tones | Number of Data Tones Carrying Unique Data | Max. Unique Data Bits |
|---|---|---|---|
| Legacy SIG | 96 | 48 | 24 |
| VHT SIG A | 96 | 48 | 24 |

FIG. 6

| 4 MHz - 8 MHz 802.11af STF Parameter | Value |
|---|---|
| Repetition Interval | 2 μs to 4 μs |
| Tone Population Per Symbol | Every 8th Tone |
| Total Number of OFDM Symbols | 1 |
| Total Number of Repetitions | 10 |
| Total STF Time Duration | 20 μs to 40 μs |

| 4 MHz - 8 MHz 802.11af BF-SIG Field | |
|---|---|
| Total Tones | 128 |
| Data Tones | 108 |
| Pilot Tones | 6 |
| DC Tones | 3 |
| Guard Tones | 11 |
| Data Tones Carrying Unique Data | 108 |
| Data Bits | 54 |

| Contents of SIG Field 714 | |
|---|---|
| Payload Length | 16 to 18 |
| Bandwidth | 2 |
| MCS | 4 |
| NSTS | 2 |
| Beamforming | 1 |
| STBC | 1 |
| Aggregation | 1 |
| SGI | 1 |
| CRC | 4 |
| Tail | 6 |
| Reserved | 14 to 16 |
| Total Bits | 54 |

FIG. 12

| Contents of BF-SIG Field 1016 | |
|---|---|
| NSTS x 4 | 8 |
| GID | 6 |
| MCS x 4 | 16 |
| Tail | 6 |
| Reserved | 18 |
| Total Bits | 54 |

| Contents of SIG Field 1414 | | |
|---|---|---|
| SIG Bit Field Parameter | Single User | Multi-User |
| SU or MU Mode | 1 | 1 |
| Length / Duration | 9 | 9 |
| MCS | 4 | -- |
| Bandwidth | 2 | 2 |
| Aggregation | 1 | -- |
| STBC | 1 | 1 |
| Error Coding Type | 2 | 5 |
| SGI | 1 | 1 |
| GID | -- | 6 |
| NSTS | 2 | 8 |
| PAID | 9 | -- |
| Reserved | 12 | 11 |
| CRC | 4 | 4 |
| Tail | 6 | 6 |
| Total Bits | 54 | 54 |

| Signal Parameter | Signal A | Signal B | Signal C | Signal D |
|---|---|---|---|---|
| Original 802.11ac Bandwidth | 80 MHz | 80 MHz | 80 MHz | 80 MHz |
| Original Number of Sub-Carriers | 256 | 256 | 256 | 256 |
| Original Cyclic Prefix Duration | 0.8 μs | 0.8 μs | 0.8 μs | 0.8 μs |
| Original Raw Symbol Duration | 3.2 μs | 3.2 μs | 3.2 μs | 3.2 μs |
| Original Total Symbol Duration | 4 μs | 4 μs | 4 μs | 4 μs |
| Down-clocking Factor | 20 | 16 | 80 ÷ 6 | 10 |
| Resulting 802.11af Bandwidth | 4 MHz | 5 MHz | 6 MHz | 8 MHz |
| Resulting Number of Sub-Carriers | 256 | 256 | 256 | 256 |
| Resulting Cyclic Prefix Duration | 16 μs | 12.8 μs | 10.667 μs | 8 μs |
| Resulting Raw Symbol Duration | 64 μs | 51.2 μs | 42.667 μs | 32 μs |
| Resulting Total Symbol Duration | 80 μs | 64 μs | 53.333 μs | 40 μs |

| 80 MHz 802.11ac Preamble Field | Number of Data Tones | Number of Data Tones Carrying Unique Data | Max. Unique Data Bits |
|---|---|---|---|
| Legacy SIG | 192 | 48 | 24 |
| VHT SIG A | 192 | 48 | 24 |

2000

| 4 MHz - 8 MHz 802.11af STF Parameter | Every 8th Tone Populated | Every 16th Tone Populated |
|---|---|---|
| Repetition Interval | 4 μs to 8 μs | 2 μs to 4 μs |
| Total Number of OFDM Symbols | 1 | 1 |
| Total Number of Repetitions | 10 | 20 |
| Total STF Time Duration | 40 μs to 80 μs | 20 μs to 40 μs |

| 4 MHz - 8 MHz 802.11af SIG Field | |
|---|---|
| Total Tones | 256 |
| Data Tones | 234 |
| Pilot Tones | 8 |
| DC Tones | 3 |
| Guard Tones | 11 |
| Data Tones Carrying Unique Data | 234 |
| Data Bits | 117 |

FIG. 21

| Contents of SIG Field 1914 | |
| --- | --- |
| SIG Bit Field Parameter | Value |
| Length / Duration | 9 |
| MCS | 4 |
| Bandwidth | 2 |
| Aggregation | 1 |
| STBC | 1 |
| Error Coding Type | 2 |
| SGI | 1 |
| NSTS | 2 |
| FAID | 16 |
| Reserved | 69 |
| CRC | 4 |
| Tail | 6 |
| Total Bits | 117 |

| Contents of SIG Field 2314 | |
| --- | --- |
| SIG Bit Field Parameter | Value |
| Length / Duration | 9 |
| MCS x 4 | 16 |
| Bandwidth | 2 |
| STBC | 1 |
| Error Coding Type | 5 |
| SGI | 1 |
| Group ID | 6 |
| NSTS | 8 |
| Reserved | 59 |
| CRC | 4 |
| Tail | 6 |
| Total Bits | 117 |

PREAMBLE DESIGN FOR TELEVISION WHITE SPACE TRANSMISSIONS

CLAIM OF PRIORITY

The present Application for patent claims priority to U.S. Provisional Application No. 61/488,092, filed May 19, 2011, which is hereby expressly incorporated by reference.

BACKGROUND

1. Field

Various features relate to wireless communication devices and systems, and more particularly to methods and apparatuses for generating preambles for television white space transmissions.

2. Background

Access terminals, such as laptop computers, personal digital assistant devices, mobile or cellular phones, personal media players, or other devices with a processor, that communicate through wireless signals are becoming increasingly popular and are used more frequently. Many access terminals are adapted to communicate via Wireless Local Area Networks (WLAN), and several emerging wireless communications standards have been developed and are being developed for facilitating such WLANs.

The Institute of Electronics and Electrical Engineers (IEEE) has developed various WLAN standards (or revisions) under the umbrella of its IEEE 802.11 standard. IEEE 802.11 denotes a set of WLAN air interface standards developed by the IEEE 802.11 committee for short-range communications (e.g., tens of meters to a few hundred meters). Such WLAN networks are often referred to as "WiFi" or "wi-fi" networks and allow electronic devices to communication wirelessly (e.g., exchange data, access other networks, etc.). Common wi-fi frequencies are include the 2.4 GHz and 5.6 GHz bands.

However, the available frequency spectrum for such wireless networks is quite limited and there is an ever increasing need for bandwidth demanded by wireless communications systems. As such, reuse of, and/or co-existence with, existing frequency spectrum allocations is desirable. One relatively recent development corresponds to implementing a WLAN using "white space" (also referred to as "whitespace"). White space may refer to radio frequencies allocated to a broadcasting service but not used locally (e.g., within short range). In the U.S., the Federal Communication Commission (FCC) Report and Order (R&O) recently opened up an opportunity of unlicensed usage of white space. Use of white space for implementing a WLAN according to the IEEE 802.11 standard is being developed under an amendment to the IEEE 802.11 referred to as IEEE 802.11af. "White-fi" is a term being used to describe the use of a Wi-Fi technology within the TV unused spectrum, or TV white space (TVWS). By using the TVWS with frequencies below 1 GHz, IEEE 802.11af may offer greater propagation distances to be achieved, in addition to the increased bandwidth made available by the locally unused frequencies in the TV spectrum.

In the U.S. each television channel has a total bandwidth of 6 MHz. However, due to concerns of spectral leakage into adjacent channels, signal providers typically limit the signal carrier bandwidth for each channel from 4 MHz to 5 MHz in order to provide 500 kHz to 1 MHz guard bands on each side of the channel. In other countries the total bandwidth for each television channel may be different (e.g., 8 MHz for most European countries).

TVWS devices can operate in outdoor environments, making them vulnerable to high delay spreads. This entails a much higher cyclic prefix (CP) in most other OFDM-based transmissions in order to provide sufficient protection against delay spread effects. As one example, the 802.11af signal may be a 5 MHz signal that is generated by down-clocking an 802.11ac signal. For example, a 20 MHz, 40 MHz, 80 MHz, or 160 MHz bandwidth 802.11ac signal may be down-clocked to a 5 MHz bandwidth signal using an appropriate down-clocking factor. Down-clocking the signal causes the cyclic prefix duration, preamble duration, and symbol duration to increase in time. The increase in time is directly proportional to the down-clocking factor applied. For example, a down-clocking factor of sixteen (16) used to down-clock an 80 MHz bandwidth signal to a 5 MHz signal increases the cyclic prefix duration by sixteen (16) times, whereas down-clocking a 20 MHz signal to 5 MHz only increases the cyclic prefix duration by four (4) times.

In some cases generating a 5 MHz TVWS signal by down-clocking a 20 MHz 802.11ac signal may result in a cycle prefix duration that is too short, which may cause the resulting signal to be vulnerable to the high delay spreads. By contrast, down-clocking a larger bandwidth (e.g., 40 MHz, 80 MHz, etc.) 802.11ac signal to generate a 5 MHz TVWS signal may result in a preamble duration that is too long. That is, the preamble duration may occupy an unacceptably large portion of the total time allotted to the WLAN device for a given TVWS transmission (i.e., the preamble overhead of the Physical Layer Convergence Protocol Packet Data Unit (PPDU) may be too great).

Accordingly, there is a need for a TVWS preamble (e.g., TGaf) that features a sufficient cyclic prefix duration to combat high delay spread, low preamble duration overhead, and the ability to re-use the same architecture as other IEEE 802.11 standards, such as 802.11ac.

SUMMARY

One feature provides a method for wireless communication in a television broadcast frequency spectrum (e.g., TVWS). The method comprises generating a down-clocked waveform by applying a factor to a clock that causes a waveform bandwidth to be reduced from a first bandwidth (e.g., 20, 40, or 80 MHz) to a second bandwidth (e.g., 4-10 MHz), wherein the second bandwidth of the down-clocked waveform is less than a channel bandwidth for the identified unused channel. According to one aspect, the method includes generating a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones. The SIG field symbol may indicate at least one of an amount of data in the payload or a length of time that the PPDU will occupy the television broadcast frequency spectrum. The method further includes transmitting the PPDU in a television broadcast frequency spectrum (e.g., TVWS).

According to one aspect, generating the PPDU includes down-clocking a first signal (e.g., an 802.11ac signal) having a first bandwidth (e.g., 20, 40, or 80 MHz) by a factor to generate the PPDU having a second bandwidth (e.g., 4-10 MHz), where the first signal has a first signal preamble that includes a first short training field (STF) having two or more symbols, the first STF has a first STF time duration, and the preamble further includes a second STF having a second STF time duration, wherein the second STF time duration is less than the first STF time duration multiplied by the factor. According to one aspect, the second STF time duration is equal to half of the first STF time duration multiplied by the factor. According to another aspect, the second STF includes only one symbol. According to another aspect, if the symbols of the PPDU each include 128 total OFDM tones then the first bandwidth is 40 MHz, the second bandwidth is greater than or equal to four (4) MHz and less than or equal to eight (8) MHz, the first STF time duration is equal to eight (8) μsec, and the second STF time duration is greater than or equal to 20 μsec and less than or equal to 40 μsec. If the symbols of the PPDU each include 256 total OFDM tones then the first bandwidth is 80 MHz, the second bandwidth is greater than or equal to four (4) MHz and less than or equal to eight (8) MHz, the first STF time duration is eight (8) μsec, and the second STF time duration is greater than or equal to 40 μsec and less than or equal to 80 μsec. According to one aspect, the preamble further includes a short training field (STF) symbol having every eighth tone or sixteenth tone populated if the symbols of the PPDU each include 128 total OFDM tones or having every sixteenth tone populated if the symbols of the PPDU each include 256 total OFDM tones.

According to another aspect, the preamble further includes a short training field (STF) symbol having a repetition interval greater than or equal to 2 microseconds (μs) and less than or equal to 4 μs if the symbols of the PPDU each include 128 total OFDM tones or having a repetition interval greater than or equal to 4 μs and less than or equal to 8 μs if the symbols of the PPDU each include 256 total OFDM tones. According to one aspect, generating the PPDU includes down-clocking the first signal having the first bandwidth by a factor to generate the PPDU having the second bandwidth, the first signal having a first signal preamble that includes a first SIG field having at least one symbol, wherein the symbol of the first SIG field is limited to 48 OFDM data tones per 20 MHz sub-band of the first signal. According to another aspect, generating the PPDU includes down-clocking the first signal having the first bandwidth by a factor to generate the PPDU having the second bandwidth, the first signal having a first signal preamble including at least ten (10) symbols, wherein the preamble of the PPDU has seven (7) symbols.

According to another aspect, generating the PPDU includes down-clocking the first signal having the first bandwidth by a factor to generate the PPDU having the second bandwidth, the first signal having a first signal preamble that has a first signal preamble time duration, wherein a time duration of the preamble of the PPDU is less than 82% of the first signal preamble time duration multiplied by the factor. According to one aspect, the SIG field symbol includes 54 bits of data if the symbols of the PPDU each include 128 total OFDM tones or 117 bits of data if the symbols of the PPDU each include 256 total OFDM tones. According to another aspect, the SIG field symbol further indicates a bandwidth of the payload, a modulation and coding rate scheme of the payload, and a number of spatial streams of the payload. According to another aspect, the SIG field symbol further indicates whether one or more symbols of the preamble or the payload are beamformed.

According to yet another aspect, the SIG field symbol is modulated using quadrature binary phase shift keying (QBPSK) to indicate whether one or more symbols of the preamble or the payload are beamformed. According to yet another aspect, the SIG field symbol further indicates whether the payload is to be transmitted in a single user mode or a multi-user mode, and if the payload is to be transmitted in the multi-user mode the SIG field symbol further indicates a group identifier (ID) that identifies at least one intended receiver of the payload, and the preamble further includes a signal B (SIG-B) field symbol that indicates a modulation and coding rate scheme of the payload. According to one aspect, the preamble generated includes a beamformed signal (BF-SIG) field that indicates at least one of a group identifier (ID) that identifies at least one intended receiver of the payload, a number of spatial streams for the payload for each user of a plurality of users, and/or a modulation and coding rate scheme for the payload for each user of the plurality of users. According to one aspect, the bandwidth of the PPDU is greater than or equal to 5 MHz and less than or equal to 6 MHz if the symbols of the PPDU each include 128 total OFDM tones, or the bandwidth of the PPDU is 8 MHz if the symbols of the PPDU each include 256 total OFDM tones.

According to another aspect, the television broadcast frequency spectrum is less than 1 GHz. According to one aspect, the method further includes down-clocking a 40 MHz bandwidth signal by a factor greater than or equal to 5 and less than or equal to 10 to generate the symbols of the PPDU including 128 total OFDM tones, and down-clocking an 80 MHz bandwidth signal by a factor greater than or equal to 10 and less than or equal to 20 to generate the symbols of the PPDU including 256 total OFDM tones. According to one aspect, the first signal (e.g., 40 MHz and 80 MHz bandwidth signals) is defined in accordance with the 802.11ac standard of the Institute of Electronics and Electrical Engineers (IEEE). According to another aspect, each symbol of the preamble has a cyclic prefix duration greater than or equal to 4 μsec and less than or equal to 8 μsec if the symbols of the PPDU each include 128 total OFDM tones, or greater than or equal to 8 μsec and less than or equal to 16 μsec if the symbols of the PPDU each include 256 total OFDM tones.

According to another aspect, a symbol duration, including a cyclic prefix duration, of each preamble symbol of the PPDU is greater than or equal to 20 μsec and less than or equal to 40 μsec if the symbols of the PPDU each include 128 total OFDM tones, or greater than or equal to 40 μsec and less than or equal to 80 μsec if the symbols of the PPDU each include 256 total OFDM tones. According to one aspect, generating the PPDU includes down-clocking the first signal having the first bandwidth by a factor to generate the PPDU having the second bandwidth, the first signal having a first signal preamble that includes two legacy short training field (STF) symbols, two legacy long training (LTF) field symbols, one first signal field symbol, two very high throughput (VHT) signal A field symbols, one VHT STF field symbol, at least one VHT LTF field symbol, and one first signal B field symbol, and wherein the preamble further includes a short training field (STF) symbol, two long training field (LTF) symbols, a beamforming signal (BF-SIG) field symbol for a multi-user, multiple-input multiple-output (MU-MIMO) mode or a single-user beamformed (SU-BF) mode, a precoded short training (PC-STF) field symbol, and at least one precoded long training (PC-LTF) field.

Another feature provides a wireless transmitter apparatus configured for wireless communication in a television broadcast frequency spectrum. The apparatus comprises a processing circuit adapted to generate a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones, where the SIG field symbol indicates at least one of an amount of data in the payload or a length of time that the PPDU will occupy the television broadcast frequency spectrum, and a wireless transmitter communicatively coupled to the processing circuit and adapted to transmit the PPDU in the television broadcast frequency spectrum. According to one aspect, the processing circuit is further adapted to down-clock a first signal having a first bandwidth by a factor to generate the PPDU having a second bandwidth, the first signal having a first signal preamble that includes a first short training field (STF) having two or more symbols, the first STF having a first STF time duration, and the preamble further includes a second STF having a second STF time duration, wherein the second STF time duration is less than the first STF time duration multiplied by the factor. According to another aspect, the preamble further includes a short training field (STF) symbol having every eighth tone or sixteenth tone populated if the symbols of the PPDU each include 128 total OFDM tones or having every sixteenth tone populated if the symbols of the PPDU each include 256 total OFDM tones. According to another aspect, the processing circuit is further adapted to down-clock a first signal having a first bandwidth by a factor to generate the PPDU having a second bandwidth, the first signal having a first signal preamble including at least ten (10) symbols, wherein the preamble of the PPDU has seven (7) symbols.

According to another aspect, the processing circuit is further adapted to down-clock a first signal having a first bandwidth by a factor to generate the PPDU having a second bandwidth, the first signal having a first signal preamble that includes two legacy short training field (STF) symbols, two legacy long training (LTF) field symbols, one first signal field symbol, two very high throughput (VHT) signal A field symbols, one VHT STF field symbol, at least one VHT LTF field symbol, and one first signal B field symbol, and wherein the preamble further includes a short training field (STF) symbol; two long training field (LTF) symbols; a beamforming signal (BF-SIG) field symbol for a multi-user, multiple-input multiple-output (MU-MIMO) mode or a single-user beamformed (SU-BF) mode; a precoded short training (PC-STF) field symbol; and at least one precoded long training (PC-LTF) field symbol.

Another feature provides a wireless transmitter apparatus comprising a means for generating a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones, where the SIG field symbol indicates at least one of an amount of data in the payload or a length of time that the PPDU will occupy the television broadcast frequency spectrum, and a means for transmitting the PPDU in the television broadcast frequency spectrum.

Another feature provides a non-transitory processor-readable medium having one or more instructions stored thereon for wireless communication in a television broadcast frequency spectrum, which when executed by at least one processor causes the processor to generate a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones, where the SIG field symbol indicates at least one of an amount of data in the payload or a length of time that the PPDU will occupy the television broadcast frequency spectrum, and transmit the PPDU in the television broadcast frequency spectrum.

Another feature provides a method for wireless communication in a television broadcast frequency spectrum operational at a receiver. The method comprises receiving, in the television broadcast frequency spectrum, a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones, and the SIG field symbol indicates at least one of an amount of data in the payload or a length of time that the PPDU will occupy the television broadcast frequency spectrum. According to one aspect, receiving the PPDU includes applying a down-clocking factor to a clock of the receiver, the down-clocking factor associated with a bandwidth of the received PPDU.

Another feature provides a wireless receiver apparatus for wireless communication in a television broadcast frequency spectrum. The receiver apparatus comprises a wireless receiver adapted to receive in the television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones, where the SIG field symbol indicates at least one of an amount of data in the payload or a length of time that the PPDU will occupy the television broadcast frequency spectrum, and a processing circuit communicatively coupled to the wireless receiver and adapted to process the PPDU received. According to one aspect, the processing circuit is further adapted to apply a down-clocking factor to a clock of the wireless receiver apparatus, the down-clocking factor associated with a bandwidth of the received PPDU.

Another feature provides a wireless receiver apparatus comprising a means for receiving in the television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones, where the SIG field symbol indicates at least one of an amount of data in the payload or a length of time that the PPDU will occupy the television broadcast frequency spectrum.

Another feature provides a non-transitory processor-readable medium having one or more instructions stored thereon for wireless communication in a television broadcast frequency spectrum, which when executed by at least one processor causes the processor to receive in the television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones, where the SIG field symbol indicates at least one of an amount of data in the payload or a length of time that the PPDU will occupy the television broadcast frequency spectrum.

BRIEF DESCRIPTION OF THE DRAWINGS

FIG. 2 illustrates an exemplary transmission unit, such as an orthogonal frequency-division multiplexing (OFDM) symbol.

FIG. 3 illustrates a table featuring signal parameter values for exemplary 802.11af signals having various bandwidths.

FIG. 5 illustrates a table of exemplary parameters/characteristics of an L-STF for a 20, 40, 80, or 160 MHz 802.11ac transmission.

FIG. 6 illustrates an exemplary table that shows data tone and bit information for some preamble fields for a 40 MHz bandwidth 802.11ac transmission.

FIG. 12 illustrates a table showing exemplary bit fields of a SIG field.

FIG. 13 illustrates a table showing exemplary bit fields of a BF-SIG field.

FIG. 15 illustrates a table that includes an exemplary content of the SIG field.

FIG. 17 illustrates a table featuring signal parameter values for exemplary 802.11af signals having various bandwidths.

FIG. 20 illustrates a table of exemplary parameters/characteristics of the STF for a 4 MHz to 8 MHz bandwidth 802.11af transmission based on a 256 point DFT design.

FIG. 21 illustrates an exemplary table that shows tone and bit information for the SIG field for a 4 MHz to 8 MHz bandwidth 802.11af transmission based on a 256 point DFT design.

FIG. 22 illustrates a table that includes an exemplary contents of the SIG field.

FIG. 24 illustrates a table showing exemplary bit fields of a SIG field.

DETAILED DESCRIPTION

Figure 1:
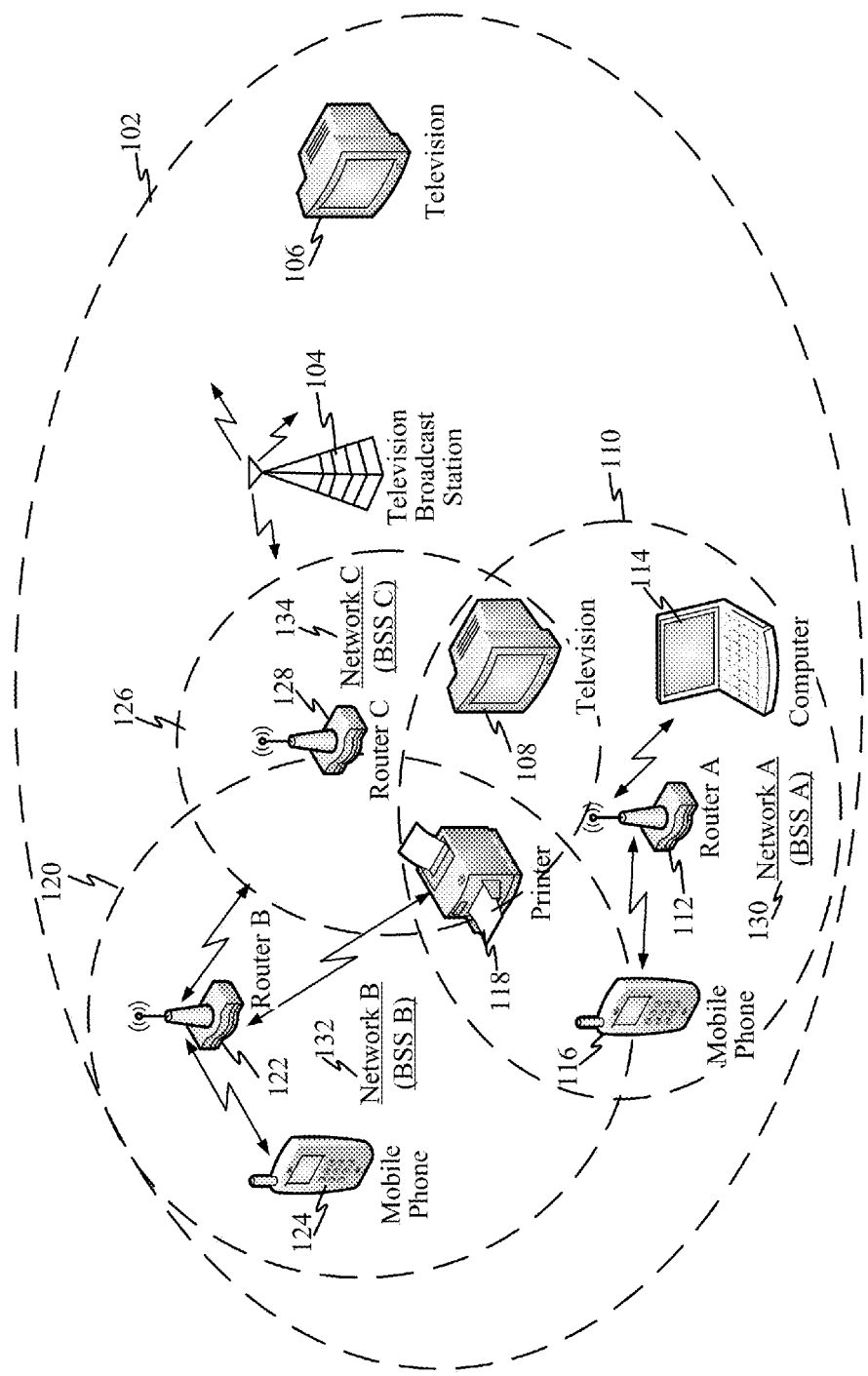
FIG. 1 is a block diagram illustrating an exemplary operating environment in which various features for performing WiFi transmissions over television white space (TVWS) may be implemented.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. As used herein, the terms "total tones" and "total OFDM tones" refers to the total number of data tones, pilot tones, DC tones, and guard tones an orthogonal frequency-division multiplexing (OFDM) symbol has in the frequency domain. Thus, as just one example, an OFDM symbol in the frequency domain having 108 data tones, 6 pilot tones, 3 DC tones, and 11 guard tones has by definition 128 total tones. As used herein, the term "tone" may also mean the same thing as "subcarrier," and the two terms may be used interchangeably.

Overview

A method and apparatus for generating and receiving a Physical Layer Convergence Protocol Packet Data Unit (PPDU) having a preamble and a payload for television white space transmission (TVWS) is provided. The symbols of the PPDU each include 128 total (orthogonal frequency-division multiplexing) OFDM tones or 256 total OFDM tones. The preamble includes a signal (SIG) field symbol having 108 OFDM data tones if the symbols of the PPDU include 128 total OFDM tones or having 234 OFDM data tones if the symbols of the PPDU include 256 total OFDM tones. The SIG field symbol indicates at least one of an amount of data in the payload or a length of time that the PPDU will occupy the television broadcast frequency spectrum. The PPDU may be generated by down-clocking an 802.11ac signal by a factor so that the bandwidth of the PPDU decreases down to one appropriate for use in a TVWS channel. According to one aspect of the disclosure, a 40 MHz bandwidth 802.11ac signal is down-clocked to a 4 MHz to 8 MHz bandwidth 802.11af signal having 128 total tones so that the resulting cyclic prefix duration is long enough to combat the high delay spread effects that such sub-1 GHz 802.11af signals are susceptible to. According to one aspect, the two legacy short training field (STF) symbols of the 802.11ac signal are replaced by a single STF symbol in the down-clocked 802.11af signal to reduce the preamble duration and/or preamble overhead. According to another aspect, the three symbols that comprise the 802.11ac signal (SIG) field and very high throughput (VHT) SIG A field of the 802.11ac signal are replaced by a single SIG field in the down-clocked 802.11af signal to further reduce the preamble duration and/or preamble overhead of the down-clocked signal. According to one example, an 80 MHz bandwidth 802.11ac signal is down-clocked to a 4 MHz to 8 MHz bandwidth 802.11af signal having 256 total tones.

Exemplary Network Environment

FIG. 1 is a block diagram illustrating an exemplary operating environment in which various features for performing wifi transmissions over television white space (TVWS) may be implemented. A television broadcast station 104 may be configured to broadcast television content or programing over one or more defined channels in a frequency spectrum. For example, television channels may be defined as 6 MHz or 8 MHz channel segments within a frequency spectrum. The television broadcast station 104 may have a relatively large coverage area or region 102 in which one or more televisions 106, 108 (and/or other devices) may be configured to receive the television content.

While one or more channels may be defined for television content or programming within the frequency spectrum, there are typically many unused channels within a given coverage area or region 102. Sometimes, channels may be left unused to avoid interfering with adjoining channel transmissions. However, within a smaller area(s) or region(s) 110, 120, and/or 126 the unused television channels (referred as white space) may be reused by other devices for local or shorter range transmissions by a local wireless network (e.g., wifi network, peer-to-peer transmissions, etc.). That is, because the local wireless network has a shorter range, it operates at a lower transmission power and such transmissions are less likely to interfere with television broadcast transmissions.

In this example, three local wireless area networks 130, 132, and/or 134 are illustrated. In the first wireless network 130, a first wireless router 112 may facilitate communications, to, from, and/or between, a plurality of nearby electronic devices, such as a computer 114 and/or a mobile phone 116, within a first region 110. In the second wireless network 132, a second wireless router 122 may facilitate communications, to, from, and/or between, a plurality of nearby electronic devices, such as a printer 118, within a second region 120. Similarly, in the third wireless network 134, a third wireless router 128 may facilitate communications, to, from, and/or between, a plurality of nearby electronic devices within a third region 126. Note that each wireless router 112, 122, and/or 128 may provide wireless connectivity to the nearby electronic devices, enabling them to communicate with other devices within the network and/or with devices on other (remote) networks.

It should be appreciated that the wireless networks 130, 132, and/or 134 may have overlapping coverage areas. Consequently, transmissions over the various wireless networks should coexist to prevent interfering with each other. In IEEE 802.11 wireless specifications, each wireless network 130, 132, and/or 134 is said to implement a basic service set (BSS), e.g., defined by the access point (router) and the stations (electronic devices) it serves.

In one example, the frequency spectrum utilized for television broadcasts may be in the range of 54 to 72 megahertz (MHz), 76 through 88 MHz, 174 to 216 MHz, and/or 470 to 806 MHz. However, the television frequency spectrum ranges may vary for different territories and countries. Consequently, the white space referred to herein may span different ranges of the frequency spectrum. Since frequency spectrum for wireless networks is in demand, one proposed solution in the IEEE 802.11af specification is to reuse television channels that are unused in a particular region.

FIG. 2 illustrates an exemplary transmission unit, such as an orthogonal frequency-division multiplexing (OFDM) symbol 200. The OFDM symbol 200 includes a cyclic prefix portion and a raw symbol portion. The length in the time domain of the cyclic prefix may be represented as the cyclic prefix duration 202. Similarly, the length in time domain of the raw symbol may be represented as the raw symbol duration 204. Together the two make up the total OFDM symbol duration 206. The cyclic prefix precedes the raw symbol with a repetition of a portion of the end of the previous symbol. The cyclic prefix serves as a guard interval that helps eliminate inter-symbol interference from the previous symbol. It also allows the linear convolution of a frequency-selective multipath channel to be modeled as circular convolution, which in turn may be transformed to the frequency domain using a discrete Fourier transform. This approach allows for simple frequency-domain processing, such as channel estimation and equalization. The raw symbol may be, for example, a preamble symbol or a data symbol that comprises bits of information that are ultimately received and processed by a receiver.

According to one aspect, IEEE 802.11n or IEEE 802.11ac signals may be down-clocked by different factors for different bandwidths to obtain 802.11af signals having bandwidths that are appropriate for a given application. Down-clocking refers to reducing or decreasing the frequency of a transmission or waveform, which causes the cyclic prefix (CP) duration and symbol duration to increase by the down-clocking factor.

In some countries, including the United States and Japan, the TVWS channel bandwidth spacing is typically 6 MHz wide. Due to spectral leakage concerns into adjacent channels, signal providers may limit the bandwidth of the actual signal transmitted within the channel to less than the fill 6 MHz. For example, a 5 MHz transmission centrally located within a 6 MHz channel may provide 500 kHz guard bands on each side of the signal transmission to help reduce signal leakage into adjacent channels. However, improved spectral masks and/or filtering techniques may in theory allow a signal provider to transmit a signal having a bandwidth of up to 6 MHz within the 6 MHz TVWS channel. In other countries, including many European nations, the TVWS channel bandwidth spacing is typically 8 MHz wide. Due to lax spectral leakage constraints in some regions that employ 8 MHz TVWS channel bandwidths, a signal provider may transmit a signal having a bandwidth of up to 8 MHz within the 8 MHz TVWS channel. Other locales have TVWS channel bandwidth spacings that are different than the ones described above, and may range, for example, between 4 MHz to 8 MHz, including 7 MHz.

Exemplary TVWS Preamble for 128 Point DFT Design

FIG. 3 illustrates a table featuring signal parameter values for exemplary 802.11af signals (Signal A, Signal B, Signal C, Signal D) having various bandwidths. Signal A is a 5 MHz bandwidth 802.11af signal that is derived by down-clocking a 20 MHz bandwidth 802.11ac signal by a factor of four (4). Signal B is a 5 MHz bandwidth 802.11af signal that is derived by down-clocking a 40 MHz bandwidth 802.11ac signal by a factor of eight (8). Signal C is a 6 MHz bandwidth 802.11af signal that is derived by down-clocking a 40 MHz bandwidth 802.11ac signal by a factor of 6.667 (i.e., 40÷6). Signal D is an 8 MHz bandwidth 802.11af signal that is derived by down-clocking a 40 MHz bandwidth 802.11ac signal by a factor of five (5). As illustrated, down-clocking the 20 MHz transmission by a factor of four (4) causes the cyclic prefix duration and the total symbol duration to increase by the same factor: the cyclic prefix duration increases from 0.8 μsec to 3.2 μsec, and the total symbol duration increases from 4 μsec to 16 μsec. Similarly, down-clocking the 40 MHz transmission by a factor of eight (8) causes the cyclic prefix duration to increase from 0.8 μsec to 6.4 μsec, and the total symbol duration to increase from 4 μsec to 32 μsec. Down-clocking the 40 MHz transmission by a factor of 6.667 (i.e., 40÷6) causes the cyclic prefix duration to increase from 0.8 μsec to 5.33 μsec, and the total symbol duration to increase from 4 μsec to 26.67 μsec. Down-clocking the 40 MHz transmission by a factor of five (5) causes the cyclic prefix duration to increase from 0.8 μsec to 4 μsec, and the total symbol duration to increase from 4 μsec to 20 μsec. Notwithstanding the down-clocking rate, the number of total tones making up the symbol transmissions for Signals A, B, C, and D remains constant: 64 total tones for Signal A and 128 total tones for Signals B, C, and D.

Since the typical TVWS spectrum is less than 1 GHz, and TVWS devices commonly operate in outdoor environments, TVWS transmissions are vulnerable to high delay spreads. Thus, it is desirable to have a sufficiently long cyclic prefix duration to provide sufficient protection against delay spread effects and reduce inter-symbol interference (ISI). Therefore, according to one aspect of the disclosure, down-clocking 40 MHz and 80 MHz bandwidth 802.11ac signals to generate 4 MHz to 8 MHz 802.11af signals may be preferred versus down-locking a 20 MHz bandwidth 802.11ac signal because down-clocking the 40 MHz and 80 MHz signals results in longer cyclic prefix durations. The longer cyclic prefix durations that result by down-clocking a 40 MHz 802.11ac signal by a factor between 5 and 10 and an 80 MHz 802.11ac signal by a factor between 10 and 20 to generate 4 MHz to 8 MHz 802.11af signals helps protect against delay spread effects and reduces ISI. However, as explained in greater detail herein, steps may be taken to minimize the preamble duration of the 802.11af signal as well so that the increased symbol durations of the preamble that necessarily result from large down-clocking factors do not cause an unsatisfactorily large preamble overhead.

According to one aspect of the disclosure, a "normal guard interval" may be a cyclic prefix duration 202 that is equal to $1/4^{th}$ the raw symbol duration 204. By contrast, a "short guard interval" may be a cyclic prefix duration 202 that is equal to $1/8^{th}$ the raw symbol duration 204. As one example, a 4 MHz 802.11af symbol (e.g., a payload symbol) having 128 total tones may utilize an 8 μsec cyclic prefix that serves as a normal guard interval (e.g., 32 total tones). Instead, the 4 MHz 802.11af payload symbol having 128 total tones may utilize a shorter 4 μsec cyclic prefix that serves as a short guard interval (e.g., 16 total tones). At 250 nanoseconds (ns) per sample (i.e., 1÷4 MHz), each symbol comprising 128 total tones has a duration of 32 μsec (128×250 ns). Thus, a payload 204 symbol using the normal guard interval has a total symbol duration of 40 μsec. By contrast, a payload symbol using the short guard interval has a total symbol duration of 36 μsec. As another example, a 5 MHz 802.11af payload symbol having 128 total tones may utilize a 6.4 μsec cyclic prefix that serves as a normal guard interval (e.g., 32 total tones). Instead, the 5 MHz 802.11af payload symbol having 128 total tones may utilize a shorter 3.2 μsec cyclic prefix that serves as a short guard interval (e.g., 16 total tones). At 200 nanoseconds (ns) per sample (i.e., 1÷5 MHz), each symbol comprising 128 total tones has a duration of 25.6 μsec (128×200 ns). Thus, a payload symbol using the normal guard interval has a total symbol duration of 32 μsec. By contrast, a payload symbol using the short guard interval has a total symbol duration of 28.8 μsec. As another example, a 6 MHz 802.11af payload symbol having 128 total tones may utilize a 5.333 (i.e., 16÷3) μsec cyclic prefix that serves as a normal guard interval (e.g., 32 total tones). Instead, the 6 MHz 802.11af payload symbol having 128 total tones may utilize a shorter 2.667 (i.e., 8÷3) μsec cyclic prefix that serves as a short guard interval (e.g., 16 total tones). At 166.667 nanoseconds (ns) per sample (i.e., 1÷6 MHz), each symbol comprising 128 total tones has a duration of 21.333 μsec (128×166.667 ns). Thus, a payload symbol using the normal guard interval has a total symbol duration of 26.667 μsec. By contrast, a payload symbol using the short guard interval has a total symbol duration of 24 μsec. As another example, an 8 MHz 802.11af payload symbol having 128 total tones may utilize a 4 μsec cyclic prefix that serves as a normal guard interval (e.g., 32 total tones). Instead, the 8 MHz 802.11af payload symbol having 128 total tones may utilize a shorter 2 μsec cyclic prefix that serves as a short guard interval (e.g., 16 total tones). At 125 nanoseconds (ns) per sample (i.e., 1÷8 MHz), each payload symbol comprising 128 total tones has a duration of 16 μsec (128×125 ns). Thus, a payload symbol using the normal guard interval has a total symbol duration of 20 μsec. By contrast, a symbol using the short guard interval has a total symbol duration of 18 μsec.

Figure 4:
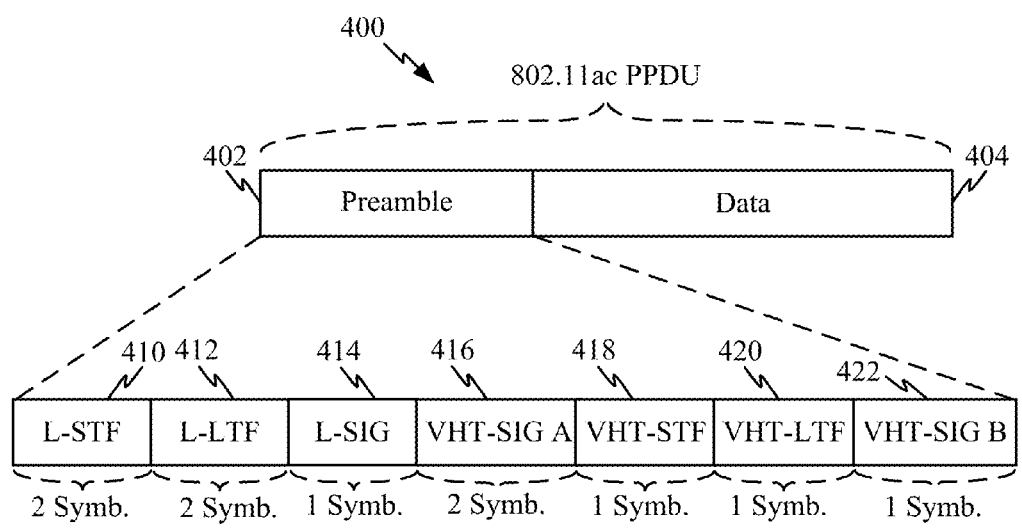
FIG. 4 illustrates an exemplary Physical Layer Convergence Protocol Packet Data Unit (PPDU) for an 802.11ac transmission.

FIG. 4 illustrates an exemplary Physical Layer Convergence Protocol Packet Data Unit (PPDU) 400 for an 802.11ac transmission. The various examples discussed herein refer to transmission, signals, and/or waveforms at a physical layer (PHY) or layer 1 of a communication protocol having multiple layers. The physical layer may define the basic networking hardware transmission technologies and/or protocol of a network. It is a fundamental layer underlying the logical data structures of the higher level functions in a network. The physical layer may define the means of transmitting raw bits rather than logical data packets over a physical link connecting network nodes. The physical layer often provides an electrical, mechanical, and/or procedural interface to the transmission medium. The shapes and properties of the electrical connectors, the frequencies to broadcast on, the modulation scheme to use and similar low-level parameters, are specified by the physical layer or layer 1.

The illustrated PPDU 400 may be used, for example, in 20, 40, 80, and 160 MHz bandwidth 802.11ac transmissions. The PPDU 400 comprises a preamble portion 402 and a data portion 404. The preamble 402 may comprise a legacy short training field (L-STF) 410, a legacy long training field (L-LTF) 412, a legacy signal (L-SIG) field 414, a very high throughput signal A (VHT-SIG A) field 416, a very high throughput short training field (VHT-STF) 418, a very high throughput long training field (VHT-LTF) 420, and a very high throughput signal B (VHT-SIG B) field 422. According to one example, the L-STF 410 is 2 OFDM symbols, the L-LTF 412 is 2 OFDM symbols, the L-SIG field 414 is 1 OFDM symbol, the VHT-SIG A field 416 is 2 OFDM symbols (e.g., VHT-SIG A1 and VHT-SIG A2), the VHT-STF 418 is 1 OFDM symbol, the VHT-LTF 420 is 1 OFDM symbol, and the VHT-SIG B field 422 is 2 OFDM symbols in duration.

The L-STF 410, L-LTF 412, L-SIG 414, and VHT-SIG A 416 fields may be transmitted in an omni-directional fashion, whereas the VHT-STF 418, VHT-LTF 420, and VHT-SIG B fields 422 may be beam-formed or spatial division multiple access (SDMA) precoded. It should be noted that the L-STF 410, the L-LTF 412, the L-SIG 414, and the VHT-SIG A field 416 may be decoded by legacy devices (e.g., devices that comply with legacy or earlier specifications such as 802.11a, 802.11n, etc.), whereas the other fields 418, 420, 422 may be decoded by some 802.11ac devices. The L-STF 410 and VHT-STF 418 includes patterns that repeat a predefined number of times and may be used for fast gain control, timing offset estimation, and frequency offset estimation. The L-LTF 412 and VHT-LTF 420 are used for channel estimation and fine frequency acquisition. The SIG field 414 may indicate the data rate of the transmission, the length of the remaining data in the PPDU or frame, and/or how long the transmission will occupy the wireless medium so that, for example, some devices can defer their transmissions for an accurate amount of time.

FIG. 5 illustrates a table 600 of exemplary parameters/characteristics of an L-STF 410 for a 20, 40, 80, or 160 MHz 802.11ac transmission. As discussed above, the L-STF 410 may be two (2) OFDM symbols long. Every fourth tone of the L-STF 410 symbol may be populated in the frequency domain so that a pattern in the time domain results having a repetition interval equal to 800 nanoseconds (ns). Thus, each 4 μsec L-STF 410 OFDM symbol (including the cyclic prefix) may include five (5) repetitions of the STF pattern so that there are ten (10) total repetitions (i.e., short symbols) of the STF pattern across the two L-STF 410 symbols.

FIG. 6 illustrates an exemplary table 600 that shows data tone and bit information for some preamble fields for a 40 MHz bandwidth 802.11ac transmission. As shown, although the 40 MHz transmission utilizes 96 data tones to transmit each L-SIG field 414 and VHT-SIG A field 416 symbol, only 48 data tones are used to transmit a maximum of 24 unique data bits (using binary phase-shift keying (BPSK) and ½ rate coding, for example) in each 20 MHz bandwidth sub-band of the 40 MHz bandwidth composite transmission. That is, when a 40 MHz 802.11ac signal is transmitted, the contents of the L-SIG 414 and VHT-SIG A 416 fields (the same is true for the L-STF 410 and L-LTF 412) are copied and scaled by a complex number to each 20 MHz sub-band of the 40 MHz signal. Thus, even though the 40 MHz transmission has a total number of tones that is twice that of a 20 MHz transmission, it can only transmit unique L-SIG field 414 and VHT-SIG A field 416 information on 48 data tones. For example, if 24 bits are used to encode the L-SIG field 414 information in 48 data tones, each 20 MHz sub-band of the 40 MHz signal will include the same 24 bits of information. Similarly, 80 MHz and 160 MHz bandwidth 802.11ac transmissions replicate the same L-STF 410, L-LTF 412, L-SIG 414, and VHT-SIG A field 416 information in four (4) and eight (8) 20 MHz sub-bands, respectively. The reason the information is replicated in each 20 MHz sub-band is for co-existence of legacy devices (e.g., 802.11a, 802.11n, etc.). That is, 802.11a and/or 802.11n legacy devices that can only receive data within a 20 MHz signal can still receive and decode the preamble information contained in a 20 MHz sub-band.

Figures 7, 8:
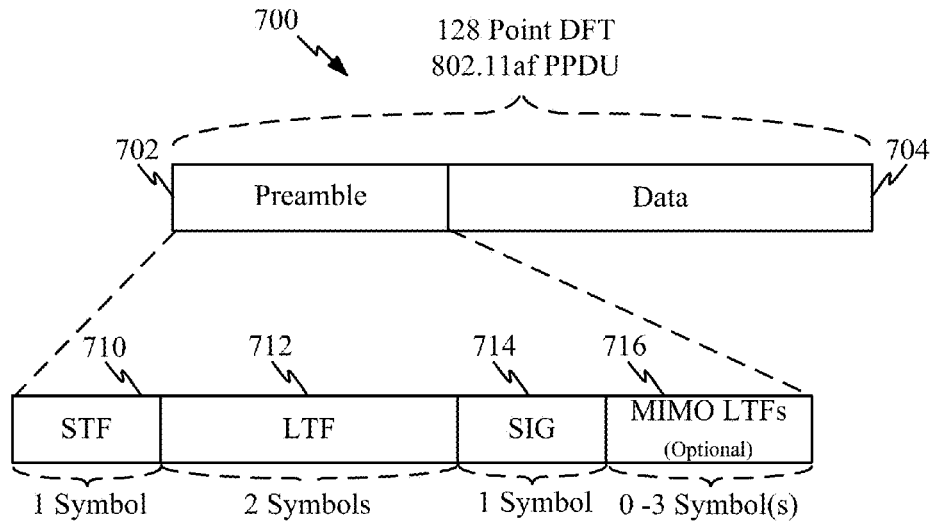
FIG. 7 illustrates an exemplary PPDU for an 802.11af transmission based on a 128-point discrete Fourier transform (DFT) design.
FIG. 8 illustrates a table of exemplary parameters/characteristics of the STF for a 4 MHz to 8 MHz bandwidth 802.11af transmission based on a 128 point DFT.

FIG. 7 illustrates an exemplary PPDU 700 for an 802.11af transmission based on a 128-point discrete Fourier transform (DFT) (e.g., herein the DFT may be implemented using a fast Fourier transform (FFT)) design according to one aspect of the disclosure. The PPDU 700 may be used, for example, in 4-8 MHz bandwidth 802.11af transmissions that are generated by down-clocking, for example, a 40 MHz 802.11ac transmission. According to one aspect, the PPDU 700 is for single user (SU) transmissions. The PPDU 700 comprises a preamble portion 702 and a data portion 704. The preamble 702 may comprise a short training field (STF) 710, a long training field (LTF) 712, and a signal (SIG) field 714. Optionally, the preamble 702 may also comprise one or more multiple input multiple output (MIMO) long training fields 716 for additional spatial streams. The LTF 712 corresponds to one spatial stream. Each additional spatial stream (if any) requires its own separate LTF. Thus, a four spatial stream transmission would have the LTF 712 and three additional MIMO LTFs 716. Notably, the STF 710, the LTF 712, the SIG field 714, and the MIMO LTFs 716 may be transmitted in an omni-directional fashion, for example, to a single user receiving station.

According to one example, the STF 710 is 1 OFDM symbol, the LTF 712 is 2 OFDM symbols, and the SIG field 714 is 1 OFDM symbol in duration. The STF 710 is a pattern that repeats a predefined number of times and may be used for fast gain control, timing offset estimation, and frequency offset estimation. The LTF 712 may be used for channel estimation and fine frequency acquisition. The SIG field 714 may indicate the total amount of data (e.g., bytes, bits, etc.) in the PPDU 700, the amount of data remaining in the PPDU 700, or the amount of data in the payload portion 704 of the PPDU 700. Alternatively, the SIG field 714 may indicate the data rate of the PPDU 700. In another aspect, the SIG field 714 may indicate the total length of time (e.g., in seconds, in number of symbols, etc.) of the PPDU 700, the length of time remaining in the PPDU 700, or the length of time of the payload portion 704. The MIMO LTFs 716 symbols provide channel estimation and fine frequency acquisition for each additional (if any) spatial streams. Specifically, there may be one MIMO LTF 716 symbol for 1 additional spatial stream, and three MIMO LTF 716 symbols for two or three additional spatial streams.

As stated above, the PPDU 700 may be based on a 128-point FFT design and the bandwidth of the transmission may range, for example, from 4 MHz to 8 MHz, which leads to a sample duration range of 250 ns (i.e., 1÷4 MHz) to 125 ns (i.e., 1÷8 MHz). For example, a 5 MHz transmission will have 200 ns samples. A 5 MHz bandwidth 802.11af PPDU 700 may be obtained by down-clocking a 40 MHz 802.11ac transmission by a down-clock factor of eight (8). A 6 MHz bandwidth 802.11af PPDU 700 may be obtained by down-clocking a 40 MHz 802.11ac transmission by a down-clock factor of 6.667 (i.e., 40÷6). An 8 MHz bandwidth 802.11af PPDU 700 may be obtained by down-clocking a 40 MHz 802.11ac transmission by a down-clock factor of five (5). Generally, an 802.11af PPDU 700 having a bandwidth X MHz may be obtained by down-clocking a 40 MHz bandwidth 802.11ac transmission by a down-clock factor of 40÷X. In one aspect of the disclosure, the value X may be any value between 4 and 8. For example, a 5.5 MHz bandwidth 802.11af PPDU 700 may be obtained by down-clocking a 40 MHz 802.11ac transmission by a down-clock factor of 7.27 (i.e., 40÷5.5).

FIG. 8 illustrates a table 800 of exemplary parameters/characteristics of the STF 710 for a 4 MHz to 8 MHz bandwidth 802.11af transmission based on a 128 point DFT (e.g., FFT) design according to one aspect of the disclosure. The STF 710 should have a repetition interval that allows a receive gain control algorithm to quickly measure the received signal strength, and also enough repetitions to ensure an accurate detection of the PPDU 700. However, the total time duration of the STF 710 should not be unnecessarily long (i.e., longer than necessary to ensure accurate PPDU 700 detection) so that the preamble 702 duration and preamble overhead are kept low. As shown in FIG. 3, if a 20 MHz bandwidth 802.11ac signal is down-clocked by a factor of four (4) to generate a 5 MHz bandwidth 802.11af signal, the total symbol duration for each symbol will increase in time from, for example, 4 μsec to 16 μsec. Since an 802.11ac signal has two L-STF 410 symbols (See FIG. 4), the total time duration of the L-STF 410 will increase from, for example, 8 μsec to 32 μsec. Similarly, down-clocking a 40 MHz bandwidth 802.11ac signal by a factor of eight (8) to generate a 5 MHz 802.11af signal will cause the total time duration of the L-STF 410 to increase from, for example, 8 μsec to 64 μsec. However, a 64 μsec STF duration may be unnecessarily long for a 5 MHz signal because the time duration of the STF needed for accurate PPDU detection is a function of the bandwidth. Thus, in this example a 32 μsec STF time duration may still be satisfactory for the 5 MHz bandwidth 802.11af signal. Therefore, according to one aspect, the number of OFDM symbols used in the STF 710 of the preamble 702 is reduced from two (2) symbols to just one (1) symbol so that the STF time duration needed for accurate PPDU detection does not increase to an unnecessarily long value (e.g., twice as long as needed), and the preamble overhead for the 802.11af PPDU 700 is minimized.

Moreover, a typical 802.11ac signal transmission includes 5 repetitions (i.e., short symbols) of a sequence/pattern in each STF symbol so that there are 10 total short symbols present in the STF 710. According to one aspect, to maintain the same number of total STF sequence repetitions in the single STF 710 symbol of the PPDU 700 as the two STF 410 symbols of the PPDU 400, every eighth tone of the STF 710 symbol may be populated in the frequency domain. Populating every eighth tone results in a repetition pattern in the time domain having eight repetition intervals in STF 710 raw symbol. For 802.11af transmissions having a cyclic prefix duration 202 equal to $\frac{1}{4}^{th}$ the raw symbol duration 204 (i.e., normal guard interval), the STF 710 OFDM symbol (including the cyclic prefix) may thus have 10 repetitions (i.e., short symbols) of the STF pattern in one OFDM symbol.

An 802.11af STF 710 symbol transmission based on a 128 point DFT (e.g., FFT) design having a bandwidth ranging from 4 MHz to 8 MHz where every eighth tone is populated will have an STF repetition interval ranging from 4 μsec (i.e., (128 samples÷8)×250 ns per sample) to 2 μsec (i.e., (128 samples÷8)×125 ns per sample), respectively. For example, a 5 MHz bandwidth 802.11af transmission will have an STF 710 symbol that has a repetition interval equal to 3.2 μsec. As another example, a 5.5 MHz bandwidth 802.11af transmission will have an STF 710 symbol that has a repetition interval of approximately 2.909 μsec. A 6 MHz bandwidth 802.11af transmission will have an STF 710 symbol that has a repetition interval of approximately 2.667 μsec. The total time duration of the STF 710 may be 20 μsec for an 8 MHz bandwidth 802.11af PPDU 700. The total time duration of the STF 710 may be 40 μsec for a 4 MHz bandwidth 802.11af PPDU 700. Thus, the STF 710 total time duration may range from 20 μsec to 40 μsec. According to another aspect, every sixteenth tone may be populated of the STF 710 symbol.

According to one aspect of the disclosure, the STF 710 may include 2 symbols, each having 10 short symbols. According to another aspect, every fourth tone of the STF 710 may be populated so that each STF 710 symbol includes just 5 short symbols. In such a case, the STF 710 may include 2 symbols so that the STF 710 has a total of 10 short symbols.

Figure 9:
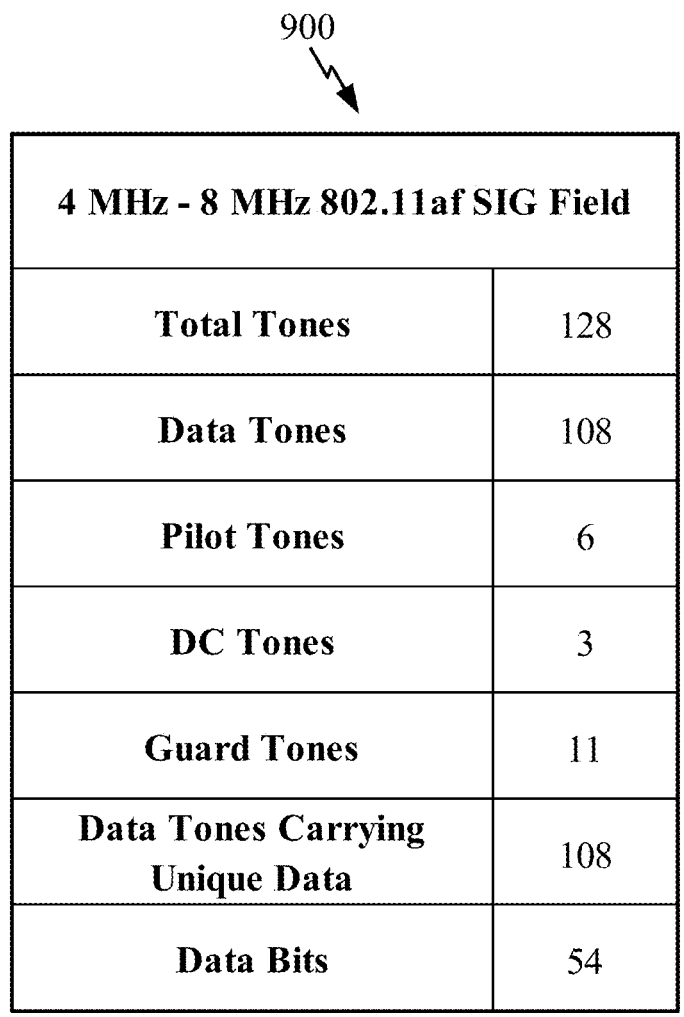
FIG. 9 illustrates an exemplary table that shows tone and bit information for the SIG field for a 4 MHz to 8 MHz bandwidth 802.11af transmission based on a 128 point DFT design.

FIG. 9 illustrates an exemplary table 900 that shows tone and bit information for the SIG field 714 for a 4 MHz to 8 MHz bandwidth 802.11af transmission based on a 128 point DFT (e.g., FFT) design according to one aspect. In the illustrated example, the single symbol SIG field 714 features 108 data tones, 6 pilot tones, 3 DC tones, and 11 guard tones (e.g., 6 tones on one side of the transmission bandwidth and 5 tones on the other side). Unlike the L-SIG field 414 and VHT-SIG A field 416 of the 40 MHz bandwidth 802.11ac signal discussed above with respect to FIG. 6, the SIG field 714 information does not have to be copied and repeated in any sub-bands of the 4-8 MHz bandwidth 802.11af transmission because coexistence with legacy devices that are only capable of decoding a sub-band of the composite transmission is not a concern here. Thus, the 802.11af transmission may utilize the entire 128 total tone range to generate the SIG field 714. This allows the SIG field 714 to utilize 108 data tones to transmit unique bits of information in a single OFDM symbol, whereas the L-SIG field 414 and VHT-SIG A field 416 are restricted to using 48 data tones to transmit unique bits of information in a single OFDM symbol. According to one aspect, using BPSK and ½ rate coding allows the SIG field 714 to transmit 54 bits of information over 108 data tones in a single OFDM symbol, whereas the L-SIG field 414 and VHT-SIG A field 416 are restricted to transmitting 24 bits of information over 48 data tones. Thus, much of the same type of data that is transmitted in three (3) OFDM symbols in the L-SIG field 414 and the VHT-SIG A field 416 of 802.11ac transmissions may be transmitted in the single SIG field 714 for 802.11af transmissions. This further reduces the preamble overhead for the 802.11af PPDU 700. It should be noted that although BPSK and ½ rate coding is used as an example herein, other modulation schemes and/or coding rates may be used in a accordance with the systems and methods herein, which may allow for different numbers of bits to be included in each symbol.

Like the SIG field 714, the LTF 712 symbol and the MIMO LTFs 716 may also utilize 108 data tones, 6 pilot tones, 3 DC tones, and 11 guard tones (e.g., 6 tones on one side of the transmission bandwidth and 5 tones on the other side).

According to one aspect of the disclosure, the number of data tones out of the number of total tones available in the SIG field 714 symbol is not limited to 108 data tones. Specifically, the number of data tones may less or more than 108. For example, according to one aspect of the disclosure, 49 data tones or more out of the 128 total tones may be utilized to transmit SIG field 714 information (e.g., a portion of the data shown in FIG. 12, including an amount of data or length of time remaining for transmission of the PPDU 700 and/or payload 704). According to one aspect, the number of data tones used to transmit or receive SIG field 714 information may be 39% or more of the number of total data tones available (e.g., 128 total tones). According to another aspect, the number of data tones used to transmit or receive SIG field 714 information may be 50%, 60%, 70%, 80%, or 90% of the number of total data tones available (e.g., 128 total tones). According to another aspect, the number of data tones used to transmit or receive SIG field 714 information may be 60% or more of the number of total data tones available (e.g., 128 total tones). According to yet another aspect, the number of data tones used to transmit or receive SIG field 714 information may be 70% or more of the number of total data tones available (e.g., 128 total tones). According to yet another aspect, the number of data tones used to transmit or receive SIG field 714 information may be 80% or more of the number of total data tones available (e.g., 128 total tones).

In this fashion, the preamble (e.g., the STF 710, the LTF 712, and the SIG field 714) for the 802.11af PPDU 700 only requires four (4) OFDM symbols for a single user, single spatial stream. By contrast, the preamble (e.g., L-STF 410, L-LTF 412, L-SIG field 414, VHT-SIG A field 416, VHT-STF 418, VHT-LTF 420, and VHT-SIG-B 422) of the corresponding 802.11ac PPDU 400 requires ten (10) OFDM symbols. The reduced preamble overhead of the 802.11af PPDU allows more data to be transmitted within the data portion 704 of the 802.11af PPDU for a given 802.11af transmission. Generally, an X MHz bandwidth 802.11af PPDU 700 based on a 128 point DFT having four (4) preamble symbols (e.g., the STF 710, the LTF 712, and the SIG field 714) may have a total preamble duration equal to $4 \times ((32+128) \times (1 \div X))$ μsec (where X may be, for example, any value between 4 and 10). Thus, according to one aspect, a 5 MHz bandwidth 802.11af PPDU 700 based on a 128 point DFT having four (4) preamble symbols (e.g., the STF 710, the LTF 712, and the SIG field 714) has a total preamble duration of 128 μsec. According to another aspect, a 6 MHz bandwidth 802.11af PPDU 700 having four (4) preamble symbols (e.g., the STF 710, the LTF 712, and the SIG field 714) has a total preamble duration of 106.67 μsec. According to another aspect, an 8 MHz bandwidth 802.11af PPDU 700 having four (4) preamble symbols (e.g., the STF 710, the LTF 712, and the SIG field 714) has a total preamble duration of 80 μsec. Thus, the total 4 symbol preamble duration for a 4 MHz to 8 MHz 802.11af PPDU 700 may range from 80 μsec to 160 μsec.

Figures 10, 11:
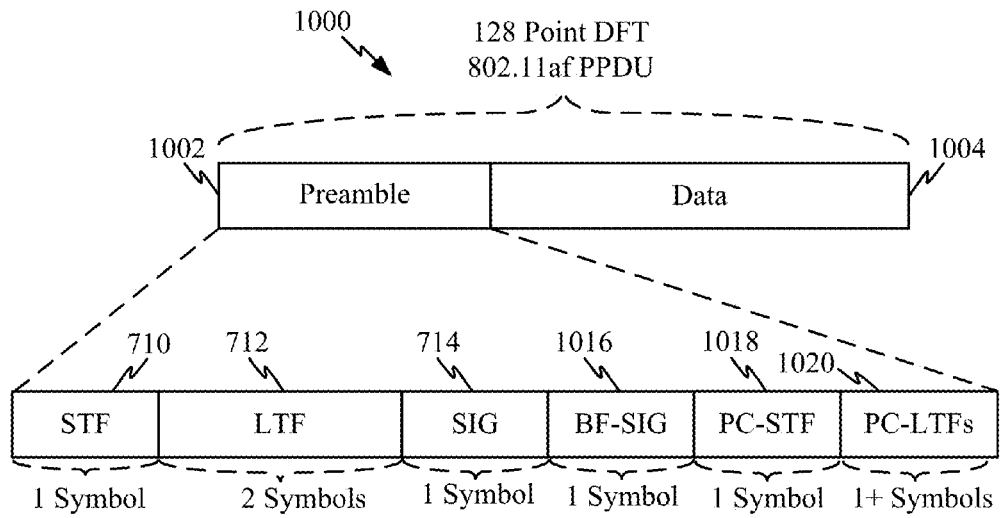
FIG. 10 illustrates an exemplary PPDU for an 802.11af transmission based on a 128 point DFT (e.g., FFT) design.
FIG. 11 illustrates an exemplary table that shows tone and bit information for the BF-SIG field for a 4 MHz to 8 MHz bandwidth 802.11af transmission based on a 128 point DFT design.

FIG. 10 illustrates an exemplary PPDU 1000 for an 802.11af transmission based on a 128 point DFT (e.g., FFT) design according to one aspect of the disclosure. According to one aspect, the PPDU 1000 may be used for multi-user 802.11af transmissions or single user (SU) beamformed 802.11af transmissions. The PPDU 1000 may be used, for example, in 4-8 MHz bandwidth 802.11af transmissions that are generated by down-clocking, for example, a 40 MHz 802.11ac signal. The PPDU 1000 comprises a preamble portion 1002 and a data portion 1004. The preamble 1002 may comprise the short training field (STF) 710, the long training field (LTF) 712, and the signal (SIG) field 714 as described above with respect to FIG. 7. However, in this example, the PPDU 1000 may further comprise a beamformed signal field (BF-SIG) 1016, a precoded short training field (PC-STF) 1018, and one or more precoded long training fields (PC-LTF) 1020. While the BF-SIG field 1016 is transmitted in an omnidirectional fashion so that it may be decoded by all the 802.11af devices within range, the PC-STF 1018 and the PC-LTF 1020 are beamformed transmissions and/or SDMA precoded so that they are only decoded by the 802.11af devices for which they are associated with. According to one aspect of the disclosure, the BF-SIG field 1016 may be absent in single user (SU) beamformed modes, but the PPDU 1000 may still include the PC-STF 1018 and a PC-LTF 1020.

According to one example, the BF-SIG field 1016 is 1 OFDM symbol, the PC-STF 1018 is 1 OFDM symbol, and the PC-LTF 1020 is also 1 OFDM symbol per PC-LTF 1020 field. There may be one or more PC-LTF 1020 fields as a function of the number of spatial streams. The BF-SIG field 1016 contains additional signal information about the characteristics of the beamformed PPDU 1000. The PC-STF 1018 includes a pattern that repeats a predefined number of times and may be used for fast gain control, timing offset estimation, and frequency offset estimation. The PC-LTF 1020 may be used for channel estimation and fine frequency acquisition. Thus, the PC-STF 1018 and the PC-LTF 1020 are similar to the VHT-STF 418 and VHT-LTF 420.

The PPDU 1000 may be based on a 128-point FFT design, and the bandwidth of the transmission may range, for example, from 4 MHz to 8 MHz, which leads to a sample duration range of 250 ns to 125 ns. A 5 MHz bandwidth 802.11af PPDU 1000 may be obtained by down-clocking a 40 MHz 802.11ac transmission by a down-clock factor of eight (8). A 6 MHz bandwidth 802.11af PPDU 1000 may be obtained by down-clocking a 40 MHz 802.11ac transmission by a down-clock factor of 6.667 (i.e., 40÷6). An 8 MHz bandwidth 802.11af PPDU 1000 may be obtained by down-clocking a 40 MHz 802.11ac transmission by a down-clock factor of five (5). Generally, an 802.11af PPDU 1000 having a bandwidth X MHz may be obtained by down-clocking a 40 MHz bandwidth 802.11ac transmission by a down-clock factor of 40÷X. In one aspect of the disclosure, the value X may be any value between 4 and 10. For example, a 5.5 MHz bandwidth 802.11af PPDU 1000 may be obtained by down-clocking a 40 MHz 802.11ac transmission by a down-clock factor of 7.27 (i.e., 40÷5.5).

FIG. 11 illustrates an exemplary table 1100 that shows tone and bit information for the BF-SIG field 1016 for a 4 MHz to 8 MHz bandwidth 802.11af transmission based on a 128 point DFT (e.g., FFT) design according to one aspect. In the illustrated example, the single symbol BF-SIG field 1016 features 108 data tones, 6 pilot tones, 3 DC tones, and 11 guard tones (e.g., 6 tones on one side of the transmission bandwidth and 5 tones on the other side). Unlike the L-SIG field 414 and VHT-SIG A field 416 of the 40 MHz bandwidth 802.11ac signal discussed above with respect to FIG. 6, the BF-SIG field 1016 information does not have to be copied and repeated in any sub-bands of the 4-8 MHz bandwidth 802.11af transmission because coexistence with legacy devices that are only capable of decoding a sub-band of the composite transmission is not a concern here. Thus, the 802.11af transmission may utilize the entire 128 total tone range to generate the BF-SIG field 1016. According to one aspect, BPSK and ½ rate coding allows the BF-SIG field 1016 to transmit up to 54 bits of information over 108 data tones in a single OFDM symbol. It should be noted that although BPSK and ½ rate coding is used as an example herein, other modulation schemes and/or coding rates may be used in a accordance with the systems and methods herein, which may allow for different numbers of bits to be included in each symbol.

According to one aspect of the disclosure, the number of data tones out of the number of total tones available in the BF-SIG field 1016 symbol is not limited to 108 data tones. Specifically, the number of data tones may less or more than 108. For example, according to one aspect of the disclosure, 49 data tones or more out of the 128 total tones may be utilized to transmit BF-SIG field 1016 information (e.g., a portion of the data shown in FIG. 13). According to one aspect, the number of data tones used to transmit or receive BF-SIG field 1016 information may be 39% or more of the number of total data tones available (e.g., 128 total tones). According to another aspect, the number of data tones used to transmit or receive BF-SIG field 1016 information may be 50% or more of the number of total data tones available (e.g., 128 total tones). According to another aspect, the number of data tones used to transmit or receive BF-SIG field 1016 information may be 60%, 70%, 80%, 90% or more of the number of total data tones available (e.g., 128 total tones). According to yet another aspect, the number of data tones used to transmit or receive BF-SIG field 1016 information may be 70% or more of the number of total data tones available (e.g., 128 total tones). According to yet another aspect, the number of data tones used to transmit or receive BF-SIG field 1016 information may be 80% or more of the number of total data tones available (e.g., 128 total tones).

Much like the STF 710 described above, every eighth tone of the PC-STF 1018 symbol may be populated to generate a repetition pattern that repeats ten (10) times within a single OFDM symbol. Like the SIG field 714 and the BF-SIG field 1016, the PC-LTF 1020 OFDM symbols may also utilize 108 data tones, 6 pilot tones, 3 DC tones, and 11 guard tones (e.g., 6 tones on one side of the transmission bandwidth and 5 tones on the other side).

In this fashion, the preamble (e.g., the STF 710, the LTF 712, the SIG field 714, the BF-SIG 1016, the PC-STF 1018, and one PC-LTF 1020) for the 802.11af PPDU 1000 may only require seven (7) OFDM symbols (in the case of a single PC-LTF 1020). By contrast, the preamble (e.g., L-STF 410, L-LTF 412, L-SIG field 414, VHT-SIG A field 416, VHT-STF 418, VHT-LTF 420, VHT-SIG B 422) of a 802.11ac PPDU 400 requires ten (10) OFDM symbols (in the case of a single VHT-LTF 422). The reduced preamble overhead (e.g., reduced preamble 1002 duration) of the 802.11af PPDU 1000 allows more data to be transmitted within the data portion 1004 of the 802.11af PPDU 1000 for a given 802.11af frame transmission. Generally, an X MHz bandwidth 802.11 PPDU 1000 having seven (7) preamble symbols (e.g., the STF 710, the LTF 712, the SIG field 714, the BF-SIG field 1016, the PC-STF 1018, and one PC-LTF 1020) may have a total preamble duration equal to $7 \times ((32+128) \times (1 \div X))$ μsec, where X may be a value between 4 and 10. Thus, according to one aspect, a 5 MHz bandwidth 802.11af PPDU 1000 having seven (7) preamble symbols (e.g., the STF 710, the LTF 712, the SIG field 714, the BF-SIG field 1016, the PC-STF 1018, and one PC-LTF 1020) has a total preamble duration of 224 μsec. According to another aspect, a 6 MHz bandwidth 802.11af PPDU 1000 having seven (7) preamble symbols has a total preamble duration of 186.667 μsec. According to yet another aspect, an 8 MHz bandwidth 802.11af PPDU 1000 having seven (7) preamble symbols has a total preamble duration of 140 μsec. Thus, the total 7 symbol preamble duration for a 4 MHz to 8 MHz 802.11af PPDU 1000 may range from 140 μsec to 280 μsec using a normal guard interval cyclic prefix.

FIG. 12 illustrates a table 1200 showing exemplary bit fields of a SIG field 714 according to one aspect of the disclosure. In the illustrated example, the SIG field 714 may comprise a 16 to 18 bit Payload Length field 1202, a 2 bit Bandwidth field 1204, a 4 bit Modulation and Coding Scheme (MCS) field 1206, a 2 bit Number of Space Time Streams (NSTS) field 1208, a 1 bit Beamforming field 1210, a 1 bit Space Time Block Coding (SRBC) field 1212, a 1 bit Aggregation field 1214, a 1 bit Short Guard Interval (SGI) field 1216, a Cyclic Redundancy Check (CRC) field 1218, a 6 bit Tail field 1220, and/or a 14 to 16 bit Reserved field 1222. The Payload Length field 1202 specifies how many bytes the payload (i.e., data portion 704, 1004) includes or how long in time the payload lasts. This serves to inform non-intended receivers of the PPDU 700, 1000 to stay off the transmission medium used to transmit the PPDU 700, 1000 for an amount of time equal to how long it will take to transmit the payload. It also serves to inform intended receivers how long in time or how many bytes they need to decode of the payload portion. The Bandwidth field 1204 indicates the bandwidth of the 802.11af transmission (e.g., 4 MHz, 5 MHz, 5.5 MHz, 6 MHz, 8 MHz, etc.). The MCS field 1206 indicates the type of modulation (e.g., Binary Phase Shift Keying (BPSK), QBPSK (i.e., BPSK rotated by 90 degrees), Quadrature Phase Shift Keying (QPSK), 8-QAM (Quadrature Amplitude Modulation), 16-QAM, 64-QAM, etc.) and the coding rate scheme (e.g., ½, ⅔, ¾, ⅚, ⅞, etc.) used for the PPDU 700, 1000. The NSTS field 1208 indicates the number of space time streams (also referred to herein as "spatial streams") for the PPDU 700, 1000, which may be a value, of 1, 2, 3, or 4.

The Beamforming field 1210 indicates whether the PPDU 700, 1000 includes a beamformed transmission. For example, an active bit for the Beamforming field 1210 may indicate that a BF-SIG field 1016 is to follow in the PPDU 1000. Thus, for single user beamforming (SU-BF) modes and multi-user MIMO (MU-MIMO) modes the Beamforming field 1210 may be set to ON/active. In other aspects of the disclosure, the SIG field 714 may be modulated using QBPSK (which is BPSK rotated by 90 degrees) to indicate the presence of the BF-SIG field 1016. In such a case, the Beamforming field 1210 is not needed. By changing the anticipated modulation scheme of the SIG field 714 from BPSK to QBPSK to indicate the presence of the BF-SIG field 1016, the receiver of the PPDU 1000 may have earlier knowledge as to whether to expect a BF-SIF field 1016 (e.g., as in PPDU 1000) or a MIMO LTF 716 (if any) (e.g., as in PPDU 700). Signal buffering may also be reduced at the receiver by such a scheme.

The STBC field 1212 indicates whether space time block coding is enabled for the PPDU 700, 1000. The Aggregation field 1214 indicates whether Media Access Control (MAC) level aggregation is being used. This indicates whether the payload (e.g., data portion 704, 1004) of the PPDU 700, 1000 is an aggregate MAC layer protocol data unit (AMPDU) that includes multiple PPDUs in the payload separated by delimiters. The SGI field 1216 indicates whether the PPDU 700, 100 is using symbols having a short guard interval (SGI field 1216 is ON/active) or a normal guard interval (SGI field 1216 is OFF/inactive). The CRC field 1218 includes bits used for cyclic redundancy check to determine the presence of errors for the PPDU 700, 1000. The Tail field 1220 includes bits to flush out the decoder at the receiver. The Reserved field 1222 includes bits that may indicate other parameters of the PPDU 700, 1000 and/or payload 704, 1004, and/or indicates future modes.

FIG. 13 illustrates a table 1300 showing exemplary bit fields of a BF-SIG field 1016 according to one aspect of the disclosure. In the illustrated example, the BF-SIG field 1016 may comprise an 8 bit NSTS field 1302, a 6 bit Group ID (GID) field 1304, a 16 bit Modulation and Coding Scheme (MCS) field 1306, a 6 bit Tail field 1308, and an 18 bit Reserved field 1310. The NSTS field 1302 specifies the number of spatial streams per user (e.g., up to four users, each user associated with 2 of the 8 bits that indicate the number of spatial streams for that user) for the PPDU 1000. The GID field 1304 indicates the group identifier to which a plurality of receivers (e.g., receiving stations) may be associated with. The MCS field 1306 indicates the type of modulation (e.g., BPSK, QBPSK, QPSK, 8-QAM, 16-QAM, 64-QAM, etc.) and the coding rate scheme (e.g., ½, ⅔, ¾, ⅚, ⅞, etc.) used for each of the users (e.g., four users, 4 bits of the 16 bits each associated with a user to indicate the modulation and coding rate used) for the PPDU 1000. That is, each user receives its own modulation and coding rate scheme because the BF-SIG field 1016 is precoded for each user. Therefore, the users do not receive the modulation and coding rate schemes associated with the other users, just their own. The Tail field 1308 includes bits to flush out the decoder at the receiver. The Reserved field 1310 includes bits that may indicate other parameters of the PPDU 1000 and/or payload 1004, and/or indicates future modes.

According to one aspect of the disclosure, the BF-SIG field 1016 may be included in the PPDU 700 shown in FIG. 7. In that case, the BF-SIG field 1016 may come after the SIG field 714 but before the MIMO LTF 716. According to one aspect, the SIG field 714 and the BF-SIG field 1016 in the PPDU 1000 may be encoded together. In another aspect of the disclosure, the SIG field 714 and the BF-SIG field 1016 in the PPDU 1000 may be independently encoded such that the SIG field 714 may be decoded before the BF-SIG field 1016. Some of the bits in the Reserved field 1222 of the SIG field 714 may be used to indicate additional modes so that the preamble 1004 may include additional fields that come after the BF-SIG field 1016. The additional fields may indicate additional parameters associated with the PPDU 1000 and/or the payload 1004.

Figure 14:
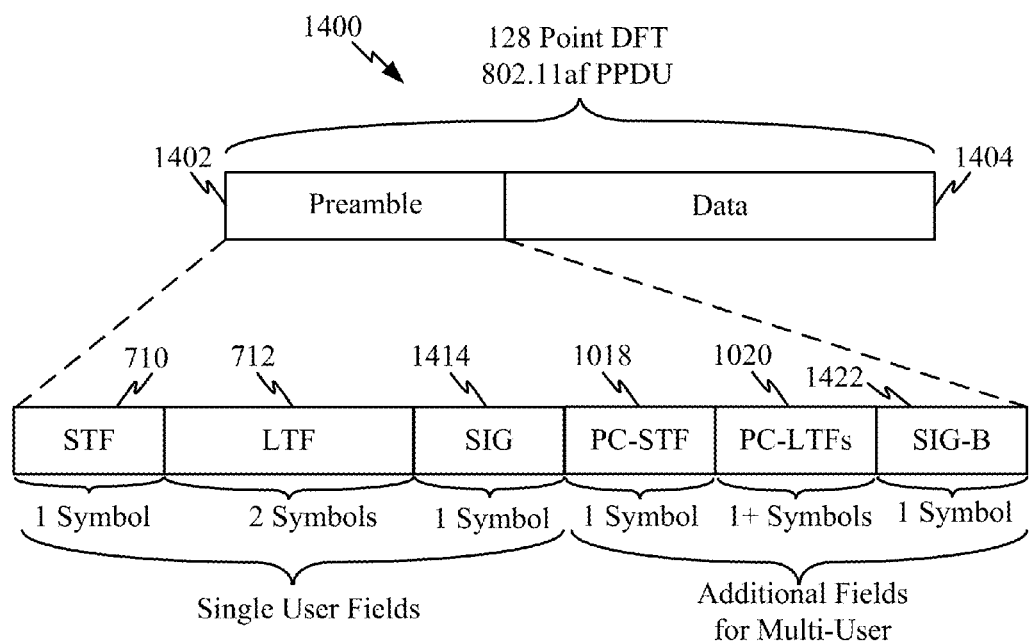
FIG. 14 illustrates an exemplary PPDU for an 802.11af transmission based on a 128 point DFT (e.g., FFT) design.

FIG. 14 illustrates an exemplary PPDU 1400 for an 802.11af transmission based on a 128 point DFT (e.g., FFT) design according to one aspect of the disclosure. According to one aspect, the PPDU 1400 may be used for either a single user (SU), single user beamformed (SU-BF), or multi-user (MU) 802.11af transmission. The PPDU 1400 may be used, for example, in 4-8 MHz bandwidth 802.11af transmissions that are generated by down-clocking, for example, a 40 MHz 802.11ac signal. The PPDU 1400 comprises a preamble portion 1402 and a data portion 1404. The preamble 1402 comprises the short training field (STF) 710, the long training field (LTF) 712, a signal (SIG) field 1414, the PC-STF 1018, one or more PC-LTFs 1020, and a signal B (SIG-B) field 1422. The STF 710 and the LTF 712 may be implemented as described above with respect to the PPDU 700 of FIG. 7. The PC-STF 1018 and the PC-LTF 1020 may be implemented as described above with respect to the PPDU 1000 of FIG. 10.

The SIG field 1414 serves to indicate many of the SU parameters indicated by the SIG field 714 of the PPDU 700 and MU parameters indicated by the BF-SIG field 1016 of the PPDU 1000 in a single OFDM symbol to minimize preamble overhead. According to one aspect, the SIG field 1414 may be transmitted in an omni-directional fashion so that it may be decoded by all the 802.11af devices within range. Like the PC-STF 1018 and the PC-LTF 1020, the SIG-B field 1422 may be SDMA precoded so that it is only decodable by the intended user/receiver associated with the SDMA code. In one example, the SIG field 1414 is comprised of a single OFDM symbol having 108 data tones, 6 pilot tones, 3 DC tones, and 11 guard tones (e.g., zero tones). The SIG field 1414 may be modulated using, for example, BPSK or QBPSK, and may have a coding rate of ½ so that it may carry 54 bits of data across its 108 data tones. Other modulation types and coding rate schemes may be used. In one aspect, the SIG field 1414 may be modulated using BPSK to indicate that the PPDU 1400 transmission is an SU transmission. In another aspect, the SIG field 1414 may be modulated using QBPSK to indicate that the PPDU 1400 transmission is an MU transmission or BF-SU transmission.

According to one aspect of the disclosure, the number of data tones out of the number of total tones available in the SIG field 1414 symbol is not limited to 108 data tones. Specifically, the number of data tones may less or more than 108. For example, according to one aspect of the disclosure, 49 data tones or more out of the 128 total tones may be utilized to transmit SIG field 1414 information (e.g., a portion of the data shown in FIG. 15, including an amount of data or length of time remaining for transmission of the PPDU 1400 and/or payload 1404). According to one aspect, the number of data tones used to transmit or receive SIG field 1414 information may be 39% or more of the number of total data tones available (e.g., 128 total tones). According to another aspect, the number of data tones used to transmit or receive SIG field 1414 information may be 50% or more of the number of total data tones available (e.g., 128 total tones). According to another aspect, the number of data tones used to transmit or receive SIG field 1414 information may be 60% or more of the number of total data tones available (e.g., 128 total tones). According to yet another aspect, the number of data tones used to transmit or receive SIG field 1414 information may be 140% or more of the number of total data tones available (e.g., 128 total tones). According to yet another aspect, the number of data tones used to transmit or receive SIG field 1414 information may be 80% or more of the number of total data tones available (e.g., 128 total tones).

In one example, the SIG-B field 1422 is comprised of a single OFDM symbol having 108 data tones, 6 pilot tones, 3 DC tones, and 11 guard tones (e.g., zero tones). The SIG-B field 1422 may be modulated using, for example, BPSK or QBPSK, and may have a coding rate of ½ so that it may carry 54 bits of data across its 108 data tones. Other modulation types and coding rate schemes may be used.

According to one aspect of the disclosure, the number of data tones out of the number of total tones available in the SIG-B field 1422 symbol is not limited to 108 data tones. Specifically, the number of data tones may less or more than 108. For example, according to one aspect of the disclosure, 49 data tones or more out of the 128 total tones may be utilized to transmit SIG-B field 1422 information (e.g., MCS-x4 information shown in FIG. 16). According to one aspect, the number of data tones used to transmit or receive SIG-B field 1422 information may be 39% or more of the number of total data tones available (e.g., 128 total tones). According to another aspect, the number of data tones used to transmit or receive SIG-B field 1422 information may be 50% or more of the number of total data tones available (e.g., 128 total tones). According to another aspect, the number of data tones used to transmit or receive SIG-B field 1422 information may be 60% or more of the number of total data tones available (e.g., 128 total tones). According to yet another aspect, the number of data tones used to transmit or receive SIG-B field 1422 information may be 70% or more of the number of total data tones available (e.g., 128 total tones). According to yet another aspect, the number of data tones used to transmit or receive SIG-B field 1422 information may be 80% or more of the number of total data tones available (e.g., 128 total tones).

The PPDU 1400 may be based on a 128-point DFT design, and the bandwidth of the transmission may range, for example, from 4 MHz to 8 MHz, which leads to a sample duration range of 250 ns to 125 ns. A 5 MHz bandwidth 802.11af PPDU 1400 may be obtained by down-clocking a 40 MHz 802.11ac transmission by a down-clock factor of eight (8). A 6 MHz bandwidth 802.11af PPDU 1400 may be obtained by down-clocking a 40 MHz 802.11ac transmission by a down-clock factor of 6.667 (i.e., 40÷6). An 8 MHz bandwidth 802.11af PPDU 1400 may be obtained by down-clocking a 40 MHz 802.11ac transmission by a down-clock factor of five (5). Generally, an 802.11af PPDU 1400 having a bandwidth X MHz may be obtained by down-clocking a 40 MHz bandwidth 802.11ac transmission by a down-clock factor of 40÷X, where X is greater than or equal to 4 and less than or equal to 10.

FIG. 15 illustrates a table 1500 that includes an exemplary contents of the SIG field 1414 according to one aspect of the disclosure. As described above, the SIG field 1414 serves to indicate many of the SU parameters indicated by the SIG field 714 of the PPDU 700 and MU parameters indicated by the BF-SIG field 1016 of the PPDU 1000 in a single OFDM symbol to minimize preamble overhead. Notably, the SIG field 1414 indicates whether the PPDU 1400 is a SU transmission or a MU transmission. Depending on whether the PPDU 1400 is a SU or MU transmission, the bits included in the SIG field 1414 may be allocated differently and used to indicate different parameters.

Referring to FIG. 15, the SIG field 1414 may include a 1 bit Single User or Multi-user Mode field 1502, a 9 bit Length or Duration field 1504, a 4 bit MCS field 1506 for SU mode, a 2 bit Bandwidth field 1508, a 1 bit Aggregation field 1510 for SU mode, a 1 bit STBC field 1512, a 2 bit Error Coding Type field 1514 for SU mode or a 5 bit Error Coding Type field 1514 for MU mode, a 1 bit SGI field 1516, a 6 bit GID field 1518 for MU mode, a 2 bit NSTS field 1520 for SU mode or an 8 bit NSTS field 1520 for MU mode, a 9 bit Partial Association Identifier (PAID) field 1522 for SU mode, a 12 bit Reserved field 1524 for SU mode or an 11 bit Reserved field 1524 for MU mode, a 4 bit CRC field 1526, and/or a 6 bit Tail field 1528.

Notably, the Single User or Multi-user Mode field 1502 indicates whether the PPDU 1400 is an SU transmission or an MU transmission. If the SU/MU Mode field 1502 indicates that the PPDU 1400 is an SU transmission than the Single User column in FIG. 15 identifies the parameters and number of bits per parameter contained in the SIG field 1414 symbol. Conversely, if the SU/MU Mode field 1502 indicates that the PPDU 1400 is an MU transmission than the Multi-user column in FIG. 15 identifies the parameters and number of bits per parameter containing in the SIG field 1414 symbol. The Length or Duration field 1504 identifies the amount (e.g., number of bytes) of data contained within the payload portion 1404 or the PPDU 1400 itself and/or the duration in time that the payload portion 1404 or the PPDU 1400 will occupy the transmission medium. In other aspects, the Length or Duration field 1504 may indicate the data rate of the PPDU 1400. The MCS field 1506 indicates the modulation type (BPSK, QPSK, QAM, etc.) and coding rate (½, ⅔, ¾, etc.) scheme used for the payload 1404 and/or PPDU 1400. The Bandwidth field 1508 indicates the bandwidth of the payload 1404 and/or the PPDU 1400. The Aggregation field 1510 indicates whether MAC level aggregation is being used, and thus whether the payload 1404 is an AMPDU that includes multiple PPDUs in the payload 1404 separated by delimiters.

The STBC field 1512 indicates whether space time block coding is enabled for the payload 1404 and/or the PPDU 1400. The Error Coding Type field 1514 indicates the type of error coding used for the payload 1404 and/or the PPDU 1400. For example, in the case of an SU transmission, the first bit indicates whether block check character (BCC) error detection or low-density parity-check (LDPC) code error detection is used. The second bit solves an ambiguity in the number of symbols for the LDPC case. For example, sometimes the LDPC encoding process results in one extra symbol and the second bit rectifies such an ambiguity. In the case of an MU transmission, the first four bits indicate whether BCC error detection or LDPC error detection is used for each of the four possible users/receivers. The fifth bit similarly solves the LDPC ambiguity problem discussed for the SU transmission case.

The SGI field 1516 indicates whether the payload 1404 and/or the PPDU 1400 is using symbols having a short guard interval (SGI field 1516 is ON/active) or a normal guard interval (SGI field 1516 is OFF/inactive). If the PPDU 1400 is an MU transmission, the GID field 1518 indicates the group identifier to which a plurality of receivers (e.g., receiving stations) may be associated with. The NSTS field 1520 specifies the number of spatial streams per user. In the case where the PPDU 1400 is an SU transmission only 2 bits are needed to indicate the number of spatial streams. If the PPDU 1400 is an MU transmission then four pairs of bits are used to indicate the number of spatial streams: one pair for each possible user. If the PPDU 1400 is an SU transmission the PAID field 1522 identifies the user/recipient of the PPDU 1400, and notifies non-intended receivers to terminate reception early as the partial association ID does not match their own. The Reserved field 1524 includes bits that may indicate other parameters of the PPDU 1400 and/or payload 1404, and/or indicates future modes. The CRC field 1526 includes bits used for cyclic redundancy check to determine the presence of errors for the PPDU 1400. The Tail field 1528 includes bits to flush out the decoder at the receiver.

In the case where the SU/MU Mode field 1502 indicates that the PPDU 1400 is an MU transmission, the preamble 1402 may include a SIG-B field 1422. Since in MU mode the MCS field 1506 of the SIG field 1414 does not include bits to identify the modulation type and coding rate scheme of the PPDU 1400, the SIG-B field 1422 may be used to indicate such information.

Figure 16:
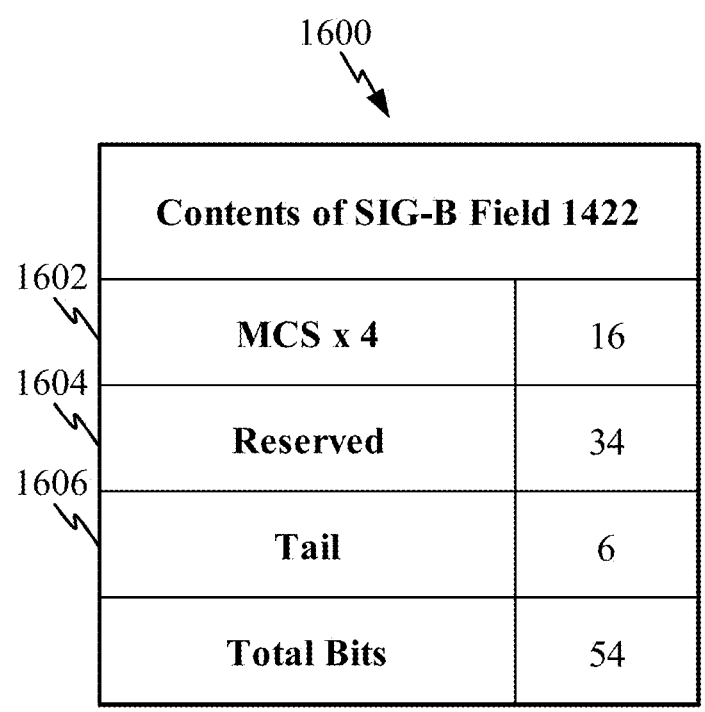
FIG. 16 illustrates a table that includes an exemplary content of the SIG-B field.

FIG. 16 illustrates a table 1600 that includes an exemplary contents of the SIG-B field 1422 according to one aspect of the disclosure. The SIG-B field 1422 may comprise a 16 bit Modulation and Coding Scheme (MCS) field 1602, a 34 bit Reserved field 1604, and a 6 bit Tail field 1606. The MCS field 1602 indicates the type of modulation (e.g., BPSK, QBPSK, QPSK, 8-QAM, 16-QAM, 64-QAM, etc.) and the coding rate scheme (e.g., ½, ⅔, ¾, ⅚, ⅞, etc.) used for each of the users (e.g., four users, 4 bits of the 16 bits each associated with a user to indicate the modulation and coding rate used) for the PPDU 1400 in the case of an MU transmission. That is, each user receives its own modulation and coding rate scheme because the SIG-B field 1422 is precoded for each user. Therefore, the users do not receive the modulation and coding rate schemes associated with the other users, just their own. The Reserved field 1604 includes bits that may indicate other parameters of the PPDU 1400 and/or payload 1404, and/or indicates future modes. The Tail field 1606 includes bits to flush out the decoder at the receiver.

Exemplary TVWS Preamble for 256 Point DFT Design

FIG. 17 illustrates a table featuring signal parameter values for exemplary 802.11af signals (Signal E, Signal F, Signal G, Signal H) having various bandwidths. Signal E is a 4 MHz bandwidth 802.11af signal that is derived by down-clocking an 80 MHz bandwidth 802.11ac signal by a factor of twenty (20). Signal F is a 5 MHz bandwidth 802.11af signal that is derived by down-clocking an 80 MHz bandwidth 802.11ac signal by a factor of sixteen (16). Signal G is a 6 MHz bandwidth 802.11af signal that is derived by down-clocking an 80 MHz bandwidth 802.11ac signal by a factor of 13.333 (i.e., 80÷6). Signal H is an 8 MHz bandwidth 802.11af signal that is derived by down-clocking an 80 MHz bandwidth 802.11ac signal by a factor of ten (10). As illustrated, down-clocking the 80 MHz transmission by a factor of 20 causes the cyclic prefix duration and the total symbol duration to increase by the same factor: the cyclic prefix duration increases from 0.8 μsec to 16 μsec, and the total symbol duration increases from 4 μsec to 80 μsec. Similarly, down-clocking the 80 MHz transmission by a factor of 16 causes the cyclic prefix duration to increase from 0.8 μsec to 12.8 μsec, and the total symbol duration to increase from 4 μsec to 64 μsec. Down-clocking the 80 MHz transmission by a factor of 13.333 causes the cyclic prefix duration to increase from 0.8

μsec to 10.667 μsec, and the total symbol duration to increase from 4 μsec to 53.333 μsec. Down-clocking the 80 MHz transmission by a factor of 10 causes the cyclic prefix duration to increase from 0.8 μsec to 8 μsec, and the total symbol duration to increase from 4 μsec to 40 μsec. Notwithstanding the down-clocking rate, the total number of available tones making up the symbol transmissions for Signals E, F, G, and H remains constant at 256.

According to one example, a 4 MHz 802.11af symbol (e.g., a payload symbol) having 256 total tones may utilize a 16 μsec cyclic prefix that serves as a normal guard interval (e.g., 64 total tones). Instead, the 4 MHz 802.11af payload symbol having 256 total tones may utilize a shorter 8 μsec cyclic prefix that serves as a short guard interval (e.g., 32 total tones). At 250 nanoseconds (ns) per sample (i.e., 1÷4 MHz), each symbol comprising 256 total tones has a duration of 64 μsec (256×250 ns). Thus, a payload symbol using the normal guard interval has a total symbol duration of 80 μsec. By contrast, a symbol using the short guard interval has a total symbol duration of 72 μsec. As another example, a 5 MHz 802.11af payload symbol having 256 total tones may utilize a 12.8 μsec cyclic prefix that serves as a normal guard interval (e.g., 64 total tones). Instead, the 5 MHz 802.11af payload symbol having 256 total tones may utilize a shorter 6.4 μsec cyclic prefix that serves as a short guard interval (e.g., 32 total tones). At 200 nanoseconds (ns) per sample (i.e., 1÷5 MHz), each payload symbol comprising 256 total tones has a duration of 51.2 μsec (256×200 ns). Thus, a payload symbol using the normal guard interval has a total symbol duration of 64 μsec. By contrast, a payload symbol using the short guard interval has a total symbol duration of 57.6 μsec. As another example, a 6 MHz 802.11af payload symbol having 256 total tones may utilize a 10.667 (i.e., 32÷3) μsec cyclic prefix that serves as a normal guard interval (e.g., 64 total tones). Instead, the 6 MHz 802.11af payload symbol having 256 total tones may utilize a shorter 5.333 (i.e., 16÷3) μsec cyclic prefix that serves as a short guard interval (e.g., 32 total tones). At 166.667 nanoseconds (ns) per sample (i.e., 1÷6 MHz), each payload symbol comprising 256 total tones has a duration of 42.667 μsec (256×166.667 ns). Thus, a payload symbol using the normal guard interval has a total symbol duration of 53.333 μsec. By contrast, a payload symbol using the short guard interval has a total symbol duration of 48 μsec. As another example, an 8 MHz 802.11af payload symbol having 256 total tones may utilize an 8 μsec cyclic prefix that serves as a normal guard interval (e.g., 64 total tones). Instead, the 8 MHz 802.11af symbol having 256 total tones may utilize a shorter 4 μsec cyclic prefix that serves as a short guard interval (e.g., 32 total tones). At 125 nanoseconds (ns) per sample (i.e., 1÷8 MHz), each payload symbol comprising 256 total tones has a duration of 32 μsec (256×125 ns). Thus, a payload symbol using the normal guard interval has a total symbol duration of 40 μsec. By contrast, a payload symbol using the short guard interval has a total symbol duration of 36 μsec.

Figures 18, 19:
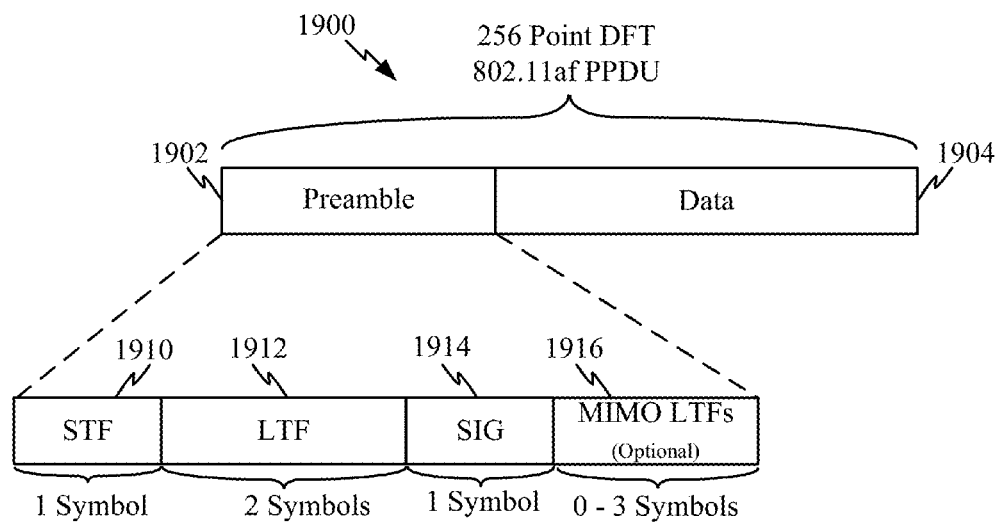
FIG. 18 illustrates an exemplary table that shows data tone and bit information for some preamble fields for an 80 MHz bandwidth 802.11ac transmission.
FIG. 19 illustrates an exemplary PPDU for an 802.11af transmission based on a 256-point DFT design.

FIG. 18 illustrates an exemplary table 1800 that shows data tone and bit information for some preamble fields for an 80 MHz bandwidth 802.11ac transmission. As shown, although the 80 MHz transmission utilizes 192 data tones to transmit each L-SIG field 414 and VHT-SIG A field 416 symbol, only 48 data tones are used to transmit a maximum of 24 unique data bits (using binary phase-shift keying (BPSK) and ½ rate coding, for example) in each 20 MHz bandwidth sub-band of the 80 MHz bandwidth composite transmission. That is, when an 80 MHz 802.11ac signal is transmitted, the contents of the L-SIG 414 and VHT-SIG A 416 fields (the same is true for the L-STF 410 and L-LTF 412) are copied and scaled by a complex number to each 20 MHz sub-band of the 80 MHz signal. Thus, even though the 80 MHz transmission has a total number of tones that is four times that of a 20 MHz transmission, it can only transmit unique L-SIG field 414 and VHT-SIG A field 416 information on 48 data tones. For example, if 24 bits are used to encode the L-SIG field 414 information in 48 data tones, each 20 MHz sub-band of the 80 MHz signal will include the same 24 bits of information. As explained above, the reason the information is replicated in each 20 MHz sub-band is for co-existence of legacy devices (e.g., 802.11a, 802.11n, etc.). That is, 802.11a and/or 802.11n legacy devices that can only receive data within a 20 MHz signal can still receive and decode the preamble information contained in a 20 MHz sub-band.

FIG. 19 illustrates an exemplary PPDU 1900 for an 802.11af transmission based on a 256-point DFT (e.g., FFT) design according to one aspect of the disclosure. The PPDU 1900 may be used, for example, in 4-8 MHz bandwidth 802.11af transmissions that are generated by down-clocking, for example, an 80 MHz 802.11ac transmission. According to one aspect, the PPDU 1900 is for single user (SU) transmissions. The PPDU 1900 comprises a preamble portion 1902 and a data portion 1904. The preamble 1902 may comprise a short training field (STF) 1910, a long training field (LTF) 1912, and a signal (SIG) field 1914. Optionally, the preamble 1902 may also comprise one or more multiple input multiple output (MIMO) long training fields 1916 for additional spatial streams. Notably, the STF 1910, the LTF 1912, the SIG field 1914, and the MIMO LTFs 1916 may be transmitted in an omni-directional fashion, for example, to a single user receiving station.

According to one example, the STF 1910 is 1 OFDM symbol, the LTF 1912 is 2 OFDM symbols, and the SIG field 1914 is 1 OFDM symbol in duration. The STF 1910 is a pattern that repeats a predefined number of times and may be used for fast gain control, timing offset estimation, and frequency offset estimation. The LTF 1912 may be used for channel estimation and fine frequency acquisition. The SIG field 1914 may indicate the total amount of data (e.g., bytes, bits, etc.) in the PPDU 1900, the amount of data remaining in the PPDU 1900, or the amount of data in the payload portion 1904 of the PPDU 1900. Alternatively, the SIG field 1914 may indicate the data rate of the PPDU 1900. In another aspect, the SIG field 1914 may indicate the total length of time (e.g., in seconds, in number of symbols, etc.) of the PPDU 1900, the length of time remaining in the PPDU 1900, or the length of time of the payload portion 1904. The MIMO LTFs 1916 symbols provide channel estimation and fine frequency acquisition for each additional (if any) spatial streams.

As stated above, the PPDU 1900 may be based on a 256-point FFT design and the bandwidth of the transmission may range, for example, from 4 MHz to 8 MHz, which leads to a sample duration range of 250 ns (i.e., 1÷4 MHz) to 125 ns (i.e., 1÷8 MHz). Generally, an 802.11 of PPDU 1900 having a bandwidth X MHz may be obtained by down-clocking an 80 MHz bandwidth 802.11ac transmission by a down-clock factor of 40÷X. In one aspect of the disclosure, the value X may be any value between 4 and 10.

FIG. 20 illustrates a table 2000 of exemplary parameters/characteristics of the STF 1910 for a 4 MHz to 8 MHz bandwidth 802.11af transmission based on a 256 point DFT (e.g., FFT) design according to one aspect of the disclosure. The STF 1910 should have a repetition interval that allows a receive gain control algorithm to quickly measure the received signal strength, and also enough repetitions to ensure an accurate detection of the PPDU 1900. However, the total time duration of the STF 1910 should not be unnecessarily long (i.e., longer than necessary to ensure accurate PPDU 1900 detection) so that the preamble 1902 duration and preamble overhead are kept low. As shown in FIG. 3, if a 20 MHz bandwidth 802.11ac signal is down-clocked by a factor of four (4) to generate a 5 MHz bandwidth 802.11af signal, the total symbol duration for each symbol will increase in time from, for example, 4 μsec to 16 μsec. Since an 802.11ac signal has two L-STF 410 symbols (See FIG. 4), the total time duration of the L-STF 410 will increase from, for example, 8 μsec to 32 μsec. Similarly, down-clocking an 80 MHz bandwidth 802.11ac signal by a factor of 16 to generate a 5 MHz 802.11af signal will cause the total time duration of the L-STF 410 to increase from, for example, 8 μsec to 128 μsec. However, a 128 μsec STF duration may be unnecessarily long for a 5 MHz signal because the time duration of the STF needed for accurate PPDU detection is a function of the bandwidth. Therefore, according to one aspect, the number of OFDM symbols used in the STF 1910 of the preamble 1902 is reduced from two (2) symbols to just one (1) symbol so that the STF time duration needed for accurate PPDU detection does not increase to an unnecessarily long value (e.g., four times as long as needed), and the preamble overhead for the 802.11af PPDU 1900 is minimized.

Moreover, a typical 802.11ac signal transmission includes 10 repetitions (i.e., short symbols) of the L-STF 410 sequence in 2 STF symbols (i.e., each STF symbol has 5 repetitions). According to one aspect, to maintain the same number of total STF sequence repetitions in the single STF 1910 symbol of the PPDU 1900 as the two STF 410 symbols of the PPDU 400, every eighth tone of the STF 1910 symbol may be populated in the frequency domain. Populating every eighth tone results in a repetition pattern in the time domain having eight repetition intervals in STF 1910 raw symbol. For 802.11af transmissions having a cyclic prefix duration 202 equal to ¼$^{th}$ the raw symbol duration 204 (i.e., normal guard interval), the STF 1910 OFDM symbol (including the cyclic prefix) may thus have 10 repetitions (i.e., short symbols) of the STF pattern in one OFDM symbol.

According to another aspect, every sixteenth tone of the STF 1910 symbol may be populated in the frequency domain, which results in a repetition pattern in the time domain having sixteen repetition intervals in STF 1910 raw symbol. For 802.11af transmissions having a cyclic prefix duration 202 equal to ¼$^{th}$ the raw symbol duration 204 (i.e., normal guard interval), the STF 1910 OFDM symbol (including the cyclic prefix) may thus have 20 repetitions (i.e., short symbols) of the STF pattern in one OFDM symbol.

An 802.11af STF 1910 symbol transmission based on a 256 point DFT (e.g., FFT) design having a bandwidth ranging from 4 MHz to 8 MHz where every eighth tone is populated will have an STF repetition interval ranging from 8 μsec (i.e., (256 samples÷8)×250 ns per sample) to 4 μsec (i.e., (256 samples÷8)×125 ns per sample), respectively. For example, a 5 MHz bandwidth 802.11af transmission will have an STF 1910 symbol that has a repetition interval equal to 6.4 μsec. As another example, a 5.5 MHz bandwidth 802.11af transmission will have an STF 1910 symbol that has a repetition interval of approximately 5.818 μsec. A 6 MHz bandwidth 802.11af transmission will have an STF 1910 symbol that has a repetition interval of approximately 5.333 μsec. The total time duration of the STF 1910 may be 40 μsec for an 8 MHz bandwidth 802.11af PPDU 1900. The total time duration of the STF 1910 may be 80 μsec for a 4 MHz bandwidth 802.11af PPDU 1900. Thus, the STF 1910 total time duration for the PPDU 1900 may range from 40 μsec to 80 μsec in the case where every eighth tone of the STF 1910 symbol is populated. In the case where every sixteenth tone is populated, each of these repetition interval values may be halved. Thus, the STF 1910 total time duration for the PPDU 1900 may range from 20 μsec to 40 μsec in the case where every sixteenth tone of the STF 1910 symbol is populated.

According to one aspect of the disclosure, the STF 1910 may include 2 symbols, each having 10 short symbols. According to another aspect, every fourth tone of the STF 1910 may be populated so that each STF 1910 symbol includes just 5 short symbols. In such a case, the STF 1910 may include 2 symbols so that the STF 1910 has a total of 10 short symbols.

FIG. 21 illustrates an exemplary table 2100 that shows tone and bit information for the SIG field 1914 for a 4 MHz to 8 MHz bandwidth 802.11af transmission based on a 256 point DFT (e.g., FFT) design according to one aspect. In the illustrated example, the single symbol SIG field 1914 features 234 data tones, 8 pilot tones, 3 DC tones, and 11 guard tones (e.g., 6 tones on one side of the transmission bandwidth and 5 tones on the other side). Unlike the L-SIG field 414 and VHT-SIG A field 416 of the 80 MHz bandwidth 802.11ac signal discussed above with respect to FIG. 6, the SIG field 1914 information does not have to be copied and repeated in any sub-bands of the 4-8 MHz bandwidth 802.11af transmission because coexistence with legacy devices that are only capable of decoding a sub-band of the composite transmission is not a concern here. Thus, the 802.11af transmission may utilize the entire 256 total tone range to generate the SIG field 1914. This allows the SIG field 1914 to utilize 234 data tones to transmit unique bits of information in a single OFDM symbol, whereas the L-SIG field 414 and VHT-SIG A field 416 are restricted to using 48 data tones to transmit unique bits of information in a single OFDM symbol. According to one aspect, using BPSK and ½ rate coding allows the SIG field 1914 to transmit 117 bits of information over 234 data tones in a single OFDM symbol, whereas the L-SIG field 414 and VHT-SIG A field 416 are restricted to transmitting 24 bits of information over 48 data tones. Thus, much of the same type of data that is transmitted in three (3) OFDM symbols in the L-SIG field 414 and the VHT-SIG A field 416 of 802.11ac transmissions may be transmitted in the single SIG field 1914 for 802.11af transmissions. This further reduces the preamble overhead for the 802.11af PPDU 1900. It should be noted that although BPSK and ½ rate coding is used as an example herein, other modulation schemes and/or coding rates may be used in a accordance with the systems and methods herein, which may allow for different numbers of bits to be included in each symbol.

Like the SIG field 1914 and the MIMO-LTFs 1916 OFDM symbols may also utilize 234 data tones, 8 pilot tones, 3 DC tones, and 11 guard tones (e.g., 6 tones on one side of the transmission bandwidth and 5 tones on the other side).

According to one aspect of the disclosure, the number of data tones out of the number of total tones available in the SIG field 1914 symbol is not limited to 234 data tones. Specifically, the number of data tones may less or more than 234. For example, according to one aspect of the disclosure, 49 data tones or more out of the 234 total tones may be utilized to transmit SIG field 1914 information (e.g., a portion of the data shown in FIG. 22, including an amount of data or length of time remaining for transmission of the PPDU 1900 and/or payload 1904). According to one aspect, the number of data tones used to transmit or receive SIG field 1914 information may be 20% or more of the number of total data tones available (e.g., 256 total tones). According to another aspect, the number of data tones used to transmit or receive SIG field 1914 information may be 30% or more of the number of total data tones available (e.g., 256 total tones). According to another aspect, the number of data tones used to transmit or receive SIG field 1914 information may be 40% or more of the number of total data tones available (e.g., 256 total tones). According to yet another aspect, the number of data tones used to transmit or receive SIG field 1914 information may be 50% or more of the number of total data tones available (e.g., 256 total tones). According to yet another aspect, the number of data tones used to transmit or receive SIG field 1914 information may be 60% or more of the number of total data tones available (e.g., 256 total tones). According to yet another aspect, the number of data tones used to transmit or receive SIG field 1914 information may be 70% or more of the number of total data tones available (e.g., 256 total tones). According to yet another aspect, the number of data tones used to transmit or receive SIG field 1914 information may be 80% or more of the number of total data tones available (e.g., 256 total tones). According to yet another aspect, the number of data tones used to transmit or receive SIG field 1914 information may be 90% or more of the number of total data tones available (e.g., 256 total tones).

In this fashion, the preamble (e.g., the STF 1910, the LTF 1912, and the SIG field 1914) for the 802.11af PPDU 1900 only requires four (4) OFDM symbols for a single spatial stream. By contrast, the preamble (e.g., L-STF 410, L-LTF 412, L-SIG field 414, and VHT-SIG A field 416) of the corresponding 802.11ac PPDU 400 may require ten (10) OFDM symbols. The reduced preamble overhead of the 802.11af PPDU allows more data to be transmitted within the data portion 1904 of the 802.11af PPDU for a given 802.11af transmission. Generally, an X MHz bandwidth 802.11af PPDU 1900 based on a 256 point DFT having four (4) preamble symbols (e.g., the STF 1910, the LTF 1912, and the SIG field 1914) may have a total preamble duration equal to $4\times((64+256)\times(1\div X))$ μsec, where X may be any value between 4 and 10. Thus, according to one aspect, a 5 MHz bandwidth 802.11af PPDU 1900 based on a 256 point DFT having four (4) preamble symbols (e.g., the STF 1910, the LTF 1912, and the SIG field 1914) has a total preamble duration of 256 μsec. According to another aspect, a 6 MHz bandwidth 802.11af PPDU 1900 having four (4) preamble symbols (e.g., the STF 1910, the LTF 1912, and the SIG field 1914) has a total preamble duration of 213.333 μsec. According to another aspect, an 8 MHz bandwidth 802.11af PPDU 1900 having four (4) preamble symbols (e.g., the STF 1910, the LTF 1912, and the SIG field 1914) has a total preamble duration of 160 μsec. Thus, the total 4 symbol preamble duration for a 4 MHz to 8 MHz 802.11af PPDU 1900 may range from 160 μsec to 320 μsec.

FIG. 22 illustrates a table 2200 that includes an exemplary contents of the SIG field 1914 according to one aspect of the disclosure. The SIG field 1914 may be used when the PPDU 1900 is a single user transmission. The SIG field 1914 may include a 9 bit Length or Duration field 2202, a 4 bit MCS field 2204, a 2 bit Bandwidth field 2206, a 1 bit Aggregation field 2208, a 1 bit STBC field 2210, a 2 bit Error Coding Type field 2212, a 1 bit SGI field 2214, a 2 bit Number of Space Time Streams field 2216, a 16 bit Full Association Identifier (FAID) field 2218, a 69 bit Reserved field 2220, a 4 bit CRC field 2222, and/or a 6 bit Tail field 2224.

The Length or Duration field 2202 identifies the amount (e.g., number of bytes) of data contained within the payload portion 1904 or the PPDU 1900 itself and/or the duration in time that the payload portion 1904 or the PPDU 1900 will occupy the transmission medium. In other aspects, the Length or Duration field 2202 may indicate the data rate of the PPDU 1900. The MCS field 2204 indicates the modulation type (BPSK, QPSK, QAM, etc.) and coding rate (½, ⅔, ¾, etc.) scheme used for the payload 1904 and/or PPDU 1900. The Bandwidth field 2206 indicates the bandwidth of the payload 1904 and/or the PPDU 1900. The Aggregation field 2208 indicates whether MAC level aggregation is being used, and thus whether the payload 1904 is an AMPDU that includes multiple PPDUs in the payload 1904 separated by delimiters.

The STBC field 2210 indicates whether space time block coding is enabled for the payload 1904 and/or the PPDU 1900. The Error Coding Type field 2212 indicates the type of error coding used for the payload 1904 and/or the PPDU 1900. For example, the first bit indicates whether BCC error detection or LDPC code error detection is used. The second bit solves an ambiguity in the number of symbols for the LDPC case. The SGI field 2214 indicates whether the payload 1904 and/or the PPDU 1900 is using symbols having a short guard interval (SGI field 2214 is ON/active) or a normal guard interval (SGI field 2214 is OFF/inactive). The NSTS field 2216 specifies the number of spatial streams. The FAID field 2218 identifies the user/recipient of the PPDU 1900, and notifies non-intended receivers to terminate reception early as the full association ID does not match their own. The Reserved field 2220 includes bits that may indicate other parameters of the PPDU 1900 and/or payload 1904, and/or indicates future modes. The CRC field 2222 includes bits used for cyclic redundancy check to determine the presence of errors for the PPDU 1900. The Tail field 2224 includes bits to flush out the decoder at the receiver.

Figure 23:
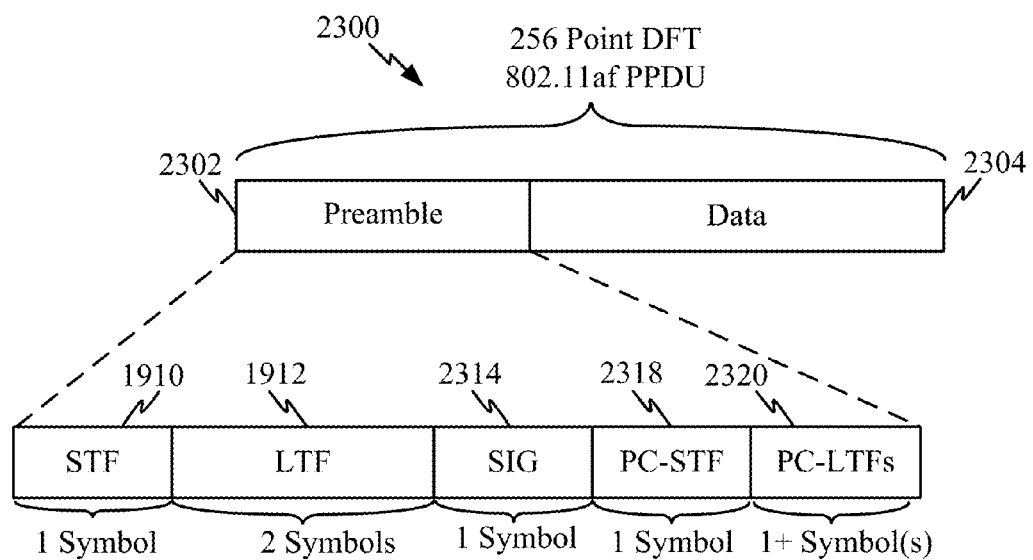
FIG. 23 illustrates an exemplary PPDU for an 802.11af transmission based on a 256 point DFT design.

FIG. 23 illustrates an exemplary PPDU 2300 for an 802.11af transmission based on a 256 point DFT (e.g., FFT) design according to one aspect of the disclosure. According to one aspect, the PPDU 2300 may be used for multi-user 802.11af transmissions or single user (SU) beamformed 802.11af transmissions. The PPDU 2300 may be used, for example, in 4-8 MHz bandwidth 802.11af transmissions that are generated by down-clocking, for example, an 80 MHz 802.11ac signal. The PPDU 2300 comprises a preamble portion 2302 and a data portion 2304. The preamble 2302 may comprise the short training field (STF) 1910 and the long training field (LTF) 1912 as described above with respect to FIG. 19. However, the PPDU 2300 may further comprise a multi-user SIG field 2314, a precoded short training field (PC-STF) 2318, and one or more precoded long training fields (PC-LTF) 2320. While the STF 1910, LTF 1912, and the SIG field 2314 are transmitted in an omni-directional fashion so that it may be decoded by all the 802.11af devices within range, the PC-STF 2318 and the PC-LTFs 2320 are beamformed transmissions and/or SDMA precoded so that they are only decoded by the 802.11af devices for which they are associated with.

According to one example, the SIG field 2314 is 1 OFDM symbol, the PC-STF 2318 is 1 OFDM symbol, and the PC-LTF 2320 is also 1 OFDM symbol per PC-LTF 2320 field. There may be one or more PC-LTF 2320 fields, the number of which is a function of the number of spatial streams. The SIG field 2314 may indicate the total amount of data (e.g., bytes, bits, etc.) in the PPDU 2300, the amount of data remaining in the PPDU 2314, or the amount of data in the payload portion 2304 of the PPDU 2300. Alternatively, the SIG field 2314 may indicate the data rate of the PPDU 2300. In another aspect, the SIG field 2314 may indicate the total length of time (e.g., in seconds, in number of symbols, etc.) of the PPDU 2300, the length of time remaining in the PPDU 2300, or the length of time of the payload portion 2304.

Like the SIG field 1914 described above, the SIG field 2314 features 234 data tones, 8 pilot tones, 3 DC tones, and 11 guard tones (e.g., 6 tones on one side of the transmission bandwidth and 5 tones on the other side). The SIG field 2314 information does not have to be copied and repeated in any sub-bands of the 4-8 MHz bandwidth 802.11af transmission because coexistence with legacy devices that are only capable of decoding a sub-band of the composite transmission is not a concern here. Thus, the 802.11af transmission may utilize the entire 256 total tone range to generate the SIG field 2314. This allows the SIG field 2314 to utilize 234 data tones to transmit unique bits of information in a single OFDM symbol, whereas the L-SIG field 414 and VHT-SIG A field 416 are restricted to using 48 data tones to transmit unique bits of information in a single OFDM symbol. According to one aspect, using BPSK and ½ rate coding allows the SIG field 2314 to transmit 117 bits of information over 234 data tones in a single OFDM symbol, whereas the L-SIG field 414 and VHT-SIG A field 416 are restricted to transmitting 24 bits of information over 48 data tones. Thus, much of the same type of data that is transmitted in three (3) OFDM symbols in the L-SIG field 414 and the VHT-SIG A field 416 of 802.11ac transmissions may be transmitted in the single SIG field 2314 for 802.11af transmissions. This further reduces the preamble overhead for the 802.11af PPDU 2300. It should be noted that although BPSK and ½ rate coding is used as an example herein, other modulation schemes and/or coding rates may be used in a accordance with the systems and methods herein, which may allow for different numbers of bits to be included in each symbol.

According to one aspect of the disclosure, the number of data tones out of the number of total tones available in the SIG field 2314 symbol is not limited to 234 data tones. Specifically, the number of data tones may less or more than 234. For example, according to one aspect of the disclosure, 49 data tones or more out of the 234 total tones may be utilized to transmit SIG field 2314 information (e.g., a portion of the data shown in FIG. 24, including an amount of data or length of time remaining for transmission of the PPDU 2300 and/or payload 2304). According to one aspect, the number of data tones used to transmit or receive SIG field 2314 information may be 20% or more of the number of total data tones available (e.g., 256 total tones). According to another aspect, the number of data tones used to transmit or receive SIG field 2314 information may be 30% or more of the number of total data tones available (e.g., 256 total tones). According to another aspect, the number of data tones used to transmit or receive SIG field 2314 information may be 40% or more of the number of total data tones available (e.g., 256 total tones). According to yet another aspect, the number of data tones used to transmit or receive SIG field 2314 information may be 50% or more of the number of total data tones available (e.g., 256 total tones). According to yet another aspect, the number of data tones used to transmit or receive SIG field 2314 information may be 60% or more of the number of total data tones available (e.g., 256 total tones). According to yet another aspect, the number of data tones used to transmit or receive SIG field 2314 information may be 70% or more of the number of total data tones available (e.g., 256 total tones). According to yet another aspect, the number of data tones used to transmit or receive SIG field 2314 information may be 80% or more of the number of total data tones available (e.g., 256 total tones). According to yet another aspect, the number of data tones used to transmit or receive SIG field 2314 information may be 90% or more of the number of total data tones available (e.g., 256 total tones).

Much like the STF 1910 described above, every eighth tone of the PC-STF 2318 symbol may be populated to generate a repetition pattern that repeats ten (10) times within a single OFDM symbol utilizing a normal cyclic prefix guard interval. Like the SIG field 2314, the PC-LTF 2320 OFDM symbols may also utilize 234 data tones, 8 pilot tones, 3 DC tones, and 11 guard tones (e.g., 6 tones on one side of the transmission bandwidth and 5 tones on the other side).

In this fashion, the preamble 2302 (e.g., the STF 1910, the LTF 1912, the SIG field 2314, the PC-STF 2318, and one PC-LTF 2320) for the 802.11af PPDU 2300 may only require six (6) OFDM symbols (in the case of a single PC-LTF 2320). By contrast, the preamble (e.g., L-STF 410, L-LTF 412, L-SIG field 414, VHT-SIG A field 416, VHT-STF 418, VHT-LTF 420, VHT-SIG B 422) of a 802.11ac PPDU 400 may require ten (10) OFDM symbols (in the case of a single VHT-LTF 422). The reduced preamble overhead (e.g., reduced preamble 2302 duration) of the 802.11af PPDU 2300 allows more data to be transmitted within the data portion 2304 of the 802.11af PPDU 2300 for a given 802.11af PPDU transmission. Generally, an X MHz bandwidth 802.11 PPDU 2300 having six (6) preamble symbols (e.g., the STF 1910, the LTF 1912, the SIG field 2314, the PC-STF 2318, and one PC-LTF 2320) may have a total preamble duration equal to $6 \times ((64+256) \times (1 \div X))$ μsec, where X may be any value between 4 and 10.

FIG. 24 illustrates a table 2400 showing exemplary bit fields of a SIG field 2314 according to one aspect of the disclosure. The SIG field 2314 may be used when the PPDU 2300 is a multi-user transmission. The SIG field 2314 may include a 9 bit Length or Duration field 2402, a 16 bit MCS by 4 field 2404, a 2 bit Bandwidth field 2406, a 1 bit STBC field 2408, a 5 bit Error Coding Type field 2410, a 1 bit SGI field 2412, an 8 bit NSTS field 2414, a 59 bit Reserved field 2416, a 4 bit CRC field 2418, and/or a 6 bit Tail field 2420.

The Length or Duration field 2402 identifies the amount (e.g., number of bytes) of data contained within the payload portion 2304 or the PPDU 2300 itself and/or the duration in time that the payload portion 2304 or the PPDU 2300 will occupy the transmission medium. In other aspects, the Length or Duration field 2402 may indicate the data rate of the PPDU 2300. The MCS field 2404 indicates the type of modulation (e.g., BPSK, QBPSK, QPSK, 8-QAM, 16-QAM, 64-QAM, etc.) and the coding rate scheme (e.g., ½, ⅔, ¾, ⅚, ⅞, etc.) used for each of the users (e.g., four users, 4 bits of the 16 bits each associated with a user to indicate the modulation and coding rate used) for the PPDU 2300. The Bandwidth field 2406 indicates the bandwidth of the payload 2304 and/or the PPDU 2300.

The STBC field 2408 indicates whether space time block coding is enabled for the payload 2304 and/or the PPDU 2300. The Error Coding Type field 2410 indicates the type of error coding used for the payload 2304 and/or the PPDU 2300. For example, the first four bits indicate whether BCC error detection or LDPC error detection is used for each of the four possible users/receivers. The fifth bit solves the LDPC ambiguity problem discussed for the SU transmission case. The SGI field 2412 indicates whether the payload 2304 and/or the PPDU 2300 is using symbols having a short guard interval (SGI field 2412 is ON/active) or a normal guard interval (SGI field 2412 is OFF/inactive). The Group ID field 2414 is used to indicates the group identifier to which a plurality of receivers (e.g., receiving stations) may be associated with. The NSTS field 2416 specifies the number of spatial streams per user (two bits are used to indicate the number of spatial streams per user). The Reserved field 2418 includes bits that may indicate other parameters of the PPDU 2300 and/or payload 2304, and/or indicates future modes. The CRC field 2420 includes bits used for cyclic redundancy check to determine the presence of errors for the PPDU 2300. The Tail field 2422 includes bits to flush out the decoder at the receiver.

Figure 25:
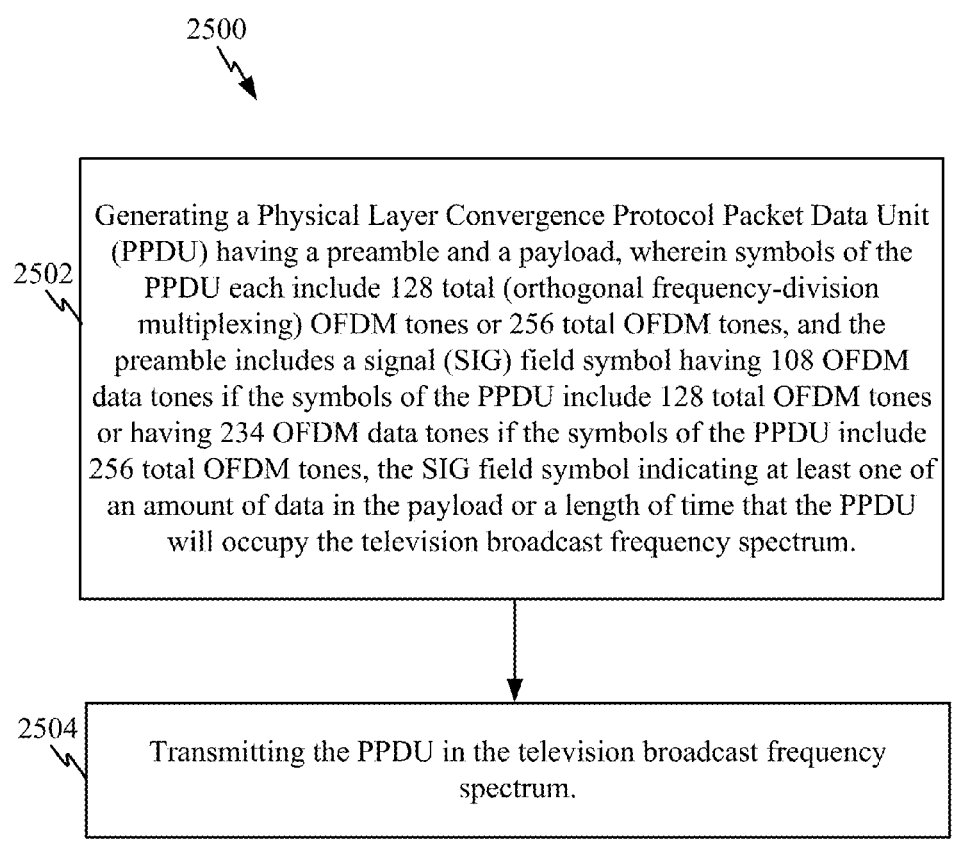
FIG. 25 illustrates a flowchart of a method for wireless communication in a television broadcast frequency spectrum (e.g., TVWS) operational at a transmitter.

FIG. 25 illustrates a flowchart 2500 of a method for wireless communication in a television broadcast frequency spectrum (e.g., TVWS) operational at a transmitter (e.g., a transmitter within an access point, base station, access terminal, wireless communication device, etc.). At step 2502, the transmitter may generate a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones. The SIG field symbol indicates at least one of an amount of data in the payload or a length of time that the PPDU will occupy the television broadcast frequency spectrum. At step 2504, the transmitter transmits the PPDU in the television broadcast frequency spectrum.

According to one aspect, a method for wireless communication in a television broadcast frequency spectrum operational at a transmitter is provided where the method comprises: (a) generating a Physical Layer Convergence Protocol Packet Data Unit (PPDU) having a preamble and a payload, wherein symbols of the PPDU each include a first number of total (orthogonal frequency-division multiplexing) OFDM tones or a second number of total OFDM tones, and the preamble includes a signal (SIG) field symbol having a first number of OFDM data tones if the symbols of the PPDU include the first number of total OFDM tones or having a second number of OFDM data tones if the symbols of the PPDU include the second number of total OFDM tones, the SIG field symbol indicating at least one of an amount of data in the payload or a length of time that the PPDU will occupy the television broadcast frequency spectrum; and transmitting the PPDU in the television broadcast frequency spectrum. According to one aspect, the first number of total OFDM tones is equal to 128 and the second number of total OFDM tones is equal to 256. According to another aspect, the first number of OFDM data tones is greater than 39% of the first number of total OFDM tones. According to yet another aspect, the first number of OFDM data tones is greater than 50% of the first number of total OFDM tones. According to yet another aspect, the first number of OFDM data tones is greater than 60% of the first number of total OFDM tones. According to yet another aspect, the first number of OFDM data tones is greater than 70% of the first number of total OFDM tones. According to yet another aspect, the first number of OFDM data tones is greater than 80% of the first number of total OFDM tones. According to one aspect, the second number of OFDM data tones is greater than 20% of the second number of total OFDM tones. According to another aspect, the second number of OFDM data tones is greater than 30% of the second number of total OFDM tones. According to yet another aspect, the second number of OFDM data tones is greater than 40% of the second number of total OFDM tones. According to yet another aspect, the second number of OFDM data tones is greater than 50% of the second number of total OFDM tones. According to yet another aspect, the second number of OFDM data tones is greater than 60% of the second number of total OFDM tones. According to yet another aspect, the second number of OFDM data tones is greater than 70% of the second number of total OFDM tones. According to yet another aspect, the second number of OFDM data tones is greater than 80% of the second number of total OFDM tones. According to yet another aspect, the second number of OFDM data tones is greater than 90% of the second number of total OFDM tones.

Figure 26:
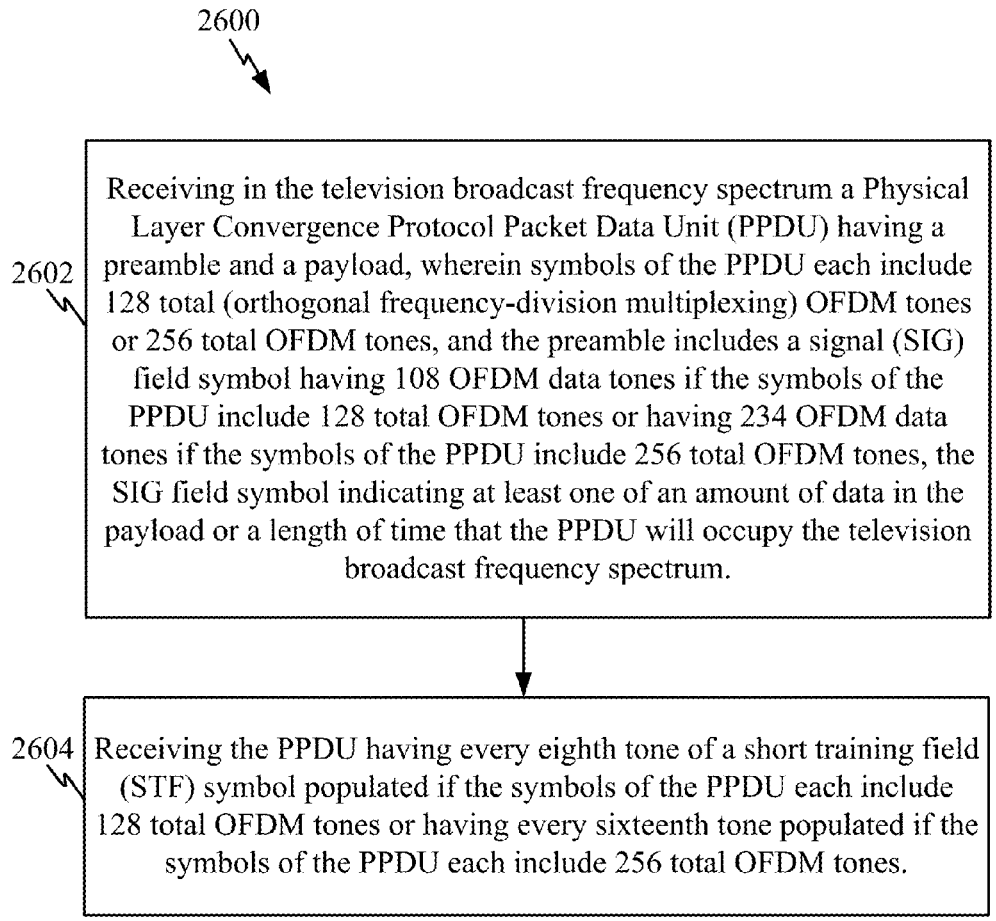
FIG. 26 illustrates a flowchart of a method for wireless communication in a television broadcast frequency spectrum (e.g., TVWS) operational at a receiver.

FIG. 26 illustrates a flowchart 2600 of a method for wireless communication in a television broadcast frequency spectrum (e.g., TVWS) operational at a receiver (e.g., a receiver within an access point, base station, access terminal, wireless communication device, etc.). At step 2602 the receiver receives in the television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones. The SIG field symbol indicates at least one of an amount of data in the payload or a length of time that the PPDU will occupy the television broadcast frequency spectrum. At step 2604, the preamble of the PPDU received may have every eighth tone of a short training field (STF) symbol populated if the symbols of the PPDU each include 128 total OFDM tones or have every sixteenth tone populated if the symbols of the PPDU each include 256 total OFDM tones.

According to one aspect, a method for wireless communication in a television broadcast frequency spectrum operational at a receiver is provided where the method comprises: (a) receiving, in the television broadcast frequency spectrum, a Physical Layer Convergence Protocol Packet Data Unit (PPDU) having a preamble and a payload, wherein symbols of the PPDU each include a first number of total (orthogonal frequency-division multiplexing) OFDM tones or a second number of total OFDM tones, and the preamble includes a signal (SIG) field symbol having a first number of OFDM data tones if the symbols of the PPDU include the first number of total OFDM tones or having a second number of OFDM data tones if the symbols of the PPDU include the second number of total OFDM tones, the SIG field symbol indicating at least one of an amount of data in the payload or a length of time that the PPDU will occupy the television broadcast frequency spectrum. According to one aspect, the first number of total OFDM tones is equal to 128 and the second number of total OFDM tones is equal to 256. According to another aspect, the first number of OFDM data tones is greater than 39% of the first number of total OFDM tones. According to yet another aspect, the first number of OFDM data tones is greater than 50% of the first number of total OFDM tones. According to yet another aspect, the first number of OFDM data tones is greater than 60% of the first number of total OFDM tones. According to yet another aspect, the first number of OFDM data tones is greater than 70% of the first number of total OFDM tones. According to yet another aspect, the first number of OFDM data tones is greater than 80% of the first number of total OFDM tones. According to one aspect, the second number of OFDM data tones is greater than 20% of the second number of total OFDM tones. According to another aspect, the second number of OFDM data tones is greater than 30% of the second number of total OFDM tones. According to yet another aspect, the second number of OFDM data tones is greater than 40% of the second number of total OFDM tones. According to yet another aspect, the second number of OFDM data tones is greater than 50% of the second number of total OFDM tones. According to yet another aspect, the second number of OFDM data tones is greater than 60% of the second number of total OFDM tones. According to yet another aspect, the second number of OFDM data tones is greater than 70% of the second number of total OFDM tones. According to yet another aspect, the second number of OFDM data tones is greater than 80% of the second number of total OFDM tones. According to yet another aspect, the second number of OFDM data tones is greater than 90% of the second number of total OFDM tones.

Figure 27:
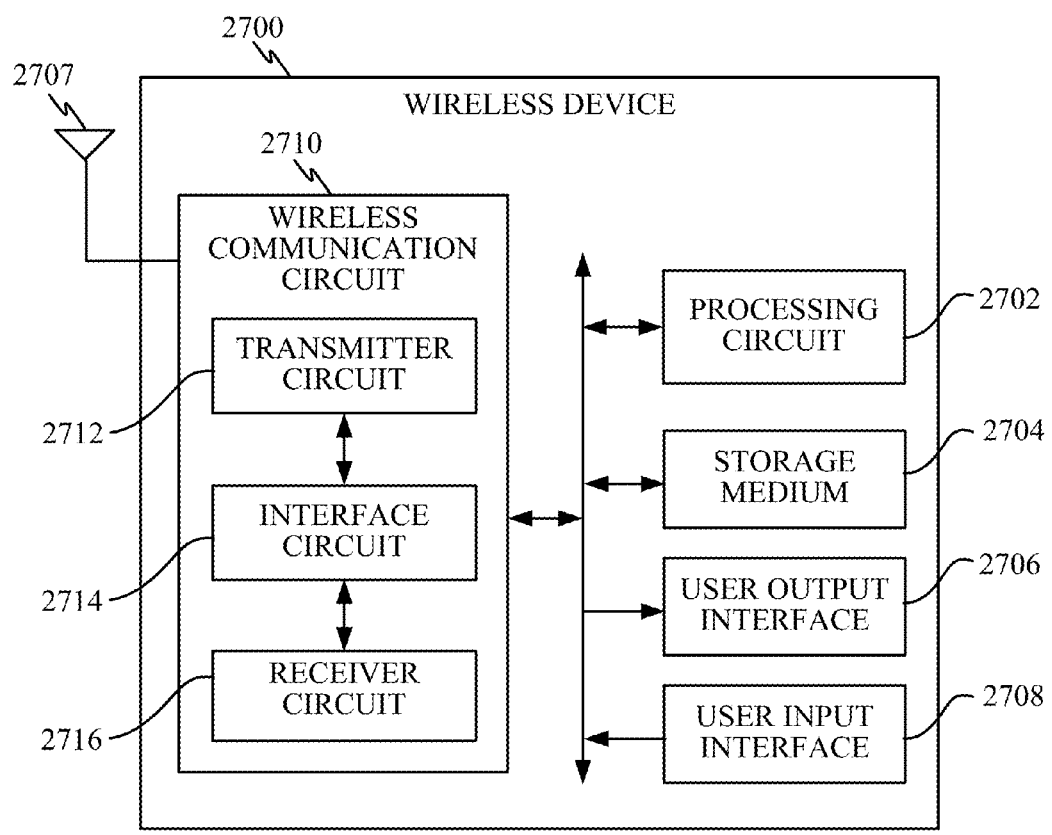
FIG. 27 is a block diagram illustrating an exemplary wireless device that may be adapted for communications over a television broadcast frequency spectrum.

FIG. 27 is a block diagram illustrating an exemplary wireless device 2700 that may be adapted for communications over a television broadcast frequency spectrum (e.g., an unused TVWS channel). For example, the wireless device 2700 may be an access point, access terminal, base station, mobile phone, etc. The wireless device 2700 may include a processing circuit 2702 coupled to a storage medium 2704 (e.g., memory device, memory card, non-volatile storage, etc.), a user output interface 2706 (e.g., display, speaker, etc.), a user input interface 2708 (e.g., microphone, keypad, etc.), and/or a wireless communication circuit 2710. The processing circuit 2702 may be adapted to perform certain operations of the wireless device 2700, including running applications, web browsers, phone call operations, etc. The wireless communication circuit 2710 may include a transmitter circuit 2712 and a receiver circuit 2716 coupled to an interface circuit 2714.

The transmitter circuit 2712 and/or interface circuit 2714 may include a transmitter chain and may be adapted to perform transmission operations by receiving data from the processing circuit 2702, modulating the data into a number of sub-carriers (tones/frequencies) that form a waveform, and modulating the waveform into a primary carrier frequency for transmission over an unused television channel (i.e., TVWS). In modulating the date into a number of sub-carriers to form the waveform, a down-clocking factor may be applied to a clock for a transmitter chain, causing the clock frequency into components of the transmitter chain to be slowed down according to the down-clocking factor. By slowing the clock from a first frequency to a second frequency, the bandwidth is also reduced (relative to the bandwidth provided by the original clock) from a first bandwidth (e.g., corresponding to the original clock) to a second bandwidth (e.g., corresponding to the down-clocked/slowed clock).

The receiver circuit 2716 and/or interface circuit 2714 may include a receiver chain and may be adapted to perform reception operations by receiving a waveform from the antenna 2707, demodulating the waveform to a baseband waveform obtain the data therein.

Note that down-clocking the waveform permits reusing a legacy transmitter/receiver chain circuit design by merely applying a down-clocking factor to clock. For instance, an existing 40 MHz or 80 MHz clock may be used to generate a 40 MHz or 80 MHz waveform, respectively, which is subsequently down-clocked prior to transmission. As described herein, the 40 MHz or 80 MHz waveform may be down-clocked to an 802.11af signal having a bandwidth between 4 MHz and 10 MHz, inclusive. However, the number of preamble symbols may be reduced (e.g., from 10 symbols to 7 symbols) in order to reduce the preamble duration and/or preamble overhead. For example, the number of STF symbols may be reduced from 2 symbols to 1 symbol, and the three symbols that make up the L-SIG field 414 and VHT-SIG-A field 416 may be reduced down to 1 SIG field 714, 1414, 1914, 2314 symbol.

Figure 28:
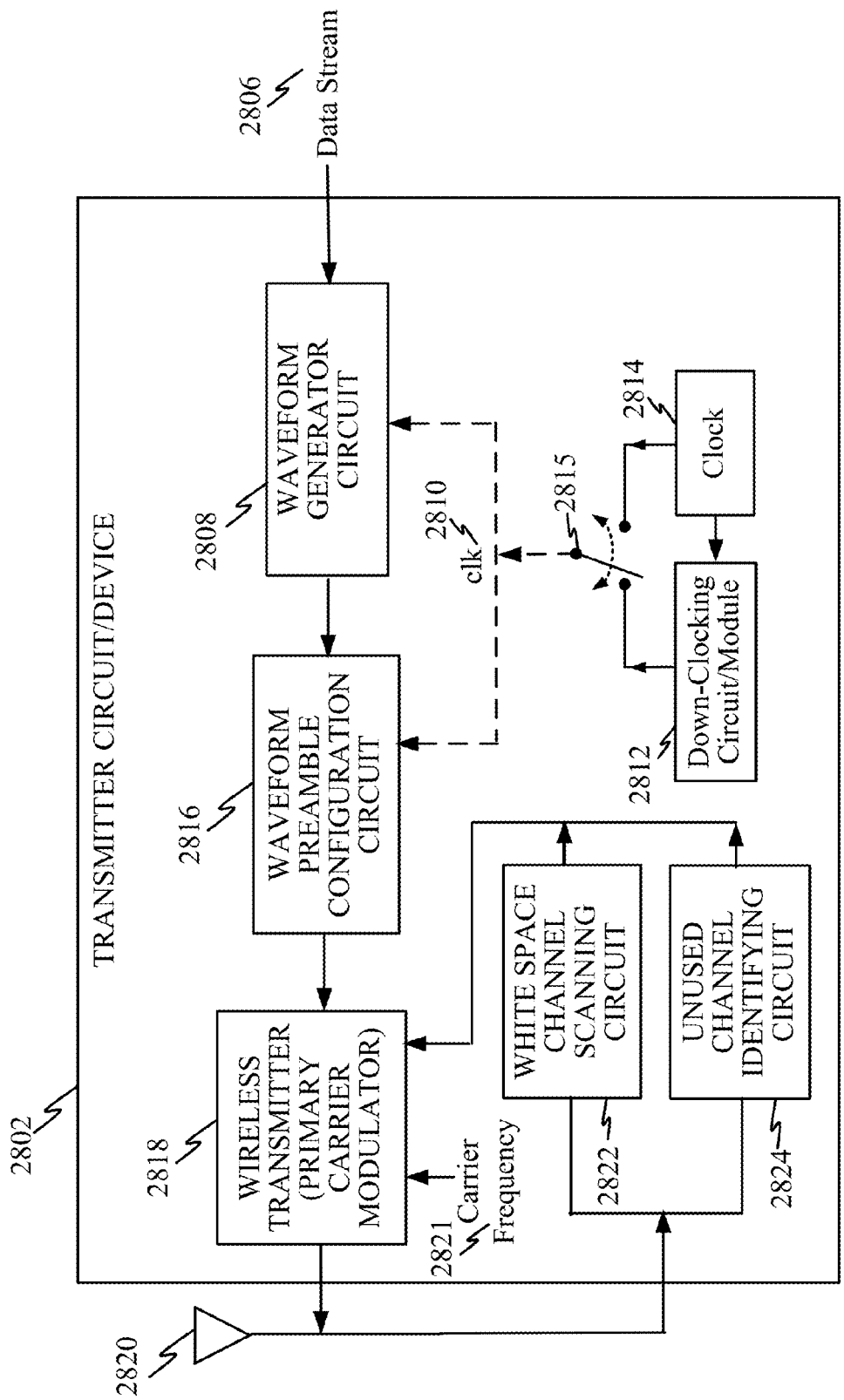
FIG. 28 is a block diagram illustrating an exemplary transmitter circuit/device that may be adapted to transmit over a television white space channel.

FIG. 28 is a block diagram illustrating an exemplary transmitter circuit/device 2802 that may be adapted to transmit over a television white space channel. A waveform generator 2808 uses a clock signal (clk) 2810 to modulate a data stream 2806 into a number of sub-carriers (tones/frequencies) to generate a waveform having a first bandwidth. The transmitter circuit/device 2802 may be adapted to dynamically adjust its transmissions for different bandwidths, waveform types, and/or available channels. For example, the waveform generator 2808 may be adapted to generate waveforms based on the IEEE 802.11n and/or 802.11ac specifications. However, the transmitter circuit/device 2802 may also be adapted to transmit over unused television channels (e.g., whitespace). As such, it may be adapted to configure waveforms to fit within the bandwidth available in an unused television channel (e.g., 4, 5, 6, and/or 8 MHz bandwidth). Consequently, a down-clocking circuit/module 2812 may serve to adjust a waveform bandwidth. For example, such down-clocking circuit 2812 may obtain a clock 2814 and reduce its frequency according to a factor. This down-clocked clock is then provided to the transmitter chain (e.g., waveform generator 2808). A switch 2815 may allow the transmitter circuit 2802 to dynamically select the clk signal 2810 from the original clock 2814 or from the down-clocking circuit 2812. Down-clocking changes the waveform bandwidth from a first bandwidth (e.g., 20, 40, or 80 MHz if the original clock 2814 had been used) to a second bandwidth (4-10 MHz e.g., using the down-clocking circuit 2812). A waveform preamble configuration circuit 2816 may then generate a preamble (e.g., 702, 1002, 1402, 1902, 2302) and appends it to the down-clocked waveform. A wireless transmitter 2818 (e.g., primary carrier modulator) may then modulate the down-clocked waveform onto a primary carrier frequency 2821 for transmission over an antenna 2820.

In one example, the primary carrier frequency 2821 may correspond to an unused television channel (e.g., white space). In this example, the transmitter circuit 2802 may include a white space channel scanning circuit 2822 and/or an unused channel identifying circuit 2824. The white space channel scanning circuit 2822 may scan a frequency spectrum (e.g., television broadcast frequency spectrum) to identify channels not in use (e.g., by monitoring for energy in the channels). Alternatively, the unused channel identifying circuit 2824 may query an external database to ascertain which television channels are unused in a particular region.

The television broadcast frequency spectrum is pre-divided into a plurality of channels of equal bandwidth and the unused channel is selected and repurposed for data transmissions from among the plurality of channels. In one example, the channel identifier (e.g., 2822, 2824) may be adapted to identify an unused channel within a television broadcast frequency spectrum. The waveform generator 2808 may be adapted to generate a down-clocked waveform by applying a factor to a clock that causes a waveform bandwidth to be reduced from a first bandwidth (e.g., 20, 40, or 80 MHz) to a second bandwidth (e.g., 4-10 MHz), wherein the second bandwidth of the down-clocked waveform is less than a channel bandwidth for the identified unused channel. According to one aspect, the wireless transmitter 2818 and/or waveform preamble configuration circuit 2816 may be adapted to generate a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones. The SIG field symbol may indicate at least one of an amount of data in the payload or a length of time that the PPDU will occupy the television broadcast frequency spectrum, and the wireless transmitter 2818 may be further adapted to transmit the PPDU in a television broadcast frequency spectrum (e.g., TVWS).

According to one aspect, the wireless transmitter 2818 and/or the preamble configuration circuit 2816 may be further adapted to generate the PPDU by down-clocking a first signal (e.g., an 802.11ac signal) having a first bandwidth (e.g., 20, 40, or 80 MHz) by a factor to generate the PPDU having a second bandwidth (e.g., 4-10 MHz), where the first signal has a first signal preamble that includes a first short training field (STF) having two or more symbols, the first STF has a first STF time duration, and the preamble further includes a second STF having a second STF time duration, wherein the second STF time duration is less than the first STF time duration multiplied by the factor. According to one aspect, the second STF time duration is equal to half of the first STF time duration multiplied by the factor. According to another aspect, the second STF includes only one symbol. According to another aspect, if the symbols of the PPDU each include 128 total OFDM tones then the first bandwidth is 40 MHz, the second bandwidth is greater than or equal to four (4) MHz and less than or equal to eight (8) MHz, the first STF time duration is equal to eight (8) μsec, and the second STF time duration is greater than or equal to 20 μsec and less than or equal to 40 μsec. If the symbols of the PPDU each include 256 total OFDM tones then the first bandwidth is 80 MHz, the second bandwidth is greater than or equal to four (4) MHz and less than or equal to eight (8) MHz, the first STF time duration is eight (8) μsec, and the second STF time duration is greater than or equal to 40 μsec and less than or equal to 80 μsec. According to one aspect, the preamble further includes a short training field (STF) symbol having every eighth tone or sixteenth tone populated if the symbols of the PPDU each include 128 total OFDM tones or having every sixteenth tone populated if the symbols of the PPDU each include 256 total OFDM tones.

According to another aspect, the preamble further includes a short training field (STF) symbol having a repetition interval greater than or equal to 2 microseconds (μs) and less than or equal to 4 μs if the symbols of the PPDU each include 128 total OFDM tones or having a repetition interval greater than or equal to 4 μs and less than or equal to 8 μs if the symbols of the PPDU each include 256 total OFDM tones. According to one aspect the wireless transmitter 2818 and/or the preamble configuration circuit 2816 generates the PPDU by down-clocking the first signal having the first bandwidth by a factor to generate the PPDU having the second bandwidth, the first signal having a first signal preamble that includes a first SIG field having at least one symbol, wherein the symbol of the first SIG field is limited to 48 OFDM data tones per 20 MHz sub-band of the first signal. According to another aspect, the transmitter 2818 and/or the preamble configuration circuit 2816 generates the PPDU by down-clocking the first signal having the first bandwidth by a factor to generate the PPDU having the second bandwidth, the first signal having a first signal preamble including at least ten (10) symbols, wherein the preamble of the PPDU has seven (7) symbols.

According to another aspect, the transmitter 2818 and/or the preamble configuration circuit 2816 generates the PPDU by down-clocking the first signal having the first bandwidth by a factor to generate the PPDU having the second bandwidth, the first signal having a first signal preamble that has a first signal preamble time duration, wherein a time duration of the preamble of the PPDU is less than 82% of the first signal preamble time duration multiplied by the factor. According to one aspect, the SIG field symbol includes 54 bits of data if the symbols of the PPDU each include 128 total OFDM tones or 117 bits of data if the symbols of the PPDU each include 256 total OFDM tones. According to another aspect, the SIG field symbol further indicates a bandwidth of the payload, a modulation and coding rate scheme of the payload, and a number of spatial streams of the payload. According to another aspect, the SIG field symbol further indicates whether one or more symbols of the preamble or the payload are beamformed.

According to yet another aspect, the SIG field symbol is modulated using quadrature binary phase shift keying (QBPSK) to indicate whether one or more symbols of the preamble or the payload are beamformed. According to yet another aspect, the SIG field symbol further indicates whether the payload is to be transmitted in a single user mode or a multi-user mode, and if the payload is to be transmitted in the multi-user mode the SIG field symbol further indicates a group identifier (ID) that identifies at least one intended receiver of the payload, and the preamble further includes a signal B (SIG-B) field symbol that indicates a modulation and coding rate scheme of the payload. According to one aspect, the preamble generated by the preamble configuration circuit 2816 further includes a beamformed signal (BF-SIG) field that indicates at least one of a group identifier (ID) that identifies at least one intended receiver of the payload, a number of spatial streams for the payload for each user of a plurality of users, and/or a modulation and coding rate scheme for the payload for each user of the plurality of users. According to one aspect, the bandwidth of the PPDU is greater than or equal to 5 MHz and less than or equal to 6 MHz if the symbols of the PPDU each include 128 total OFDM tones, or the bandwidth of the PPDU is 8 MHz if the symbols of the PPDU each include 256 total OFDM tones.

According to another aspect, the television broadcast frequency spectrum is less than 1 GHz. According to one aspect, the wireless transmitter 2818 and/or the preamble configuration circuit 1816 down-clocks a 40 MHz bandwidth signal by a factor greater than or equal to 5 and less than or equal to 10 to generate the symbols of the PPDU including 128 total OFDM tones, and down-clocking an 80 MHz bandwidth signal by a factor greater than or equal to 10 and less than or equal to 20 to generate the symbols of the PPDU including 256 total OFDM tones. According to one aspect, the first signal (e.g., 40 MHz and 80 MHz bandwidth signals) is defined in accordance with the 802.11ac standard of the Institute of Electronics and Electrical Engineers (IEEE). According to another aspect, each symbol of the preamble has a cyclic prefix duration greater than or equal to 4 μsec and less than or equal to 8 μsec if the symbols of the PPDU each include 128 total OFDM tones, or greater than or equal to 8 μsec and less than or equal to 16 μsec if the symbols of the PPDU each include 256 total OFDM tones.

According to another aspect, a symbol duration, including a cyclic prefix duration, of each preamble symbol of the PPDU is greater than or equal to 20 μsec and less than or equal to 40 μsec if the symbols of the PPDU each include 128 total OFDM tones, or greater than or equal to 40 μsec and less than or equal to 80 μsec if the symbols of the PPDU each include 256 total OFDM tones. According to one aspect, the wireless transmitter 2818 and/or the preamble configuration circuit 2816 generates the PPDU by down-clocking the first signal having the first bandwidth by a factor to generate the PPDU having the second bandwidth, the first signal having a first signal preamble that includes two legacy short training field (STF) symbols, two legacy long training (LTF) field symbols, one first signal field symbol, two very high throughput (VHT) signal A field symbols, one VHT STF field symbol, at least one VHT LTF field symbol, and one first signal B field symbol, and wherein the preamble further includes a short training field (STF) symbol, two long training field (LTF) symbols, a beamforming signal (BF-SIG) field symbol for a multi-user, multiple-input multiple-output (MU-MIMO)

mode or a single-user beamformed (SU-BF) mode, a precoded short training (PC-STF) field symbol, and at least one precoded long training (PC-LTF) field.

Figure 29:
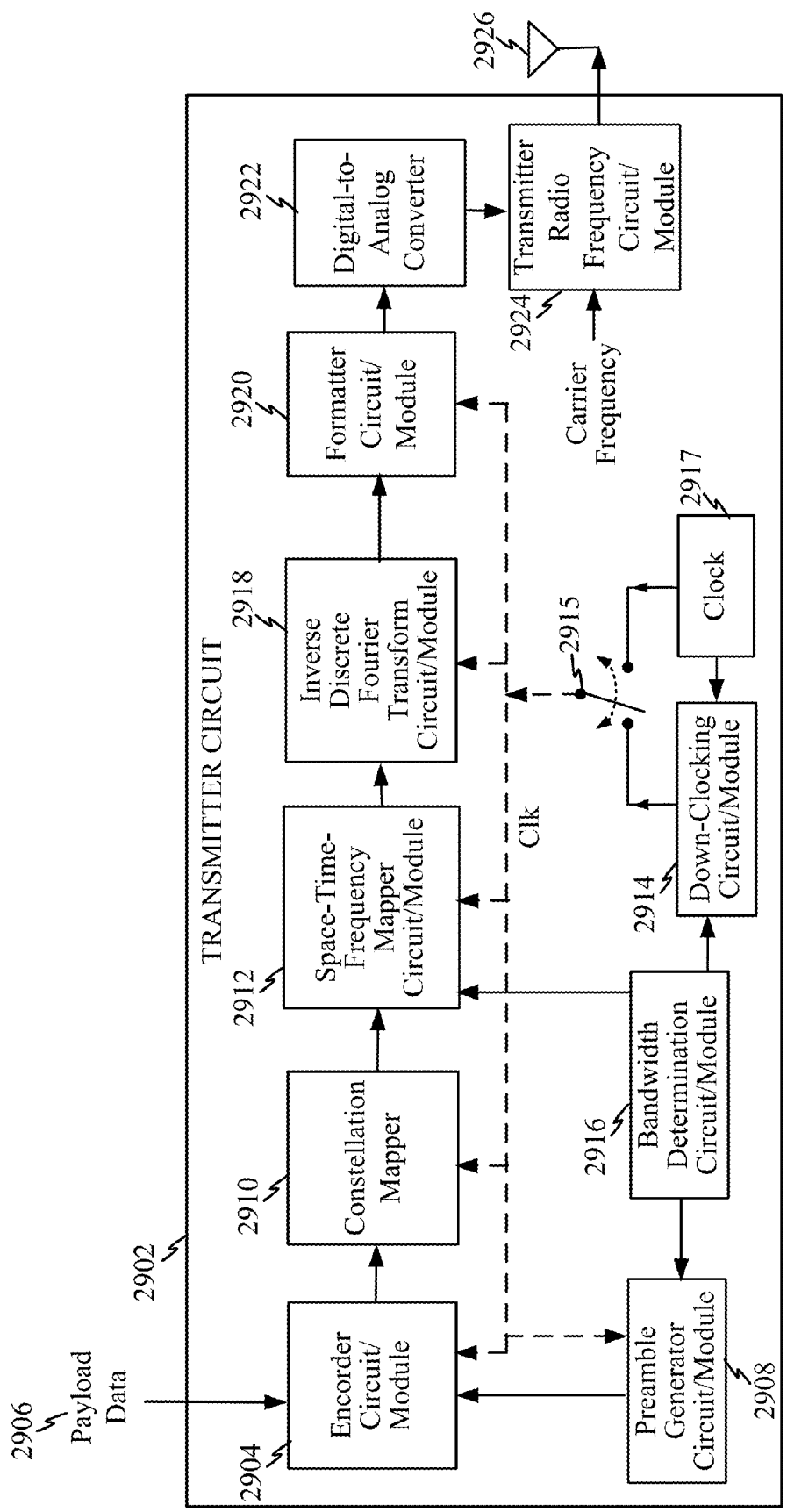
FIG. 29 is a block diagram illustrating one configuration of a transmitter circuit in which systems and methods for downclocking a waveform and generating PPDU preambles for use in a television unused channel may be implemented.

FIG. 29 is a block diagram illustrating one configuration of a transmitter circuit 2902 in which systems and methods for down-clocking a waveform and generating PPDU preambles for use in a television unused channel may be implemented. The transmitter circuit 2902 may be an example of the transmitter circuit 2712 of FIG. 27. The transmitter circuit 2902 may include an encoder 2904 with an input for receiving payload data 2906 and/or preamble data 2908 to be transmitted to one or more receiving communication devices. The payload data 2906 may include voice, video, audio and/or other data. The preamble data 2908 may include control information, such as information that specifies a data rate, modulation and coding rate scheme (MCS), channel bandwidth, etc. The encoder 2904 may encode data for forward error correction (FEC), encryption, packeting and/or other encodings known for use with wireless transmission.

A constellation mapper 2910 maps the data provided by the encoder 2904 into constellations. For instance, the constellation mapper 2910 may use modulation schemes such as binary phase-shift keying (BPSK), quadrature amplitude modulation (QAM), etc. Where quadrature-amplitude modulation (QAM) is used, for example, the constellation mapper 2910 may provide two bits per spatial stream, per data subcarrier, per symbol period. Furthermore, the constellation mapper 2910 may output a 16-QAM constellation signal for each spatial stream for each data subcarrier for each symbol period. Other modulations may be used, such as 64-QAM, which would result in a consumption of six bits per spatial stream, per data subcarrier, per symbol period. Other variations are also possible.

The output of the constellation mapper 2910 is provided to a space-time-frequency mapper 2912 that maps the data onto Spatial-Time-Frequency (STF) dimensions of the transmitter. The dimensions represent various constructs or resources that allow for data to be allocated. A given bit or set of bits (e.g., a grouping of bits, a set of bits that correspond to a constellation point, etc.) may be mapped to a particular place among the dimensions. In general, bits and/or signals mapped to different places among the dimensions are transmitted from the transmitter circuit 2902 such that they are expected to be, with some probability, differentiable at one or more receiving communication devices. In one configuration, the space-time-frequency mapper 2912 may perform space-time block coding (STBC).

One or more spatial streams may be transmitted from the transmitter circuit 2902 such that the transmissions on different spatial streams may be differentiable at a receiver (with some probability). For example, bits mapped to one spatial dimension are transmitted as one spatial stream. That spatial stream may be transmitted on its own antenna spatially separate from other antennas, its own orthogonal superposition over a plurality of spatially-separated antennas, its own polarization, etc. Many techniques for spatial stream separation (involving separating antennas in space or other techniques that would allow their signals to be distinguished at a receiver, for example) are known and can be used.

In the case that the transmitter circuit 2902 uses a plurality of frequency subcarriers, there are multiple values for the frequency dimension, such that the space-time-frequency mapper 2912 may map some bits to one frequency subcarrier and other bits to another frequency subcarrier. Other frequency subcarriers may be reserved as guard bands, pilot tone subcarriers, or the like that do not (or do not always) carry data. For example, there may be one or more data subcarriers and one or more pilot subcarriers. It should be noted that, in some instances or configurations, not all subcarriers may be excited at once. For instance, some tones may not be excited to enable filtering. In one configuration, the transmitter circuit 2902 may utilize orthogonal frequency-division multiplexing (OFDM) for the transmission of multiple subcarriers. For instance, the space-time-frequency mapper 2912 may map (encoded) data 2906 to space, time and/or frequency resources according to the multiplexing scheme used.

The time dimension refers to symbol periods. Different bits may be allocated to different symbol periods. Where there are multiple spatial streams, multiple subcarriers and/or multiple symbol periods, the transmission for one symbol period may be referred to as an OFDM (orthogonal frequency-division multiplexing) MIMO (multiple-input, multiple-output) symbol. A transmission rate for encoded data may be determined by multiplying the number of bits per simple symbol (e.g., $\log_2$ of the number of constellations used) times the number of spatial streams times the number of data subcarriers, divided by the length of the symbol period. Thus, the space-time-frequency mapper 2912 may map bits (or other units of input data) to one or more spatial streams, data subcarriers and/or symbol periods. Separate spatial streams may be generated and/or transmitted using separate paths. In some implementations, these paths are implemented with distinct hardware, whereas in other implementations, the path hardware is reused for more than one spatial stream or the path logic is implemented in software that executes for one or more spatial streams. More specifically, each of the elements illustrated in the transmitter circuit 2902 may be implemented as a single block/module or as multiple blocks/modules. The output(s) of the space-time-frequency mapper 2912 may be spread over frequency and/or spatial dimensions.

The transmitter circuit 2902 may be adapted to dynamically select between a clock 2917 and/or a down-clocked version of the clock 2917. In particular, a down-clocking circuit/module 2914 may apply a factor to the clock 2917, thereby reducing the frequency of the clock 2917. The selected clock signal (Clk) is provided to one or more components of the transmitter chain (e.g., encoder circuit 2904, constellation mapper 2910, space-time-frequency mapper 2912, inverse discrete Fourier Transform 2918, and/or formatter 2920). Reduction in clock frequency by down-clocking results in a reduction of the waveform bandwidth from a first bandwidth (e.g., if the frequency of the clock 2917 had been used) to a second bandwidth (using the frequency of the down-clocking circuit 2914).

The transmitter circuit 2902 may also include a bandwidth determination block/module 2916. The bandwidth determination block/module 2916 may determine channel bandwidth to be used for transmissions to one or more receiving communication devices. This determination may be based on one or more factors, such as receiving communication device compatibility, channel quality, unused channel(s) in television frequency spectrum, etc. In one configuration, the bandwidth determination block/module 2916 may determine whether the bandwidth for signal transmission is 4, MHz, 5 MHz, 6 MHz, 8 MHz, 10 MHz, etc. (i.e., 4 MHz to 10 MHz, inclusive). The bandwidth determination circuit/module 2916 may provide a bandwidth indication to the space-time-frequency mapper 2912, the down-clocking circuit/module 2914 and/or the preamble generator circuit/module 2908. Additionally or alternatively, the bandwidth indication may be provided as part of preamble data where one or more bits in the preamble may be allocated to represent the bandwidth indication.

The space-time-frequency mapper 2912 may use the bandwidth indication to map the preamble data to a number of tones (e.g., subcarriers). For example, the systems and methods disclosed herein may define a number of OFDM tones or subcarriers that may be used by the transmitter circuit 2902 for the transmission of preamble data based on the channel bandwidth (as specified by the bandwidth indication, for example). The number of OFDM tones may also be specified according to a particular preamble field. For example, the space-time-frequency mapper 2912 may map preamble data to a number of OFDM tones based on the bandwidth determination and the preamble field.

The waveform from the space-time-frequency mapper circuit/module 2912 may be provided to an inverse discrete Fourier transform (IDFT) circuit/module 2918. The inverse discrete Fourier transform (IDFT) circuit/module 2918 may convert the frequency-domain waveform into time domain signals representing the down-clocked waveform over one or more spatial streams and/or time-domain samples for a symbol period. In one configuration, for example, the IDFT circuit/module 120 may perform a 128-point and/or 256-point inverse fast Fourier transform (IFFT).

The time-domain down-clocked waveform may then be provided to a formatter 2920. The formatter 2920 may take the output of the inverse discrete Fourier transform (IDFT) circuit/module 2918, convert it from parallel signals to serial (P/S), add a cyclical prefix and/or perform guard interval windowing, etc. The formatter 2920 output may be provided to a digital-to-analog converter (DAC) 2922. The digital-to-analog converter (DAC) 2922 may convert the formatter 2920 output from one or more digital signals to one or more analog signals. The digital-to-analog converter (DAC) 2922 may provide the analog signal(s) to one or more transmitter radio-frequency (TX RF) circuits/module 2924.

The transmitter radio frequency circuit/module 2926 may be coupled to or include a power amplifier. The power amplifier may amplify the analog signal(s) for transmission. The transmitter radio frequency circuit/module 2926 may output radio-frequency (RF) signals to one or more antennas 2926, thereby transmitting the data 2906 that was input to the encoder 2904 over a wireless medium suitably configured for receipt by one or more receiving communication devices. One or more receiving communication devices may receive and use signals from the transmitter circuit 2902. For example, a receiving communication device may use a received bandwidth indicator to receive a given number of OFDM tones or subcarriers. The transmitter circuits 2712/2902 and/or transmitter device 2802 may be adapted to perform one or more features illustrated in FIGS. 2-25.

Figure 30:
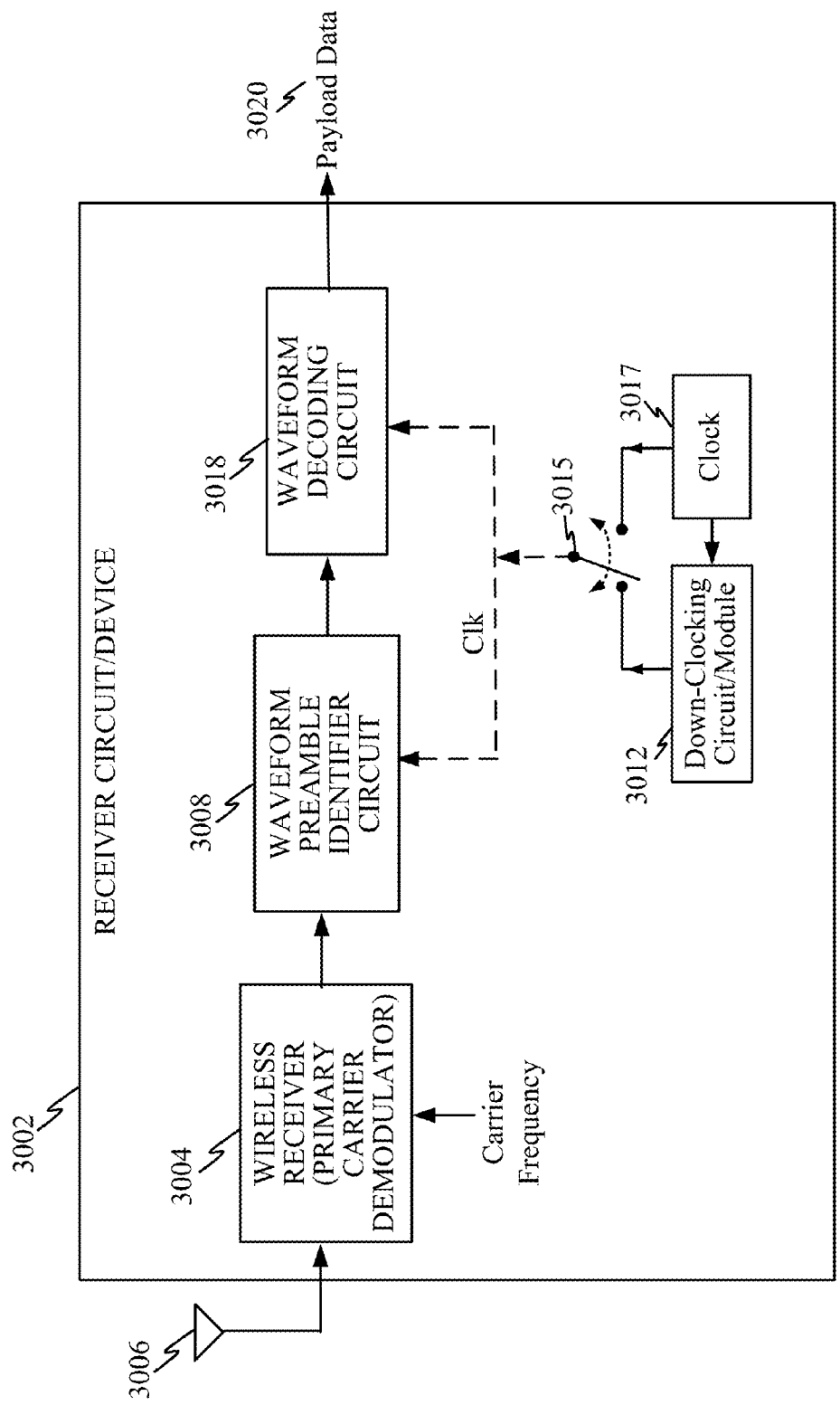
FIG. 30 is a block diagram illustrating an exemplary receiver circuit/device that may be adapted to receive wireless transmissions over a television white space channel.

FIG. 30 is a block diagram illustrating an exemplary receiver circuit/device 3002 that may be adapted to receive wireless transmissions over a television white space channel. A wireless receiver 3004 (e.g., primary carrier modulator) may receive a waveform via one or more antenna 3006 and demodulates the received waveform from a primary carrier frequency. A waveform preamble identifier circuit 3008 may then use a preamble of the received waveform to identify it. A waveform decoding circuit 3018 may then decode the received waveform to obtain a data payload 3020.

In one example, the receiver circuit/device 3002 may dynamically adjust its clock signal (Clk) used by the receiver chain (e.g., waveform preamble identifier 3008 and/or waveform decoding circuit 3018). For instance, receiver chain may utilize a clock 3017 or a down-clocked version (e.g., lower frequency) of the clock 3017. A down-clocking circuit/module 3012 may serve to reduce the frequency of the clock 3017 and provide a lower frequency clock (via switch 3015) to the receiver chain.

In one example, the wireless receiver 3004, the waveform preamble identifier circuit 3008, and/or the waveform decoding circuit 3018 may be adapted to receive, in the television broadcast frequency spectrum, a PPDU having a preamble and a payload, wherein symbols of the PPDU each include 128 total (orthogonal frequency-division multiplexing) OFDM tones or 256 total OFDM tones, and the preamble includes a signal (SIG) field symbol having 108 OFDM data tones if the symbols of the PPDU include 128 total OFDM tones or having 234 OFDM data tones if the symbols of the PPDU include 256 total OFDM tones, the SIG field symbol indicating at least one of an amount of data in the payload or a length of time that the PPDU will occupy the television broadcast frequency spectrum. According to one aspect, the preamble further includes a short training field (STF) symbol having every eighth tone populated if the symbols of the PPDU each include 128 total OFDM tones or having every sixteenth tone populated if the symbols of the PPDU each include 256 total OFDM tones. According to another aspect, the preamble further may include a short training field (STF) symbol having a repetition interval greater than or equal to 2 microseconds (μs) and less than or equal to 4 μs if the symbols of the PPDU each include 128 total OFDM tones or having a repetition interval greater than or equal to 4 μs and less than or equal to 8 μs if the symbols of the PPDU each include 256 total OFDM tones. According to another aspect, the SIG field symbol includes 54 bits of data if the symbols of the PPDU each include 128 total OFDM tones or 117 bits of data if the symbols of the PPDU each include 256 total OFDM tones. According to another aspect, the SIG field symbol further indicates a bandwidth of the payload, a modulation and coding rate scheme of the payload, and a number of spatial streams of the payload.

The waveform decoding circuit 3018 may be adapted to process the received waveform by applying a down-clocking factor to a clock of the receiver device 3002 that causes the receiver 3002 device to process the received waveform according to the second bandwidth (e.g., 4-10 MHz) to obtain a data payload from the received waveform.

Figure 31:
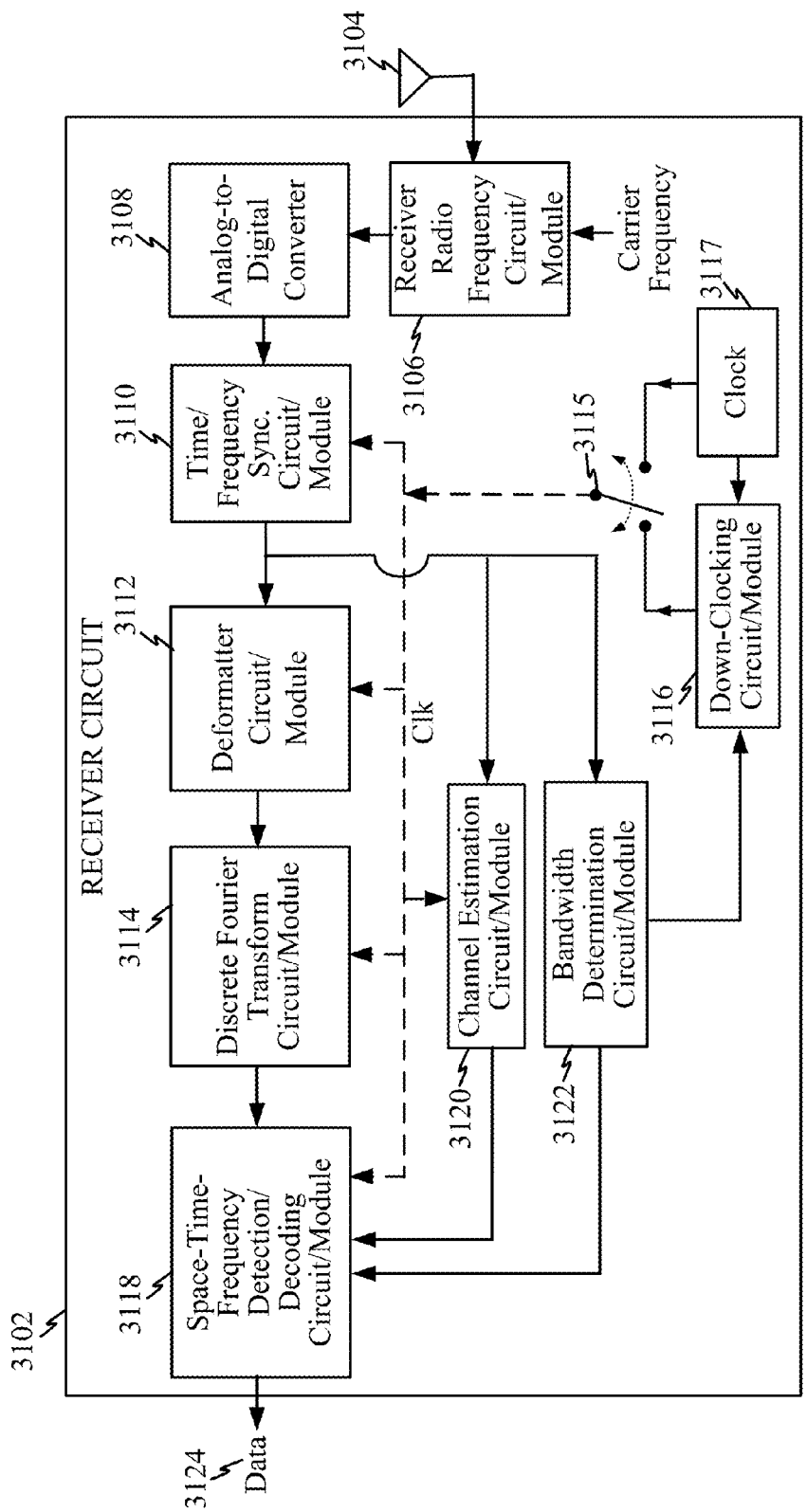
FIG. 31 is a block diagram illustrating an exemplary receiver circuit in which systems and methods for receiving data waveforms in an unused television channel may be implemented.

FIG. 31 is a block diagram illustrating an exemplary receiver circuit 3102 in which systems and methods for receiving data waveforms in an unused television channel may be implemented. For example, the receiver circuit 3102 may include one or more antennas 3104 that feed to one or more receiver radio-frequency circuits/modules 3106. The one or more receiver radio-frequency circuits/modules 3106 may output analog signals to one or more analog-to-digital converters (ADCs) 3108. For example, a receiver radio-frequency circuits/modules 3106 may receive and down-convert a signal, which may be provided to an analog-to-digital converter 3108. As with the transmitter circuit 2902 (See FIG. 29), the number of spatial streams processed may or may not be equal to the number of antennas 3104. Furthermore, each spatial stream need not be limited to one antenna 3104, as various beamsteering, orthogonalization, etc., techniques may be used to arrive at a plurality of receiver streams.

The one or more analog-to-digital converters (ADCs) 3108 may convert the received analog signal(s) to one or more digital signal(s). These output(s) of the one or more analog-to-digital converters (ADCs) 3108 may be provided to one or more time and/or frequency synchronization circuits/modules 3110. A time and/or frequency synchronization circuit/ module 3110 may (attempt to) synchronize or align the digital signal in time and/or frequency (to a receiver circuit clock, for example).

The (synchronized) output of the time and/or frequency synchronization circuit/module 3110 may be provided to a deformatter circuit/module 3112. For example, the deformatter circuit/module 3112 may receive an output of the time and/or frequency synchronization circuit/module 3110, remove prefixes, etc. and/or parallelize the data for discrete Fourier transform (DFT) processing.

The deformatter circuit/module 3112 output may be provided to a discrete Fourier transform (DFT) circuit/module 3114. The discrete Fourier transform (DFT) circuit/module 3116 may convert one or more signals from the time domain to the frequency domain. The output from the discrete Fourier transform (DFT) circuit/module 3114 may then be processed by a space-time-frequency detection and/or decoding circuit/module 3118. The space-time-frequency detection and/or decoding circuit/module 3118 may output received data 3124 (e.g., the receiver circuit's estimation of the payload data 2904 transmitted by the transmitter circuit 2902).

In some configurations, the receiver circuit 3102 knows the transmit sequences sent as part of a total information sequence. The receiver circuit 3102 may perform channel estimation with the aid of these known transmit sequences. To assist with pilot tone tracking, processing and/or data detection and decoding, a channel estimation circuit/module 3120 may provide estimation signals to the space-time-frequency detection and/or decoding circuit/module 3118 based on the output from the time and/or frequency synchronization circuit/module 3110. Alternatively, if the de-formatting and discrete Fourier transform is the same for the known transmit sequences as for the payload data portion of the total information sequence, the estimation signals may be provided to the space-time-frequency detection and/or decoding circuit/module 3118 based on the output from the discrete Fourier transform (DFT) circuit/module 3114.

A bandwidth determination circuit/module 3122 may use the time/frequency synchronization circuit/module 3110 output to determine a channel bandwidth (for received communications). For example, the bandwidth determination circuit/module 3122 may receive a bandwidth indication from the transmitter circuit 2902 (See FIG. 29) that indicates a channel bandwidth. For instance, the bandwidth determination circuit/module 3122 may obtain an explicit or implicit bandwidth indication. In one configuration, the bandwidth indication may indicate a channel bandwidth of 4 MHz, 5 MHz, 6 MHz, 8 MHz, 10 MHz, etc. (i.e., 4-10 MHz, inclusive). The bandwidth determination circuit/module 3122 may determine the bandwidth for received communications based on this indication and provide an indication of the determined bandwidth to the space-time-frequency detection/decoding circuit/module 3118. The space-time frequency detection/decoding circuit/module 3118 may use the determined bandwidth indication to detect and/or decode preamble data and/or payload data from the received signal.

The receiver circuit 3102 may be adapted to dynamically select between a clock 3117 and/or a down-clocked version of the clock 3117. In particular, a down-clocking circuit/module 3116 may apply a factor to the clock 3117, thereby reducing the frequency of the clock 3117. The selected clock signal (Clk) is provided to one or more components of the receiver chain (e.g., time-frequency synchronization circuit/module 3110, deformatter 3112, discrete Fourier Transform 3114, and/or space-time-frequency detection/decoding circuit 3118). Reduction in clock frequency by down-clocking results in a reduction of the waveform bandwidth from a first bandwidth (e.g., if the frequency of the clock 3117 had been used) to a second bandwidth (using the frequency of the down-clocking circuit 3116). This allows the receiver circuit 3102 to monitor and/or receive transmissions over unused television channels that may have a smaller bandwidth than the clock 3117 can provide. Additionally, to compensate for the reduction in bandwidth, the receiver chain may be adapted to use more sub-carriers when decoding the received waveform. The receiver circuits 2716/3102 and/or receiver device 3002 may be adapted to perform one or more features illustrated in FIGS. 2-24 and 26.

One or more of the components, steps, features, and/or functions illustrated in FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, and/or 31 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 27, 28, 29, 30, and/or 31 may be configured to perform one or more of the methods, features, or steps described in FIGS. 2, 3, 4, 5, 6, 7, 8, 9, 10, 11, 12, 13, 14, 15, 16, 17, 18, 19, 20, 21, 22, 23, 24, 25, and/or 26. The algorithms described herein may also be efficiently implemented in software and/or embedded in hardware.

Moreover, in one aspect of the disclosure, the processing circuit 2702 illustrated in FIG. 27 may be a specialized processor (e.g., an application specific integrated circuit (e.g., ASIC)) that is specifically designed and/or hard-wired to perform the algorithms, methods, and/or steps described in FIGS. 2, 3, 4, 5, 6, 7, 8, 9, 10, 11, 12, 13, 14, 15, 16, 17, 18, 19, 20, 21, 22, 23, 24, 25, and/or 26. Thus, such a specialized processor (e.g., ASIC) may be one example of a means for executing the algorithms, methods, and/or steps described in FIGS. 2, 3, 4, 5, 6, 7, 8, 9, 10, 11, 12, 13, 14, 15, 16, 17, 18, 19, 20, 21, 22, 23, 24, 25, and/or 26. The memory circuit 2704 may also store processor 2702 readable instructions that when executed by a specialized processor (e.g., ASIC) causes the specialized processor to perform the algorithms, methods, and/or steps described in FIGS. 2, 3, 4, 5, 6, 7, 8, 9, 10, 11, 12, 13, 14, 15, 16, 17, 18, 19, 20, 21, 22, 23, 24, 25, and/or 26.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for wireless communication, the method comprising:
    generating a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and wherein the preamble includes:
        a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, wherein the SIG field symbol further indicates whether the payload is to be transmitted in a single user mode or a multi-user mode, and if the payload is to be transmitted in the multi-user mode the SIG field symbol further indicates a group identifier (ID) that identifies at least one receiver of the payload; and
        a signal B (SIG-B) field symbol that indicates a modulation and coding rate scheme associated with the payload; and
    transmitting the PPDU via a television broadcast frequency spectrum.

2. The method of claim 1, wherein generating the PPDU includes down-clocking a first signal having a first bandwidth by a factor to generate the PPDU having a second bandwidth, the first signal having a first signal preamble that includes a first short training field (STF) having two or more symbols, the first STF having a first STF time duration, and the preamble further includes:
    a second STF having a second STF time duration, wherein the second STF time duration is less than the first STF time duration multiplied by the factor.

3. The method of claim 2, wherein the second STF time duration is equal to half of the first STF time duration multiplied by the factor.

4. The method of claim 2, wherein the second STF includes only one symbol.

5. The method of claim 2, wherein
    if the symbols of the PPDU each include 128 total OFDM tones then the first bandwidth is 40 MHz, the second bandwidth is greater than or equal to four (4) MHz and less than or equal to eight (8) MHz, the first STF time duration is equal to eight (8) µsec, and the second STF time duration is greater than or equal to 20 µsec and less than or equal to 40 µsec, and
    if the symbols of the PPDU each include 256 total OFDM tones then the first bandwidth is 80 MHz, the second bandwidth is greater than or equal to four (4) MHz and less than or equal to eight (8) MHz, the first STF time duration is eight (8) µsec, and the second STF time duration is greater than or equal to 40 µsec and less than or equal to 80 µsec.

6. The method of claim 1, wherein the preamble further includes:

a short training field (STF) symbol having every eighth tone or sixteenth tone populated if the symbols of the PPDU each include 128 total OFDM tones or having every sixteenth tone populated if the symbols of the PPDU each include 256 total OFDM tones.

7. The method of claim 1, wherein the preamble further includes:
a short training field (STF) symbol having a repetition interval greater than or equal to 2 microseconds (μs) and less than or equal to 4 μs if the symbols of the PPDU each include 128 total OFDM tones or having a repetition interval greater than or equal to 4 μs and less than or equal to 8 μs if the symbols of the PPDU each include 256 total OFDM tones.

8. The method of claim 1, wherein generating the PPDU includes down-clocking a first signal having a first bandwidth by a factor to generate the PPDU having a second bandwidth, the first signal having a first signal preamble including at least ten (10) symbols, wherein the preamble of the PPDU has seven (7) symbols.

9. The method of claim 1, wherein generating the PPDU includes down-clocking a first signal having a first bandwidth by a factor to generate the PPDU having a second bandwidth, the first signal having a first signal preamble, the first signal preamble having a first signal preamble time duration, wherein a time duration of the preamble of the PPDU is less than 82% of the first signal preamble time duration multiplied by the factor.

10. The method of claim 1, wherein the SIG field symbol includes 54 bits of data if the symbols of the PPDU each include 128 total OFDM tones or 117 bits of data if the symbols of the PPDU each include 256 total OFDM tones.

11. The method of claim 1, wherein the SIG field symbol further indicates a bandwidth of the payload, and a number of spatial streams of the payload.

12. The method of claim 1, wherein the SIG field symbol further indicates whether one or more symbols of the preamble or the payload are beamformed.

13. The method of claim 1, wherein the SIG field symbol is modulated using quadrature binary phase shift keying (QBPSK) to indicate whether one or more symbols of the preamble or the payload are beamformed.

14. The method of claim 1, wherein a bandwidth of the PPDU is greater than or equal to 5 MHz and less than or equal to 6 MHz if the symbols of the PPDU each include 128 total OFDM tones, or the bandwidth of the PPDU is 8 MHz if the symbols of the PPDU each include 256 total OFDM tones.

15. The method of claim 1, wherein the television broadcast frequency spectrum is less than 1 GHz.

16. The method of claim 1, wherein generating the PPDU includes down-clocking a first signal having a first bandwidth by a factor to generate the PPDU having a second bandwidth, the first signal having a first signal preamble that includes two legacy short training field (STF) symbols, two legacy long training (LTF) field symbols, one first signal field symbol, two very high throughput (VHT) signal A field symbols, one VHT STF field symbol, at least one VHT LTF field symbol, and one first signal B field symbol, and wherein the preamble further includes:
a short training field (STF) symbol;
two long training field (LTF) symbols;
a beamforming signal (BF-SIG) field symbol for a multi-user, multiple-input multiple-output (MU-MIMO) mode or a single-user beamformed (SU-BF) mode;
a precoded short training (PC-STF) field symbol; and
at least one precoded long training (PC-LTF) field symbol.

17. A wireless transmitter apparatus configured for wireless communication using a television broadcast frequency spectrum, the apparatus comprising:
a processing circuit adapted to generate a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and wherein the preamble includes:
a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, wherein the SIG field symbol further indicates whether the payload is to be transmitted in a single user mode or a multi-user mode, and if the payload is to be transmitted in the multi-user mode the SIG field symbol further indicates a group identifier (ID) that identifies at least one receiver associated with the payload; and
a signal B (SIG-B) field symbol that indicates a modulation and coding rate scheme associated with the payload; and
a wireless transmitter communicatively coupled to the processing circuit and adapted to transmit the PPDU via the television broadcast frequency spectrum.

18. The wireless transmitter apparatus of claim 17, wherein the processing circuit is further adapted to down-clock a first signal having a first bandwidth by a factor to generate the PPDU having a second bandwidth, the first signal having a first signal preamble that includes a first short training field (STF) having two or more symbols, the first STF having a first STF time duration, and wherein the preamble further includes:
a second STF having a second STF time duration, wherein the second STF time duration is less than the first STF time duration multiplied by the factor.

19. The wireless transmitter apparatus of claim 17, wherein the preamble further includes:
a short training field (STF) symbol having every eighth tone or sixteenth tone populated if the symbols of the PPDU each include 128 total OFDM tones or having every sixteenth tone populated if the symbols of the PPDU each include 256 total OFDM tones.

20. The wireless transmitter apparatus of claim 17, wherein the processing circuit is further adapted to down-clock a first signal having a first bandwidth by a factor to generate the PPDU having a second bandwidth, the first signal having a first signal preamble including at least ten (10) symbols, wherein the preamble of the PPDU has seven (7) symbols.

21. The wireless transmitter apparatus of claim 17, wherein the processing circuit is further adapted to down-clock a first signal having a first bandwidth by a factor to generate the PPDU having a second bandwidth, the first signal having a first signal preamble that includes two legacy short training field (STF) symbols, two legacy long training (LTF) field symbols, one first signal field symbol, two very high throughput (VHT) signal A field symbols, one VHT STF field symbol, at least one VHT LTF field symbol, and one first signal B field symbol, and wherein the preamble further includes:
a short training field (STF) symbol;
two long training field (LTF) symbols;
a beamforming signal (BF-SIG) field symbol for a multi-user, multiple-input multiple-output (MU-MIMO) mode or a single-user beamformed (SU-BF) mode;

a precoded short training (PC-STF) field symbol; and
at least one precoded long training (PC-LTF) field symbol.

22. A wireless transmitter apparatus configured for wireless communication via a television broadcast frequency spectrum, the apparatus comprising:
means for generating a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and wherein the preamble includes:
a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, wherein the SIG field symbol further indicates whether the payload is to be transmitted in a single user mode or a multi-user mode, and if the payload is to be transmitted in the multi-user mode the SIG field symbol further indicates a group identifier (ID) that identifies at least one receiver associated with the payload; and
a signal B (SIG-B) field symbol that indicates a modulation and coding rate scheme associated with the payload; and
means for transmitting the PPDU via the television broadcast frequency spectrum.

23. A non-transitory processor-readable medium having one or more instructions stored thereon for wireless communication, which when executed by at least one processor causes the processor to:
generate a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and wherein the preamble includes:
a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, wherein the SIG field symbol further indicates whether the payload is to be transmitted in a single user mode or a multi-user mode, and if the payload is to be transmitted in the multi-user mode the SIG field symbol further indicates a group identifier (ID) that identifies at least one receiver associated with the payload; and
a signal B (SIG-B) field symbol that indicates a modulation and coding rate scheme associated with the payload; and
transmit the PPDU via a television broadcast frequency spectrum.

24. A method for wireless communication, the method comprising:
receiving in a television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and wherein the preamble includes:
a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time that to transmit the PPDU, wherein the SIG field symbol further indicates whether the PPDU is a single user PPDU or a multi-user PPDU, and if the PPDU is a multi-user PPDU the SIG field symbol further indicates a group identifier (ID) that identifies at least one receiver associated with the payload; and
a signal B (SIG-B) field symbol that indicates a modulation and coding rate scheme associated with the payload.

25. The method of claim 24, wherein the preamble further includes:
a short training field (STF) symbol having a repetition interval greater than or equal to 2 microseconds (µs) and less than or equal to 4 µs if the symbols of the PPDU each include 128 total OFDM tones or having a repetition interval greater than or equal to 4 µs and less than or equal to 8 µs if the symbols of the PPDU each include 256 total OFDM tones.

26. The method of claim 24, wherein the SIG field symbol includes 54 bits of data if the symbols of the PPDU each include 128 total OFDM tones or 117 bits of data if the symbols of the PPDU each include 256 total OFDM tones.

27. The method of claim 24, wherein the SIG field symbol further indicates a bandwidth of the payload, and a number of spatial streams of the payload.

28. The method of claim 24, wherein the SIG field symbol further indicates whether one or more symbols of the preamble or the payload are beamformed.

29. The method of claim 24, wherein the SIG field symbol is modulated using quadrature binary phase shift keying (QBPSK) to indicate whether one or more symbols of the preamble or the payload are beamformed.

30. The method of claim 24, wherein a bandwidth of the PPDU is greater than or equal to 5 MHz and less than or equal to 6 MHz if the symbols of the PPDU each include 128 total OFDM tones, or the bandwidth of the PPDU is 8 MHz if the symbols of the PPDU each include 256 total OFDM tones.

31. The method of claim 24, wherein the television broadcast frequency spectrum is less than 1 GHz.

32. The method of claim 24, wherein the preamble further includes:
a short training field (STF) symbol;
two long training field (LTF) symbols;
a beamforming signal (BF-SIG) field symbol for a multi-user, multiple-input multiple-output (MU-MIMO) mode or a single-user beamformed (SU-BF) mode;
a precoded short training (PC-STF) field symbol; and
at least one precoded long training (PC-LTF) field symbol.

33. The method of claim 24, wherein receiving the PPDU includes:
applying a down-clocking factor to a clock of a receiver, the down-clocking factor associated with a bandwidth of the received PPDU.

34. A wireless receiver apparatus for wireless communication, the apparatus comprising:
a wireless receiver adapted to receive in a television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and wherein the preamble includes:

a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time that to transmit the PPDU, wherein the SIG field symbol further indicates whether the PPDU is a single user PPDU or a multi-user PPDU, and if the PPDU is a multi-user PPDU the SIG field symbol further indicates a group identifier (ID) that identifies at least one receiver associated with the payload; and a signal B (SIG-B) field symbol that indicates a modulation and coding rate scheme associated with the payload; and a processing circuit communicatively coupled to the wireless receiver and adapted to process the PPDU received.

35. The wireless receiver apparatus of claim 34, wherein the processing circuit is further adapted to apply a down-clocking factor to a clock of the wireless receiver apparatus, the down-clocking factor associated with a bandwidth of the received PPDU.

36. The wireless receiver apparatus of claim 34, wherein the preamble further includes:
a short training field (STF) symbol having every eighth tone populated if the symbols of the PPDU each include 128 total OFDM tones or having every sixteenth tone populated if the symbols of the PPDU each include 256 total OFDM tones.

37. The wireless receiver apparatus of claim 34, wherein the SIG field symbol includes 54 bits of data if the symbols of the PPDU each include 128 total OFDM tones or 117 bits of data if the symbols of the PPDU each include 256 total OFDM tones.

38. The wireless receiver apparatus of claim 34, wherein a bandwidth of the PPDU is greater than or equal to 5 MHz and less than or equal to 6 MHz if the symbols of the PPDU each include 128 total OFDM tones, or the bandwidth of the PPDU is 8 MHz if the symbols of the PPDU each include 256 total OFDM tones.

39. The wireless receiver apparatus of claim 34, wherein each symbol of the preamble has a cyclic prefix duration greater than or equal to 4 μsec and less than or equal to 8 μsec if the symbols of the PPDU each include 128 total OFDM tones, or greater than or equal to 8 μsec and less than or equal to 16 μsec if the symbols of the PPDU each include 256 total OFDM tones.

40. The wireless receiver apparatus of claim 34, wherein the preamble further includes:
a short training field (STF) symbol;
two long training field (LTF) symbols;
a beamforming signal (BF-SIG) field symbol for a multi-user, multiple-input multiple-output (MU-MIMO) mode or a single-user beamformed (SU-BF) mode;
a precoded short training (PC-STF) field symbol; and
at least one precoded long training (PC-LTF) field symbol.

41. A wireless receiver apparatus for wireless communication, the apparatus comprising:
means for receiving via a television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and wherein the preamble includes:
a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, wherein the SIG field symbol further indicates whether the PPDU is a single user PPDU or a multi-user PPDU, and if the PPDU is a multi-user PPDU the SIG field symbol further indicates a group identifier (ID) that identifies at least one receiver associated with the payload; and
a signal B (SIG-B) field symbol that indicates a modulation and coding rate scheme associated with the payload; and
means for processing the PPDU.

42. A non-transitory processor-readable medium having one or more instructions stored thereon for wireless communication, which when executed by at least one processor causes the processor to:
receive in a television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, and wherein the preamble includes:
a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, wherein the SIG field symbol further indicates whether the PPDU is a single user PPDU or a multi-user PPDU, and if the PPDU is a multi-user PPDU the SIG field symbol further indicates a group identifier (ID) that identifies at least one receiver associated with the payload; and
a signal B (SIG-B) field symbol that indicates a modulation and coding rate scheme associated with the payload.

43. A method for wireless communication, the method comprising:
generating a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, wherein the preamble includes a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, wherein generating the PPDU includes down-clocking a first signal having a first bandwidth by a factor to generate the PPDU having a second bandwidth, the first signal having a first signal preamble that includes a first SIG field having at least one symbol, and wherein the symbol of the first SIG field is limited to 48 OFDM data tones per 20 MHz sub-band of the first signal; and
transmitting the PPDU via a television broadcast frequency spectrum.

44. The method of claim 43, wherein the preamble further includes:
a beamformed signal (BF-SIG) field that indicates at least one of a group identifier (ID) that identifies at least one intended receiver of the payload, a number of spatial streams for the payload for each user of a plurality of users, and/or a modulation and coding rate scheme for the payload for each user of the plurality of users.

45. A method for wireless communication, the method comprising:
generating a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, wherein the preamble includes a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, and wherein generating the PPDU comprises:
  down-clocking a 40 MHz bandwidth signal by a factor greater than or equal to 5 and less than or equal to 10 to generate the symbols of the PPDU including 128 total OFDM tones, and
  down-clocking an 80 MHz bandwidth signal by a factor greater than or equal to 10 and less than or equal to 20 to generate the symbols of the PPDU including 256 total OFDM tones; and
transmitting the PPDU via a television broadcast frequency spectrum.

46. The method of claim 45, wherein the 40 MHz and 80 MHz bandwidth signals are defined in accordance with the 802.11ac standard of the Institute of Electronics and Electrical Engineers (IEEE).

47. A method for wireless communication, the method comprising:
generating a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, wherein the preamble includes a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, and wherein each symbol of the preamble has a cyclic prefix duration greater than or equal to 4 μsec and less than or equal to 8 μsec if the symbols of the PPDU each include 128 total OFDM tones, or greater than or equal to 8 μsec and less than or equal to 16 μsec if the symbols of the PPDU each include 256 total OFDM tones; and
transmitting the PPDU via a television broadcast frequency spectrum.

48. A method for wireless communication, the method comprising:
generating a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, wherein the preamble includes a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, and wherein a symbol duration, including a cyclic prefix duration, of each preamble symbol of the PPDU is greater than or equal to 20 μsec and less than or equal to 40 μsec if the symbols of the PPDU each include 128 total OFDM tones, or greater than or equal to 40 μsec and less than or equal to 80 μsec if the symbols of the PPDU each include 256 total OFDM tones; and
transmitting the PPDU via a television broadcast frequency spectrum.

49. A method for wireless communication, the method comprising:
receiving in a television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, wherein the preamble includes a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, wherein the PPDU has a second bandwidth corresponding to down-clocking a first signal having a first bandwidth by a factor, the first signal having a first signal preamble that includes a first SIG field having at least one symbol, and wherein the symbol of the first SIG field is limited to 48 OFDM data tones per 20 MHz sub-band of the first signal; and
processing the PPDU.

50. The method of claim 49, wherein the preamble further includes:
a short training field (STF) symbol having every eighth tone populated if the symbols of the PPDU each include 128 total OFDM tones or having every sixteenth tone populated if the symbols of the PPDU each include 256 total OFDM tones.

51. The method of claim 49, wherein the preamble further includes:
a beamformed signal (BF-SIG) field that indicates at least one of a group identifier (ID) that identifies at least one intended receiver of the payload, a number of spatial streams for the payload for each user of a plurality of users, and/or a modulation and coding rate scheme for the payload for each user of the plurality of users.

52. A method for wireless communication, the method comprising:
receiving in a television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, wherein the preamble includes a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, wherein the symbols of the PPDU including 128 total OFDM tones correspond to down-clocking a 40 MHz bandwidth signal by a factor greater than or equal to 5 and less than or equal to 10, and wherein the symbols of the PPDU including 256 total OFDM tones correspond to down-clocking an 80 MHz bandwidth signal by a factor greater than or equal to 10 and less than or equal to 20; and processing the PPDU.

53. A method for wireless communication, the method comprising:

receiving in a television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, wherein the preamble includes a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, and wherein each symbol of the preamble has a cyclic prefix duration greater than or equal to 4 μsec and less than or equal to 8 μsec if the symbols of the PPDU each include 128 total OFDM tones, or greater than or equal to 8 μsec and less than or equal to 16 μsec if the symbols of the PPDU each include 256 total OFDM tones and processing the PPDU.

54. A method for wireless communication, the method comprising:

receiving in a television broadcast frequency spectrum a Physical Layer Convergence Protocol Packet Data Unit (PPDU) having a preamble and a payload, wherein symbols of the PPDU each include 128 total (orthogonal frequency-division multiplexing) OFDM tones or 256 total OFDM tones, wherein the preamble includes a signal (SIG) field symbol having 108 OFDM data tones if the symbols of the PPDU include 128 total OFDM tones or having 234 OFDM data tones if the symbols of the PPDU include 256 total OFDM tones, wherein the SIG field symbol indicates at least one of an amount of data in the payload or a duration of time to transmit the PPDU, wherein a symbol duration, including a cyclic prefix duration, of each preamble symbol of the PPDU is greater than or equal to 20 μsec and less than or equal to 40 μsec if the symbols of the PPDU each include 128 total OFDM tones, or greater than or equal to 40 μsec and less than or equal to 80 μsec if the symbols of the PPDU each include 256 total OFDM tones and processing the PPDU.

* * * * *